US010762706B2

(12) United States Patent
Funami et al.

(10) Patent No.: US 10,762,706 B2
(45) Date of Patent: Sep. 1, 2020

(54) IMAGE MANAGEMENT DEVICE, IMAGE MANAGEMENT METHOD, IMAGE MANAGEMENT PROGRAM, AND PRESENTATION SYSTEM

(71) Applicants: Atsushi Funami, Tokyo (JP); Nobuyuki Kishi, Tokyo (JP)

(72) Inventors: Atsushi Funami, Tokyo (JP); Nobuyuki Kishi, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 37 days.

(21) Appl. No.: 15/556,811

(22) PCT Filed: Mar. 11, 2016

(86) PCT No.: PCT/JP2016/001398
§ 371 (c)(1),
(2) Date: Sep. 8, 2017

(87) PCT Pub. No.: WO2016/152070
PCT Pub. Date: Sep. 29, 2016

(65) Prior Publication Data
US 2018/0047209 A1    Feb. 15, 2018

(30) Foreign Application Priority Data

Mar. 20, 2015   (JP) .................. 2015-057887

(51) Int. Cl.
*G06T 19/00* (2011.01)
*H04N 1/195* (2006.01)
*H04N 1/32* (2006.01)

(52) U.S. Cl.
CPC ......... *G06T 19/00* (2013.01); *H04N 1/19594* (2013.01); *H04N 1/32149* (2013.01);
(Continued)

(58) Field of Classification Search
None
See application file for complete search history.

(56) References Cited

U.S. PATENT DOCUMENTS 5,854,634 A    12/1998 Kroitor
6,122,403 A *   9/2000 Rhoads ............ G06F 17/30876
                                                382/233
(Continued)

FOREIGN PATENT DOCUMENTS

CN    104331437 A    2/2015
JP    2002-140433 A  5/2002
(Continued)

OTHER PUBLICATIONS

Extended European Search Report dated Jul. 10, 2018 issued in corresponding European Application No. 16767979.4.
(Continued)

*Primary Examiner* — Jeffrey J Chow
(74) *Attorney, Agent, or Firm* — Harness, Dickey & Pierce, P.L.C.

(57) ABSTRACT

An image acquiring unit acquires an image of a sheet on which a medium that presents an identification image, including identification information is to be placed, the sheet including a user image that is presented by a user. A first identification-information acquiring unit acquires the identification information from the image acquired by the image acquiring unit. An image extracting unit extracts the user image from the image acquired by the image acquiring unit. A second identification-information acquiring unit acquires the identification information from the medium alone. A first storage unit stores the user image in association with the identification information. A managing unit acquires, from the first storage unit, a user image such that the identification information associated with the user image matches the identification information acquired by the second identifi- (Continued)

cation-information acquiring unit, among the user images that are stored in the first storage unit.

16 Claims, 37 Drawing Sheets

(52) U.S. Cl.
CPC .. *G06T 2215/16* (2013.01); *H04N 2201/0084* (2013.01); *H04N 2201/3264* (2013.01); *H04N 2201/3269* (2013.01)

(56) References Cited

U.S. PATENT DOCUMENTS

| | | | |
|---|---|---|---|
| 6,373,492 | B1 | 4/2002 | Kroitor |
| 6,577,315 | B1 | 6/2003 | Kroitor |
| 6,856,414 | B1 * | 2/2005 | Haneda .................. G06F 16/51 358/1.15 |
| 2003/0063321 | A1 * | 4/2003 | Inoue ................. H04N 1/32112 358/302 |
| 2006/0079324 | A1 | 4/2006 | Watanabe et al. |
| 2006/0247809 | A1 * | 11/2006 | Sakoh ..................... G06F 16/68 700/94 |
| 2007/0171452 | A1 * | 7/2007 | Matsunoshita .... H04N 1/32203 358/1.14 |
| 2008/0068674 | A1 * | 3/2008 | McIntyre ........... H04N 1/00132 358/474 |
| 2009/0140838 | A1 * | 6/2009 | Newman ................ G06Q 20/40 340/5.83 |
| 2009/0260017 | A1 * | 10/2009 | Yoshida ................ G06F 9/5038 718/105 |
| 2009/0307264 | A1 | 12/2009 | Makishima et al. |
| 2013/0024634 | A1 * | 1/2013 | Shitomi .................. G06F 3/061 711/162 |
| 2013/0191783 | A1 * | 7/2013 | Sugita ................. G06F 3/04842 715/810 |
| 2014/0320507 | A1 * | 10/2014 | Myung ................... G06T 13/80 345/474 |
| 2014/0333612 | A1 | 11/2014 | Itoh et al. |
| 2015/0163340 | A1 * | 6/2015 | Kang ................ H04M 1/72522 455/566 |
| 2015/0181080 | A1 * | 6/2015 | Nuggehalli ........... H04L 63/083 358/1.15 |
| 2016/0179361 | A1 * | 6/2016 | Gujarathi ............. G06F 3/0485 715/786 |
| 2017/0039909 | A1 | 2/2017 | Itoh et al. |

FOREIGN PATENT DOCUMENTS

| | | |
|---|---|---|
| JP | 2007-004342 A | 1/2007 |
| JP | 2007-265148 A | 10/2007 |
| JP | 4161325 | 8/2008 |
| JP | 2011-145852 A | 7/2011 |
| JP | 2011-176453 | 9/2011 |
| JP | 2013-61590 A | 4/2013 |
| JP | 2014-238811 | 12/2014 |
| WO | 2013/039063 | 3/2013 |

OTHER PUBLICATIONS

International Search Report dated Jun. 14, 2016 in PCT/JP2016/001398 filed Mar. 11, 2016.
Japanese Office Action dated Feb. 19, 2019 in corresponding Japanese Application No. 2015-057887.
Chinese Office Action dated Jan. 9, 2020 issued in corresponding Chinese Application No. 201680016723.8 (with English translation).

\* cited by examiner

[Fig. 1]
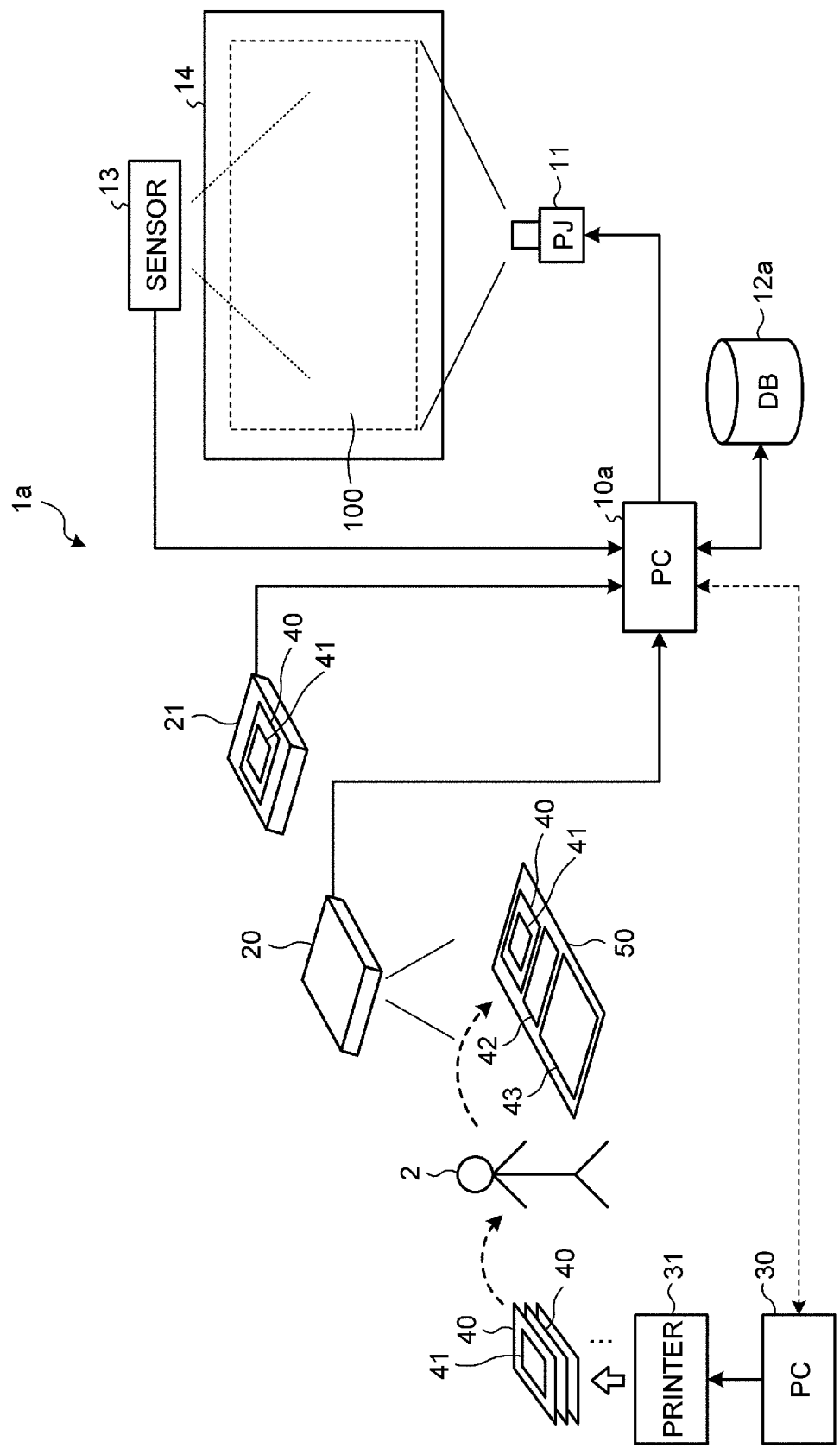

[Fig. 2]
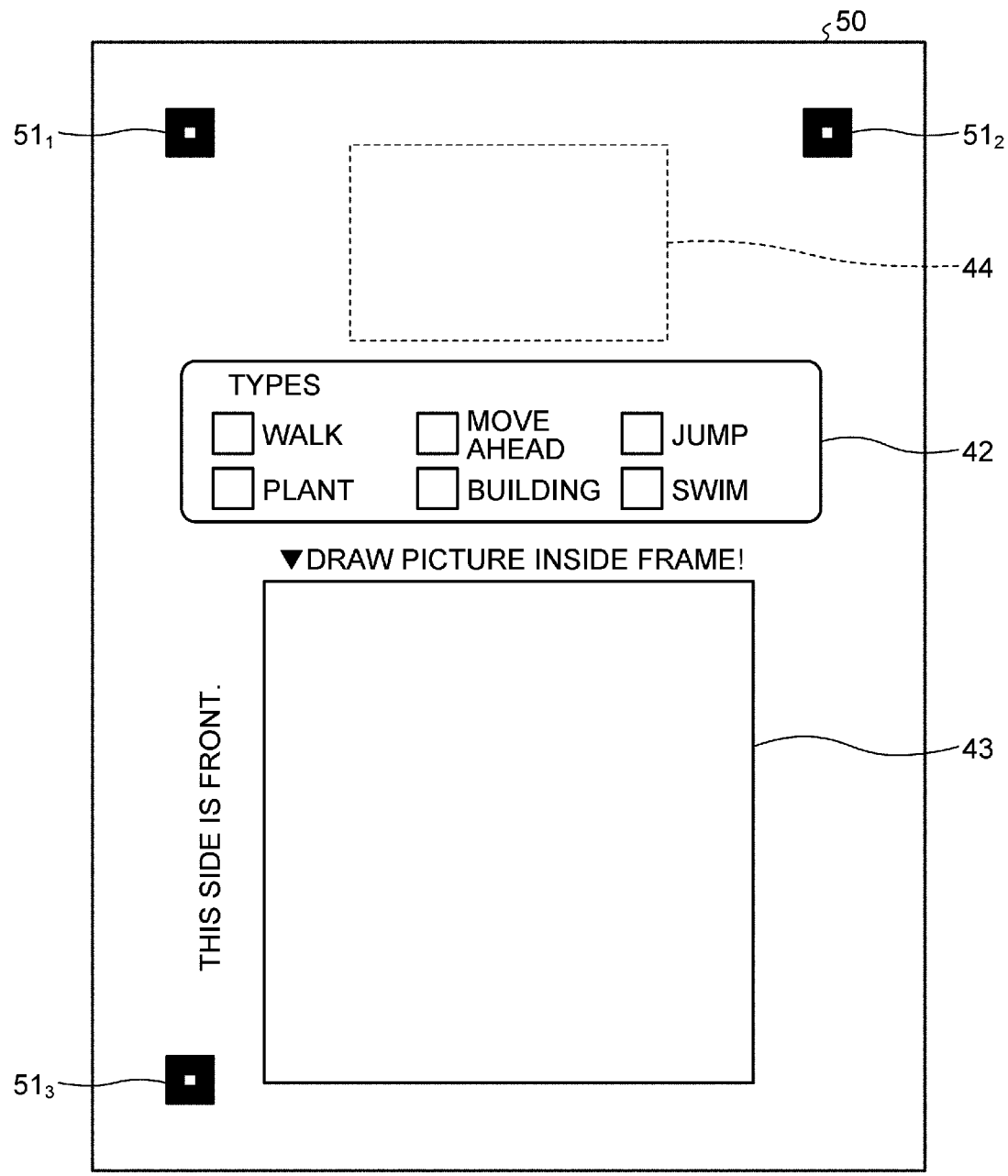
[Fig. 3]
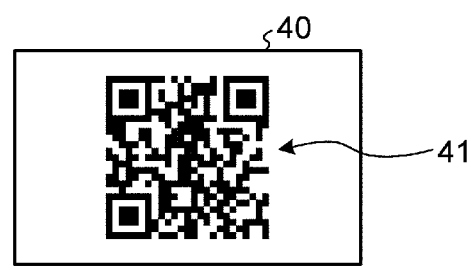

[Fig. 4]
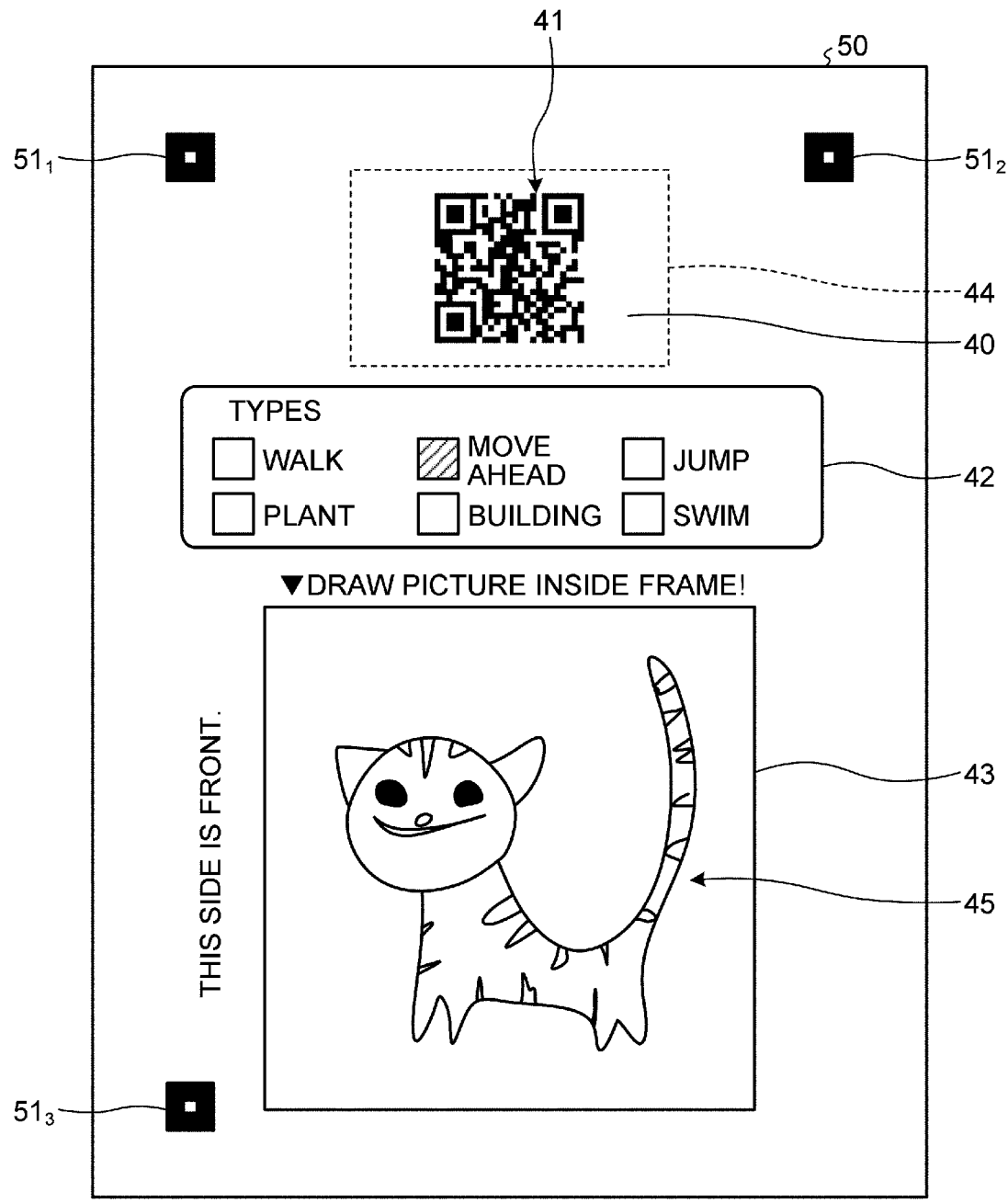

[Fig. 5]
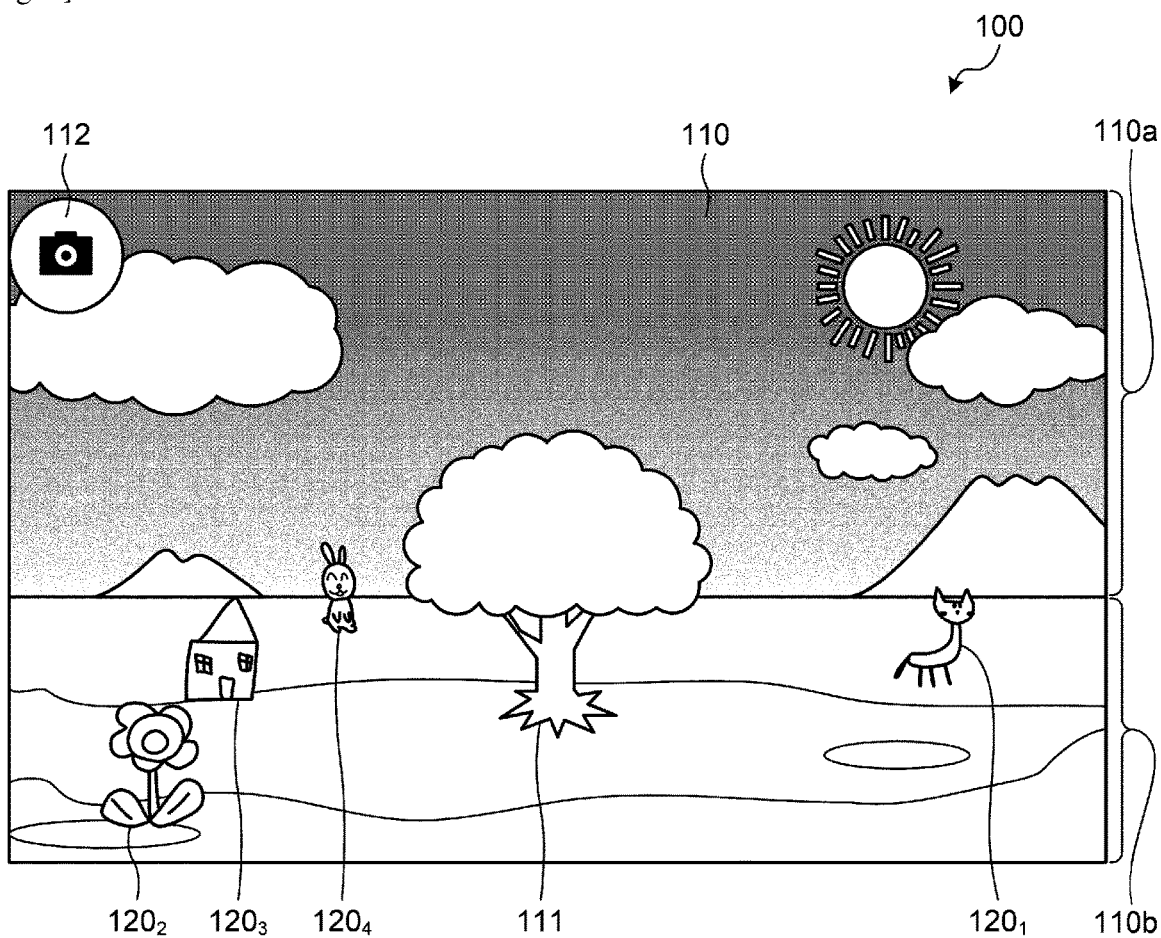

[Fig. 6]
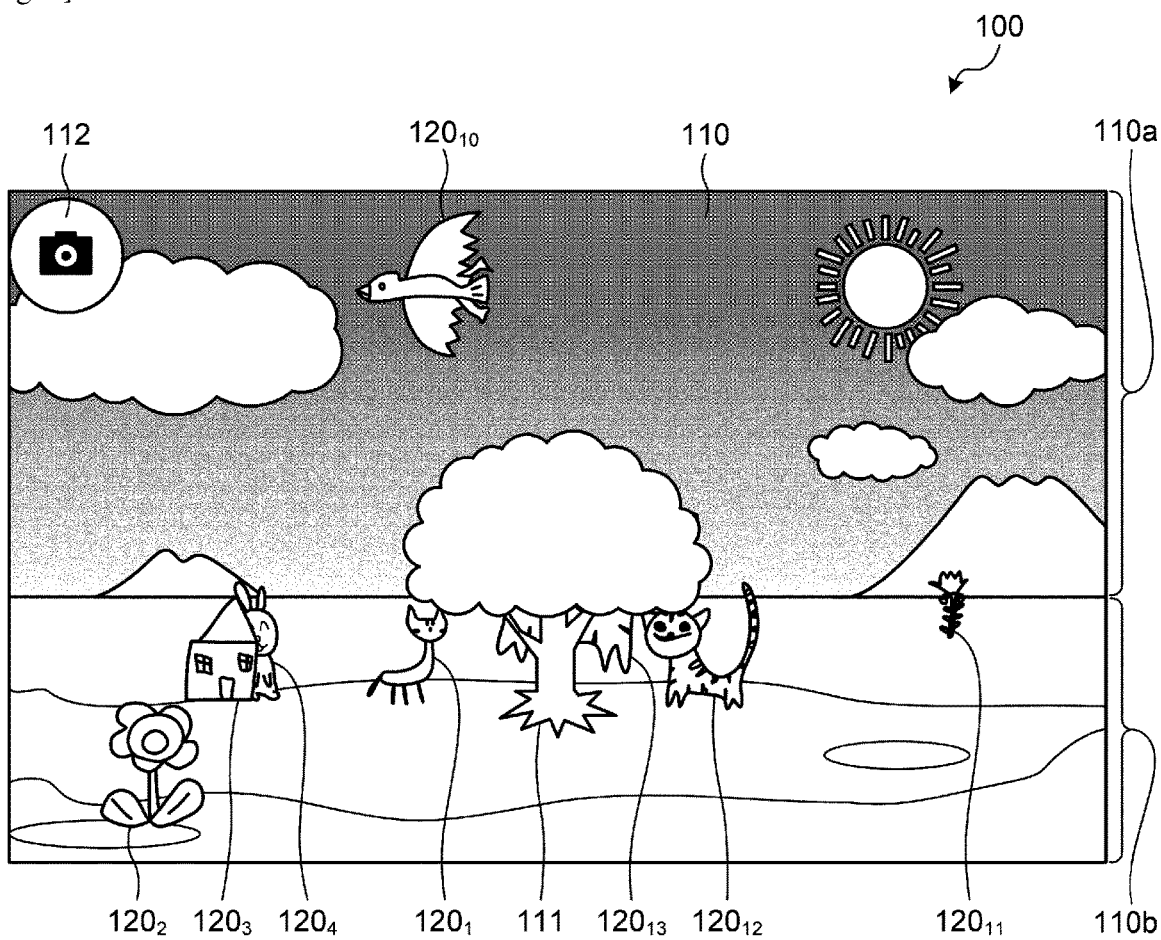

[Fig. 7]
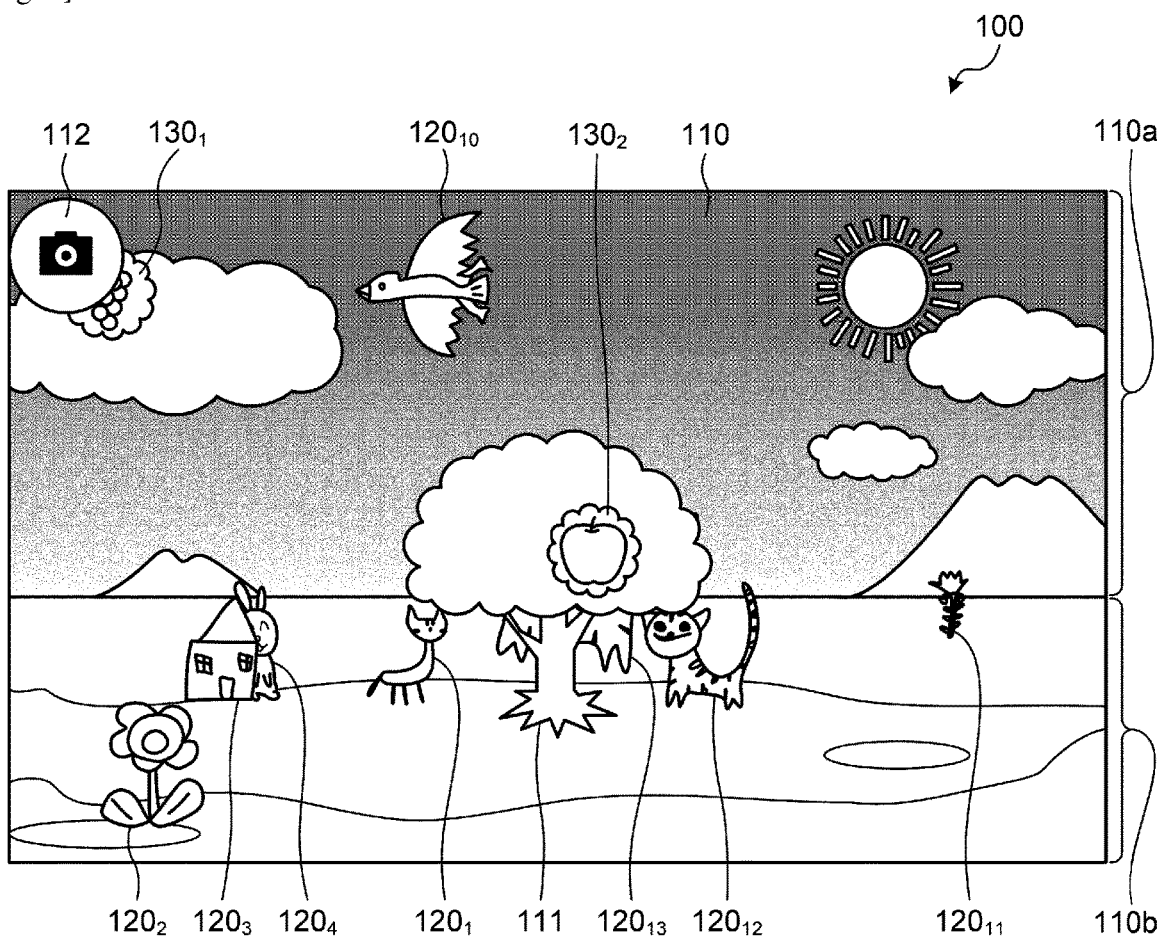

[Fig. 8]
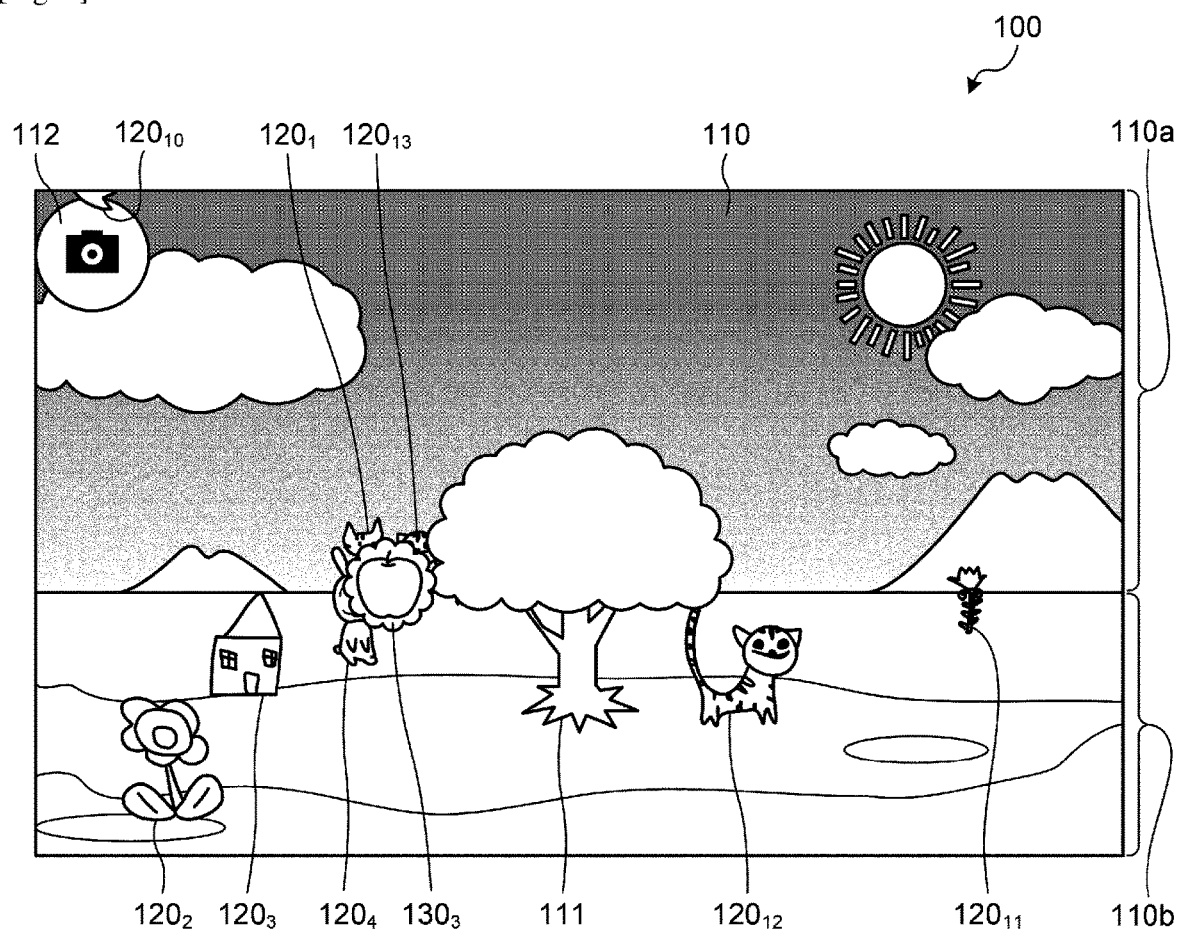

[Fig. 9]
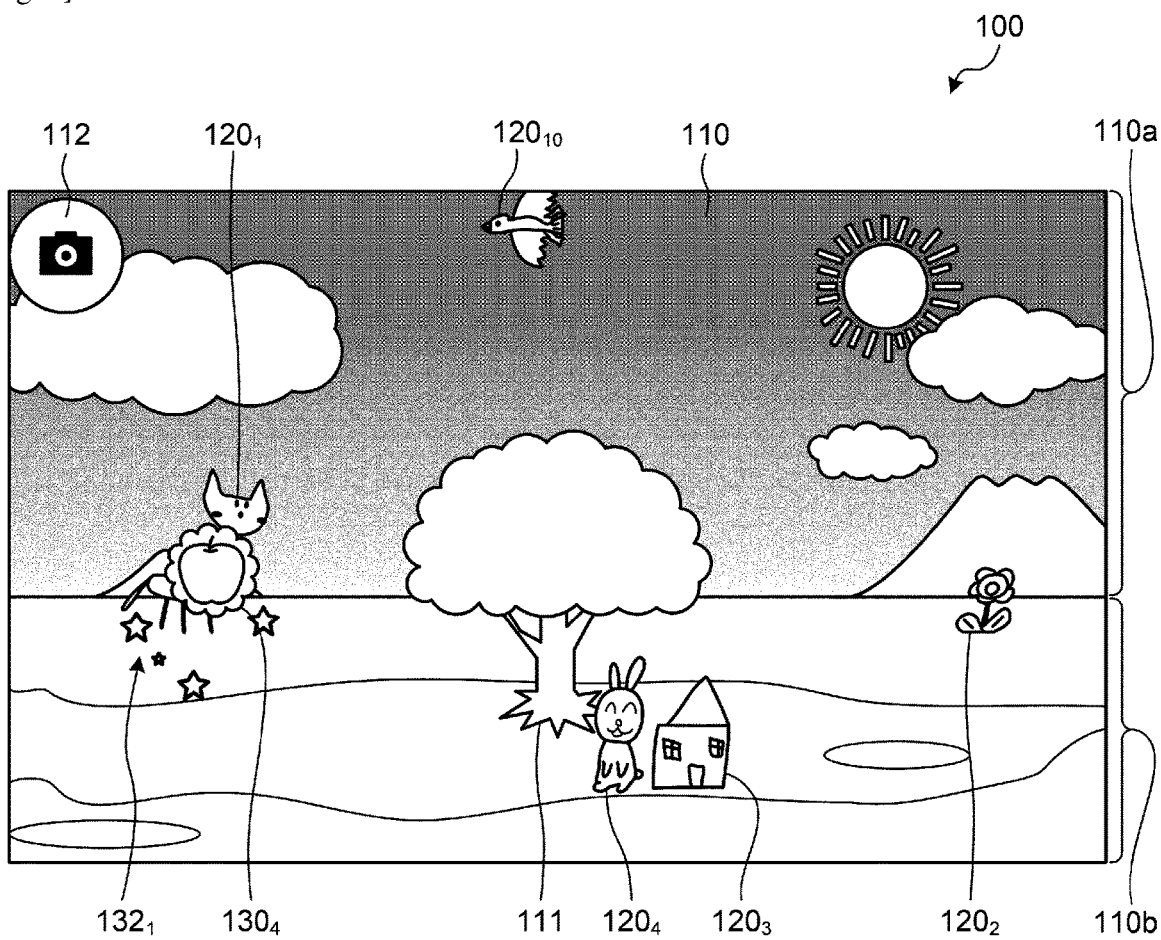

[Fig. 10]
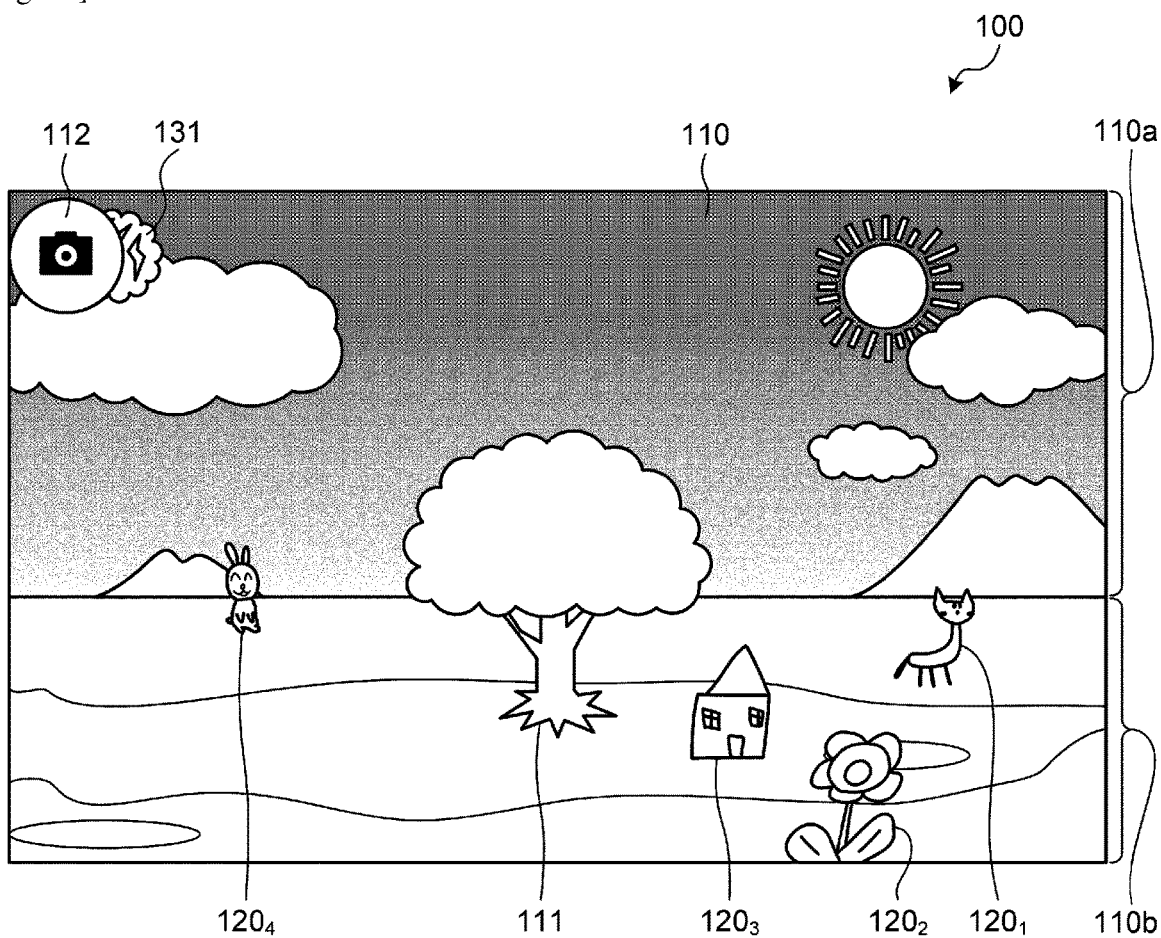

[Fig. 11A]
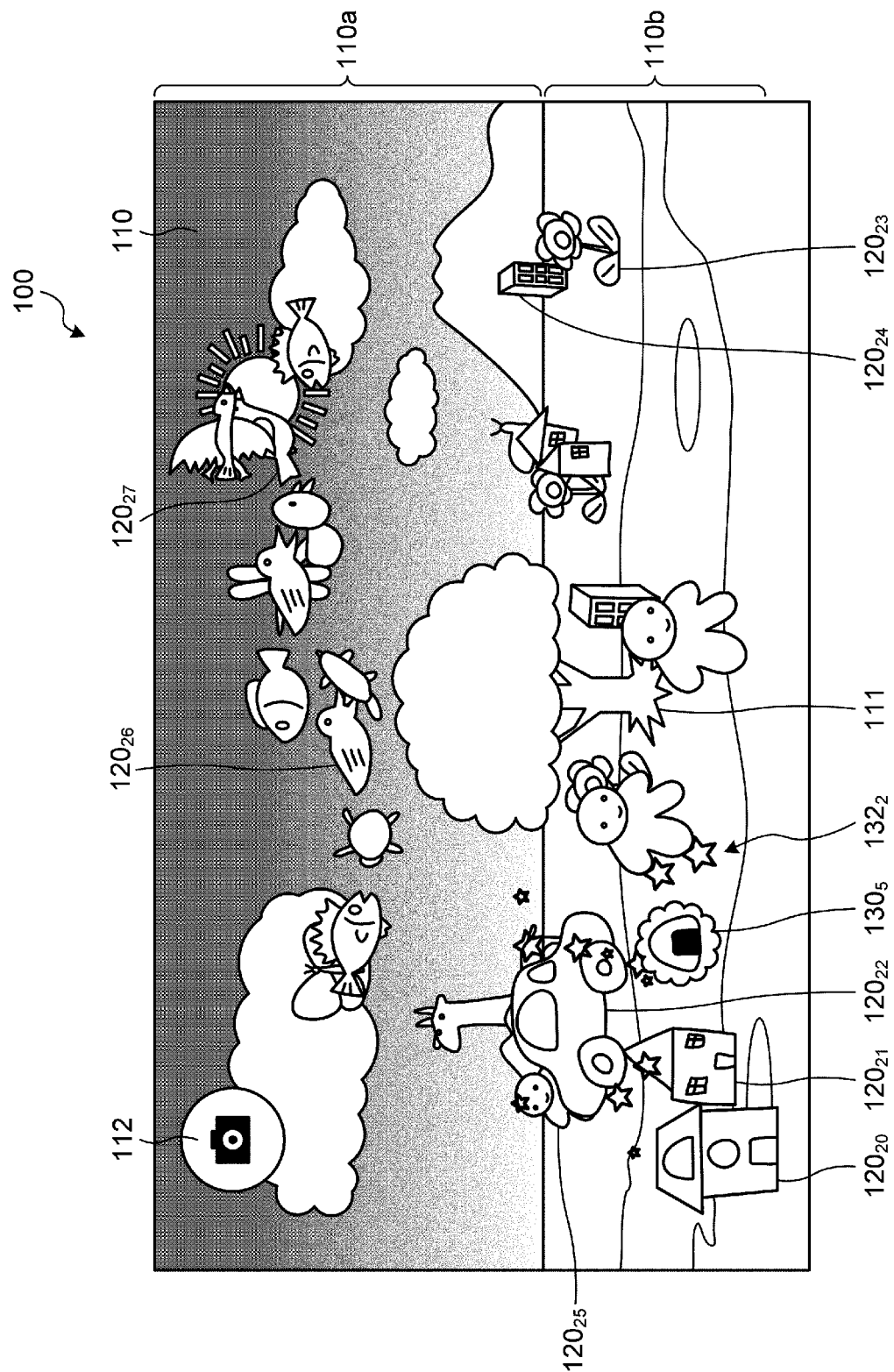

[Fig. 11B]
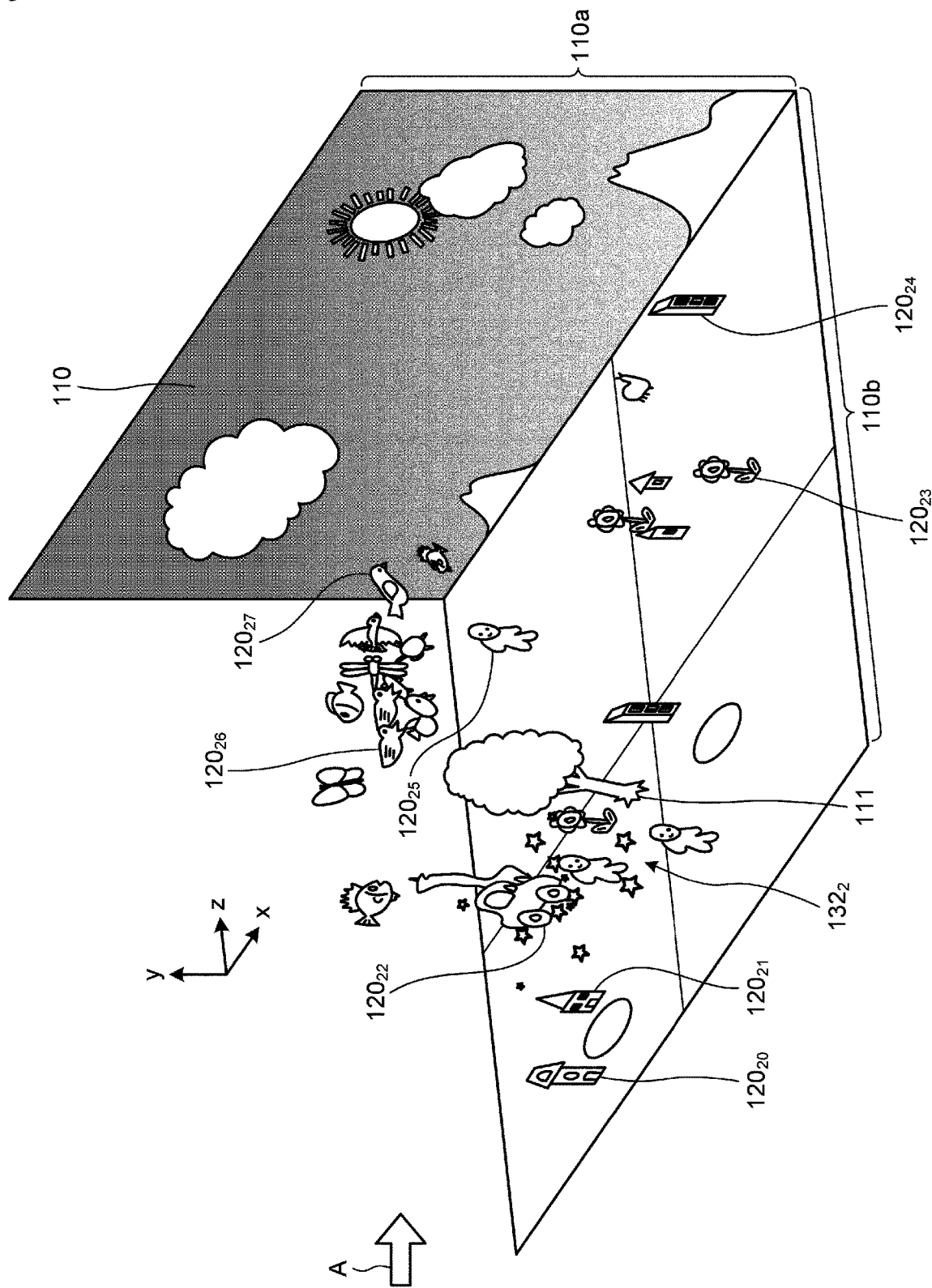

[Fig. 12]
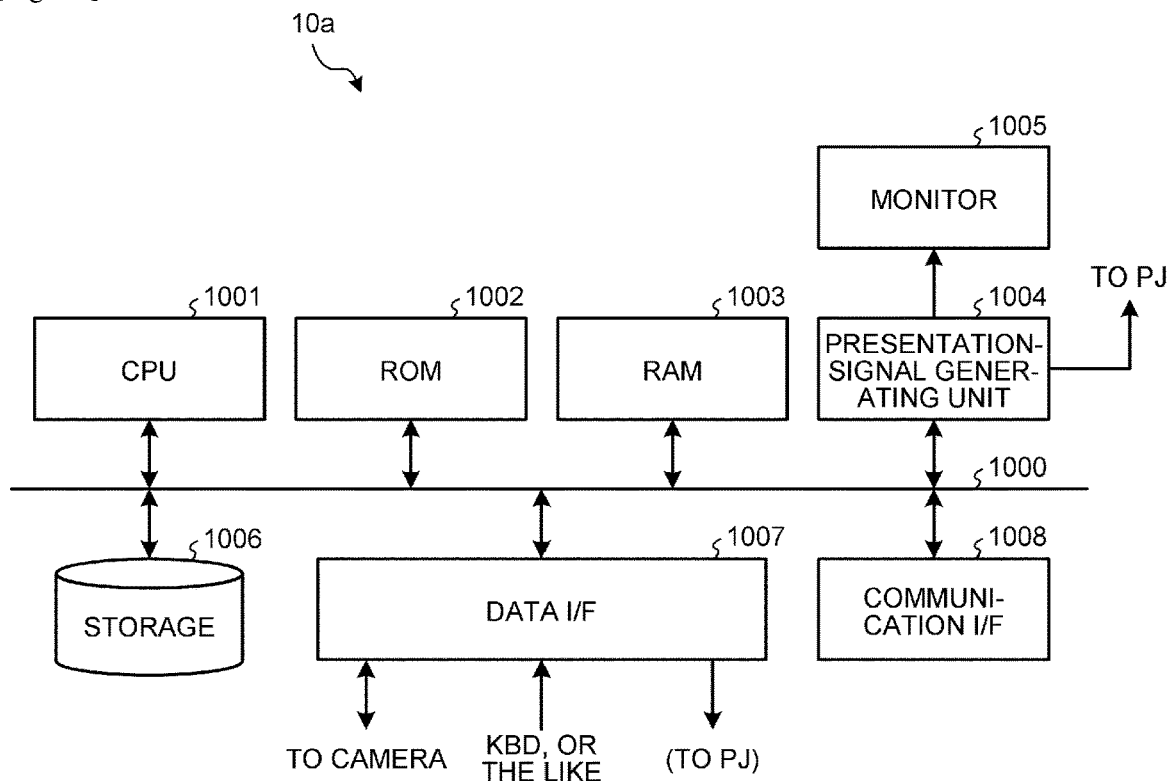
[Fig. 13]
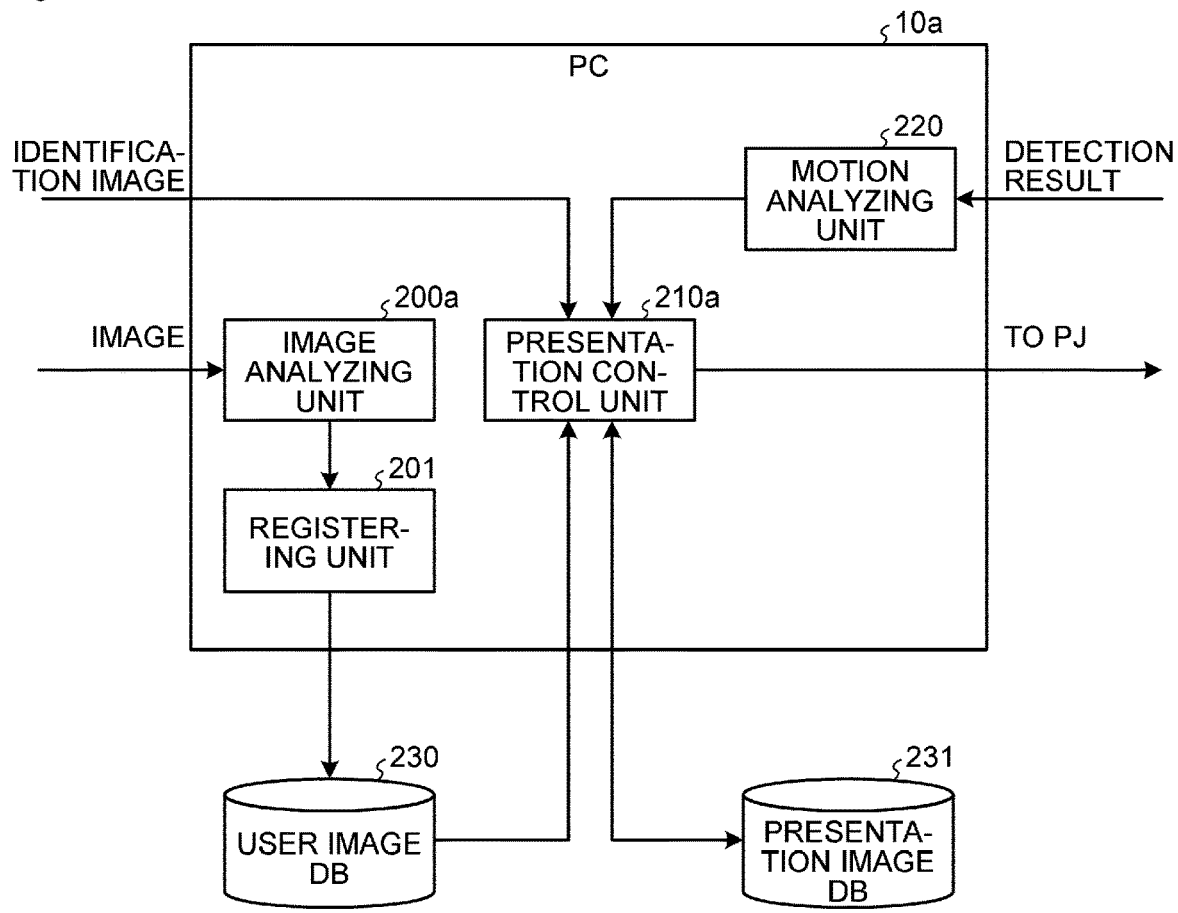

[Fig. 14]
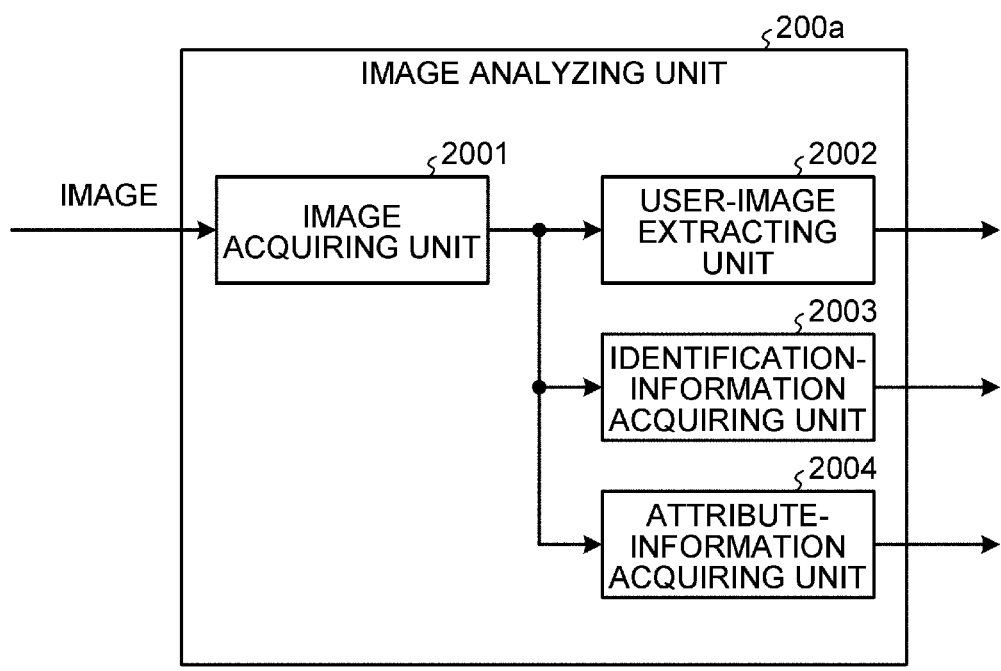

[Fig. 15]
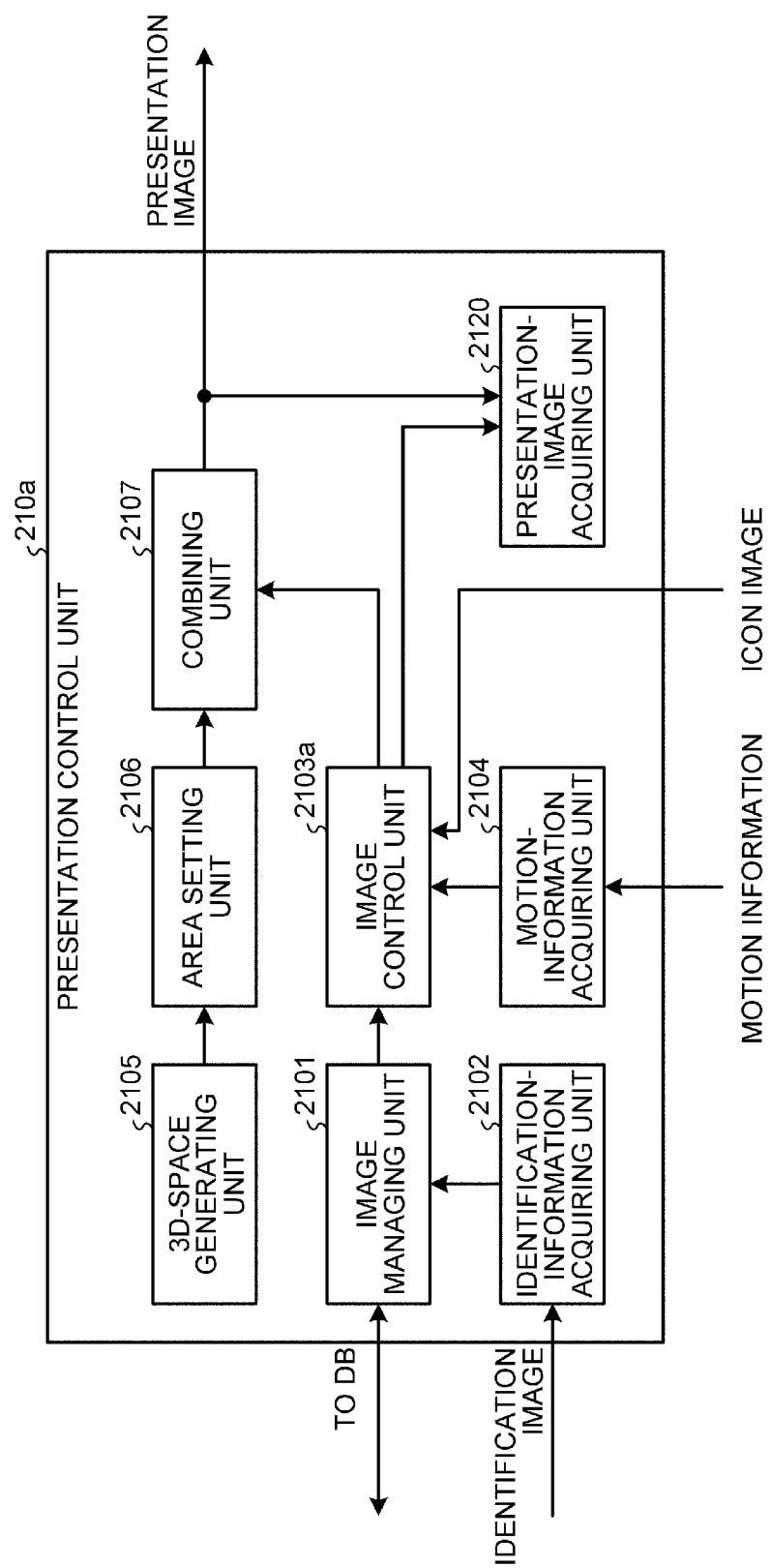

[Fig. 16]
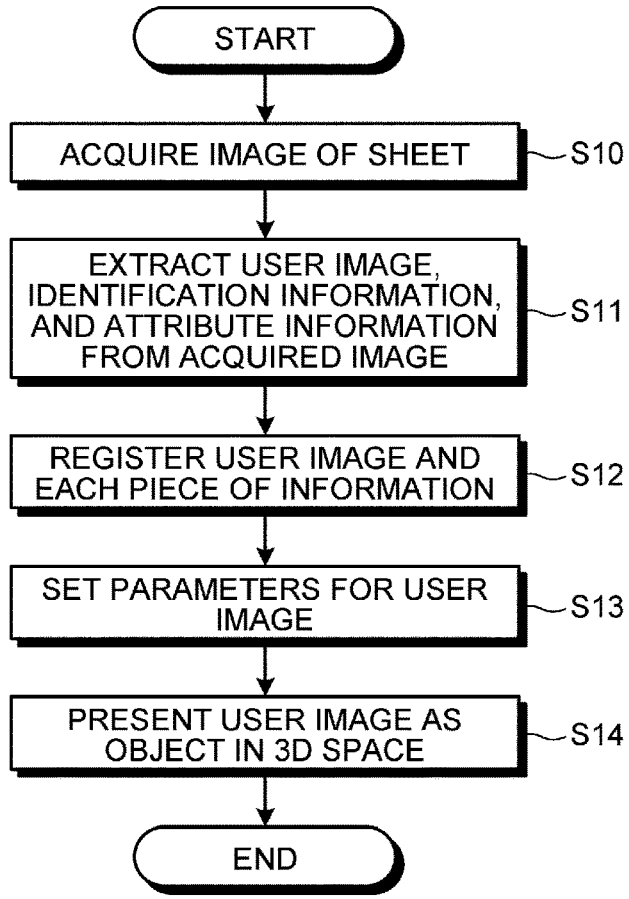
[Fig. 17]
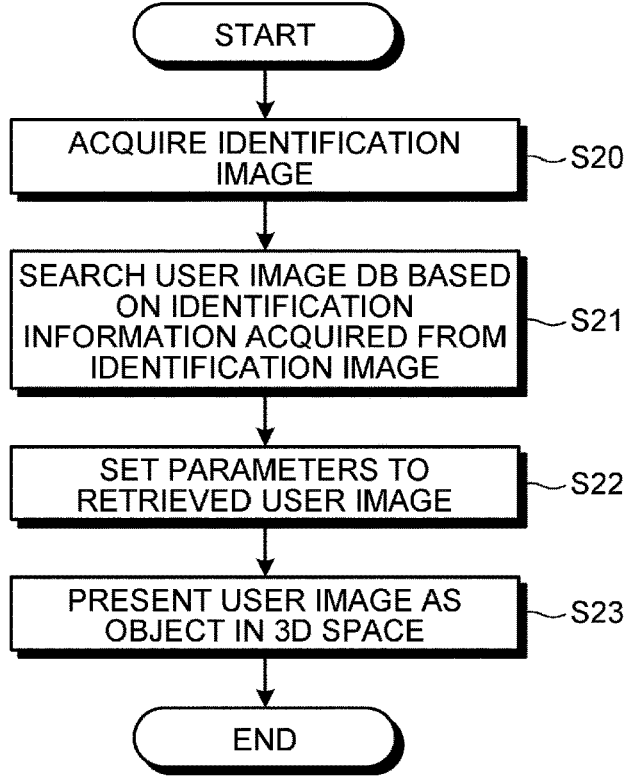

[Fig. 18]
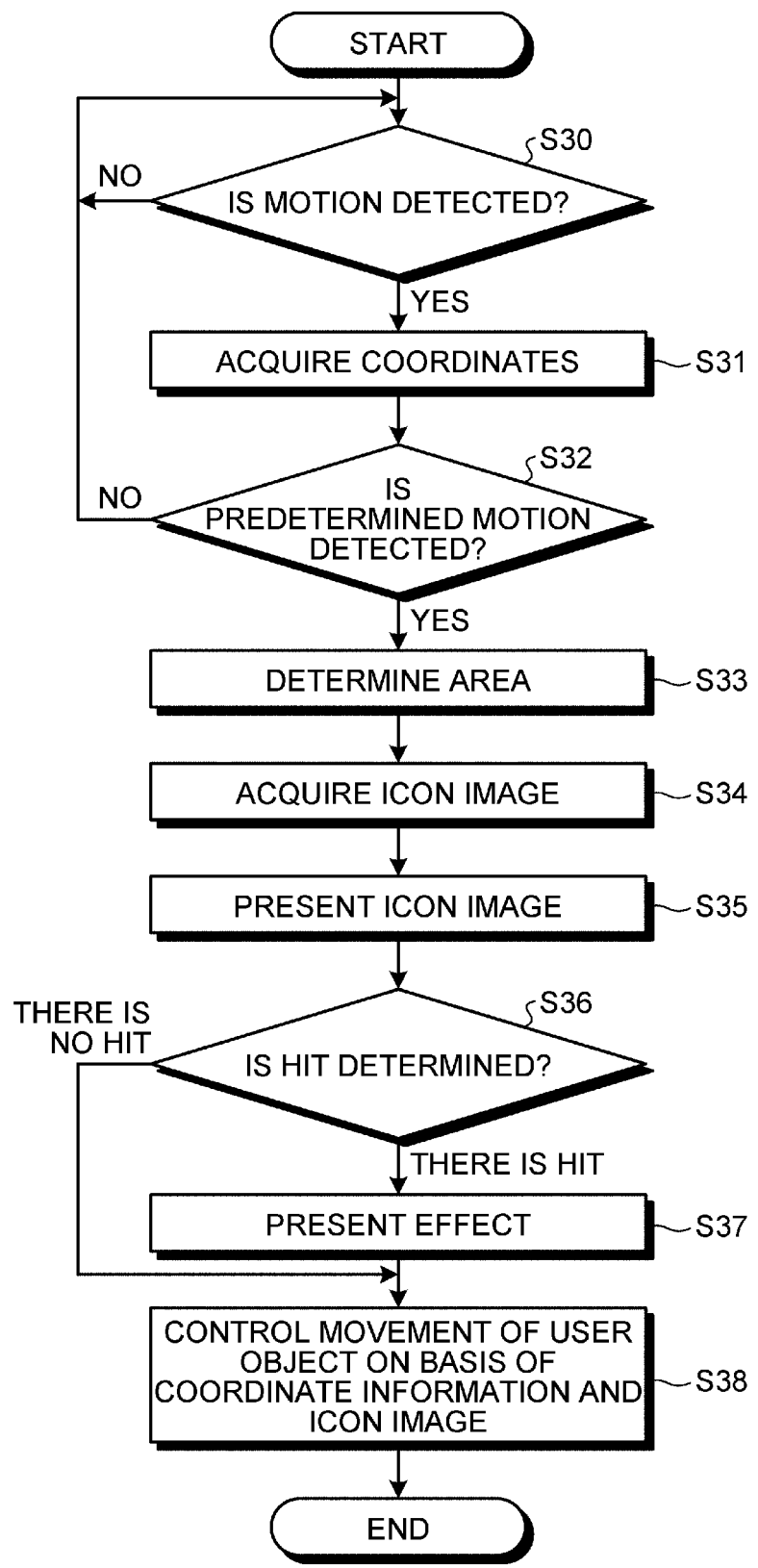

[Fig. 19]
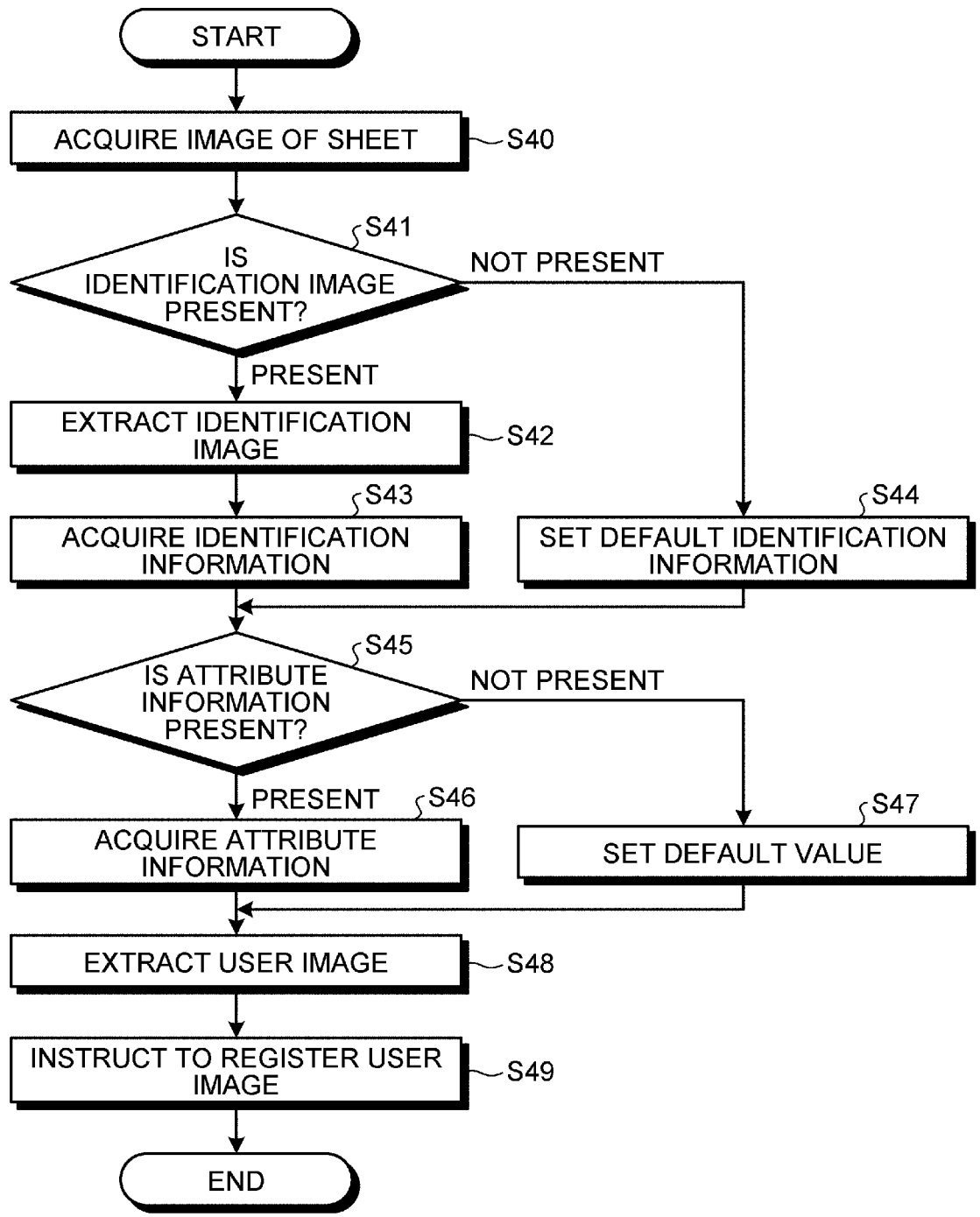

[Fig. 20]
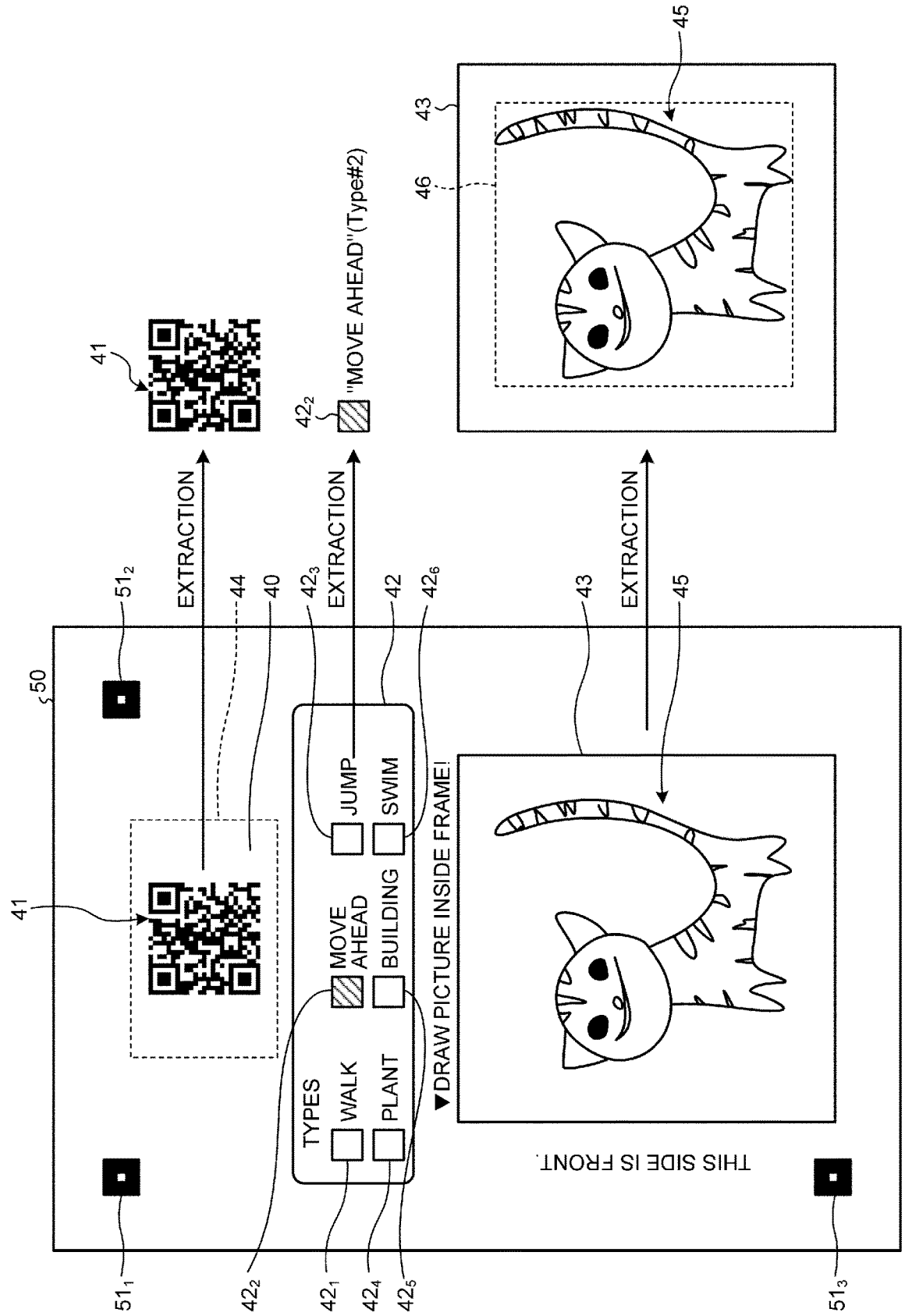

[Fig. 21]
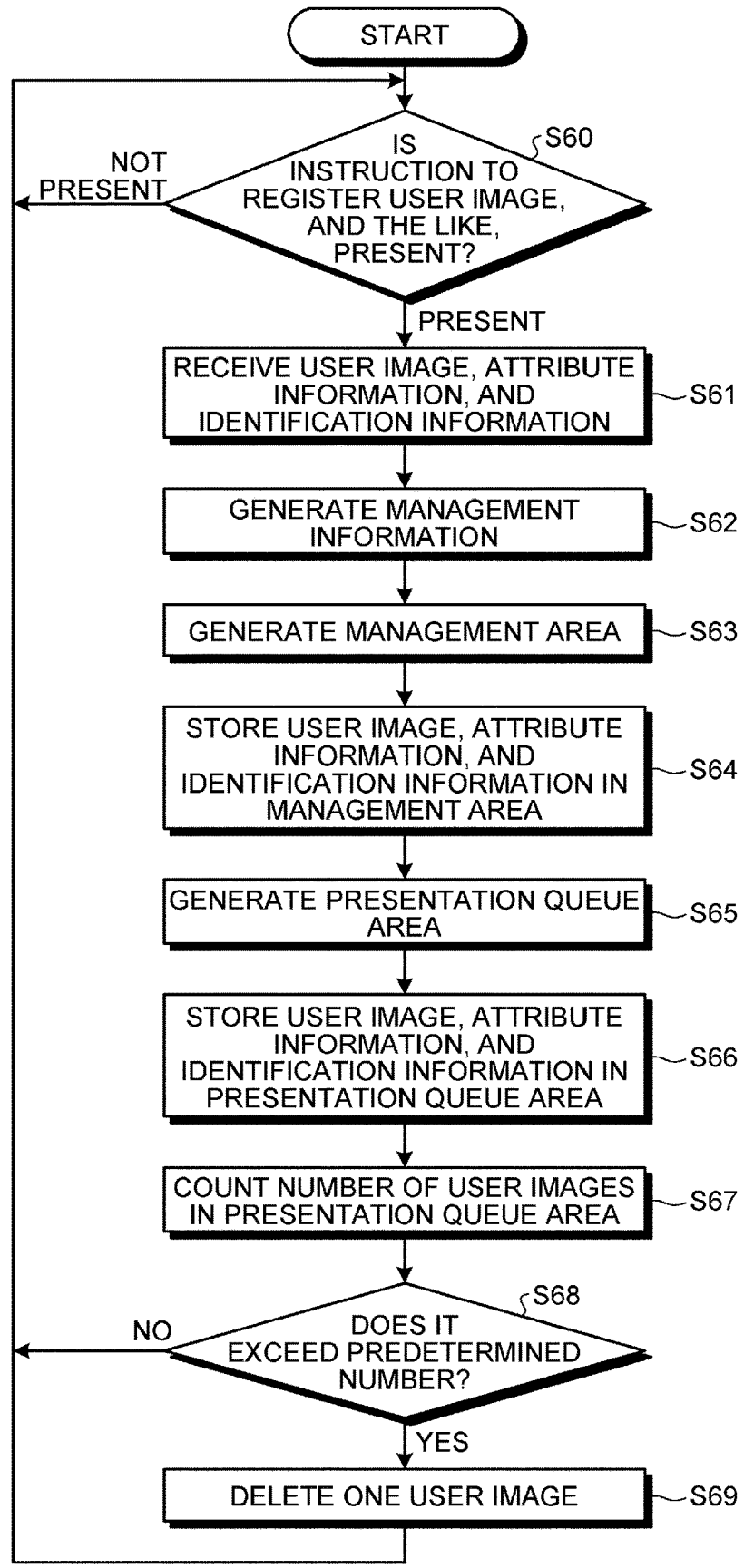

[Fig. 22]

| IDENTIFICATION INFORMATION | USER IMAGE | ATTRIBUTE INFORMATION |
|---|---|---|
| A001 | abc001 | Type#1 |
| | abc002 | Type#1 |
| | def001 | Type#2 |
| | xyz001 | Type#3 |
| B021 | cde010 | Type#4 |
| | fgh020 | Type#3 |
| | ijk021 | Type#4 |

[Fig. 23]
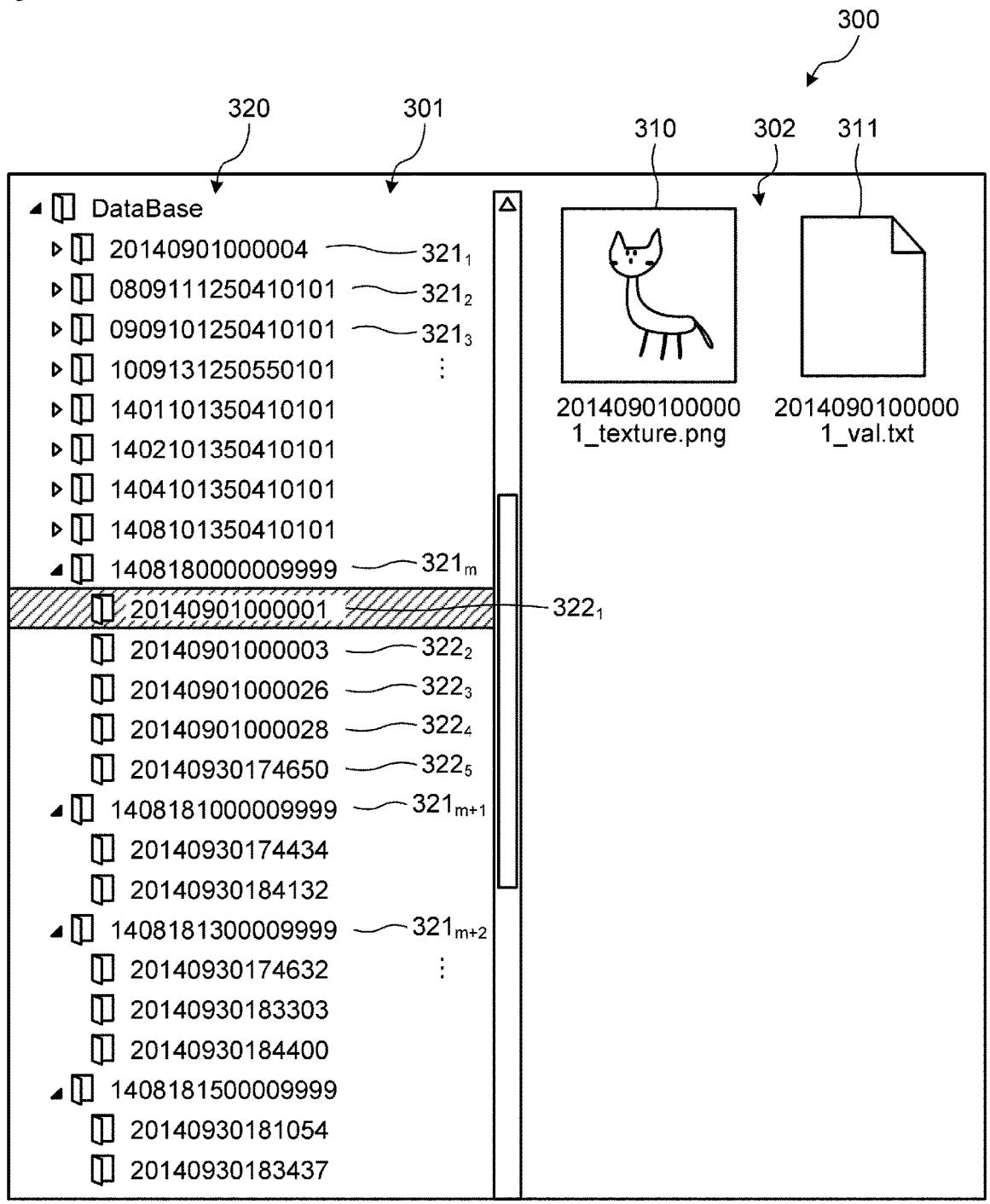
[Fig. 24]
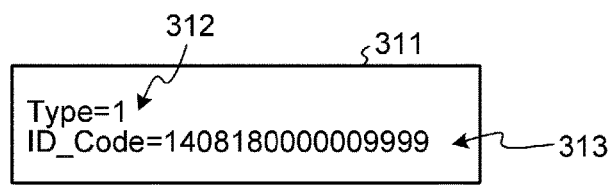

[Fig. 25]

```
1: AppStart=2015/01/15//09/15/17
2: Date=2015/01/15//09/15/17:Event=LoadIntoScene:BaseName=20140930174650:ID=140818000000099999:Type=PLANT
3: Date=2015/01/15//09/15/17:Event=LoadIntoScene:BaseName=20140901000028:ID=140818000000099999:Type=BUILDING
4: Date=2015/01/15//09/15/17:Event=LoadIntoScene:BaseName=20140901000026:ID=140818000000099999:Type=JUMP
5: Date=2015/01/15//09/15/17:Event=LoadIntoScene:BaseName=20140901000003:ID=140818000000099999:Type=MOVE_AHEAD
6: Date=2015/01/15//09/15/17:Event=LoadIntoScene:BaseName=20140901000001:ID=140818000000099999:Type=WALK
7: Date=2015/01/15//09/16/47:Event=LoadIntoScene:BaseName=20140930174650:ID=140818000000099999:Type=PLANT
8: Date=2015/01/15//09/16/47:Event=LoadIntoScene:BaseName=20140901000028:ID=140818000000099999:Type=BUILDING
9: Date=2015/01/15//09/16/47:Event=LoadIntoScene:BaseName=20140901000026:ID=140818000000099999:Type=JUMP
10: AppEnd=2015/01/15//09/18/47
11: AppStart=2015/01/15//09/27/54
12: Date=2015/01/15//09/27/54:Event=LoadIntoScene:BaseName=20150115092753:ID=20140901000004:Type=WALK
13: AppEnd=2015/01/15//09/48/41
14: AppStart=2015/01/15//09/49/16
15: Date=2015/01/15//09/49/16:Event=LoadIntoScene:BaseName=20150115094904:ID=20140901000004:Type=WALK
16: Date=2015/01/15//09/49/16:Event=LoadIntoScene:BaseName=20150115092753:ID=20140901000004:Type=WALK
17: Date=2015/01/15//09/49/58:Event=LoadIntoScene:BaseName=20150115094904:ID=20140901000004:Type=WALK
...
```

330

[Fig. 26]
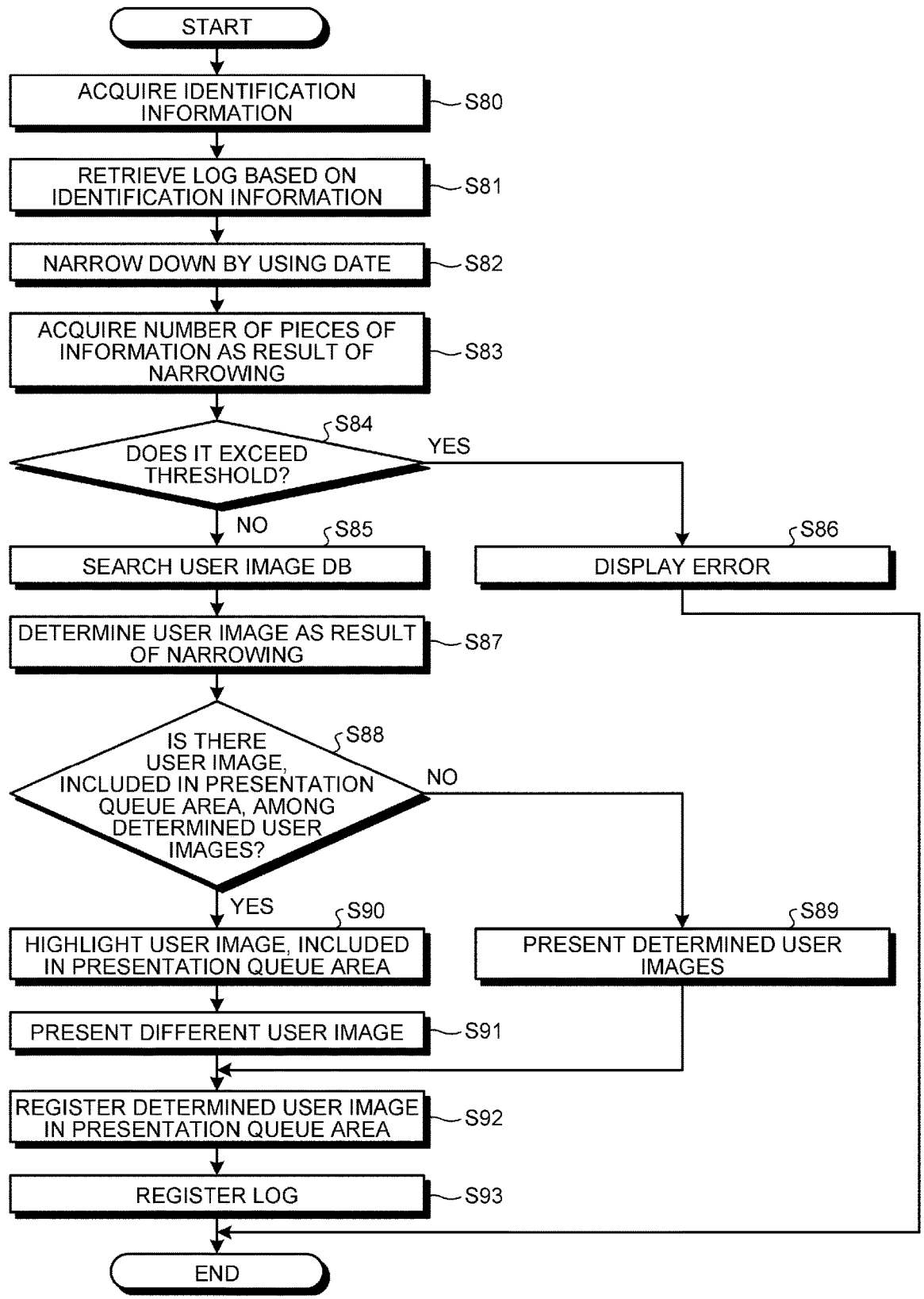

[Fig. 27]
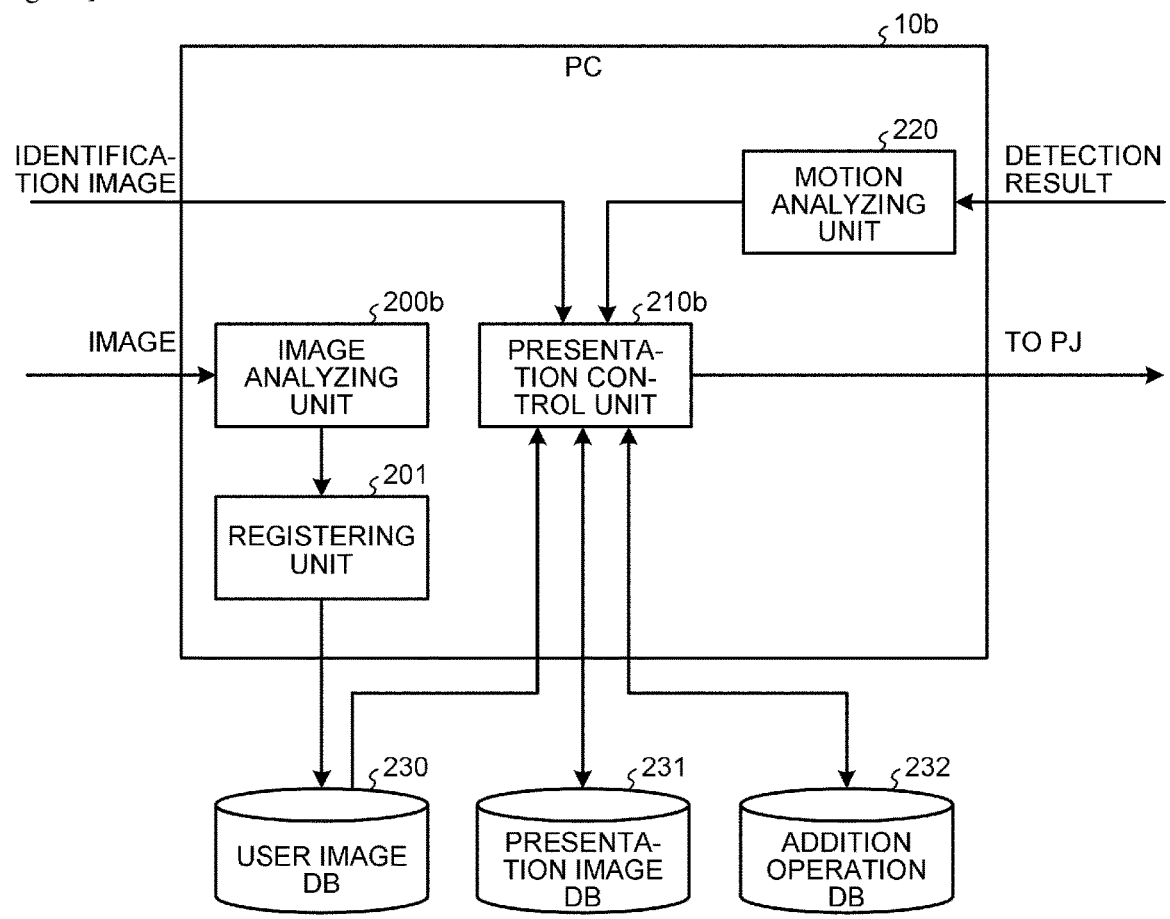

[Fig. 28]
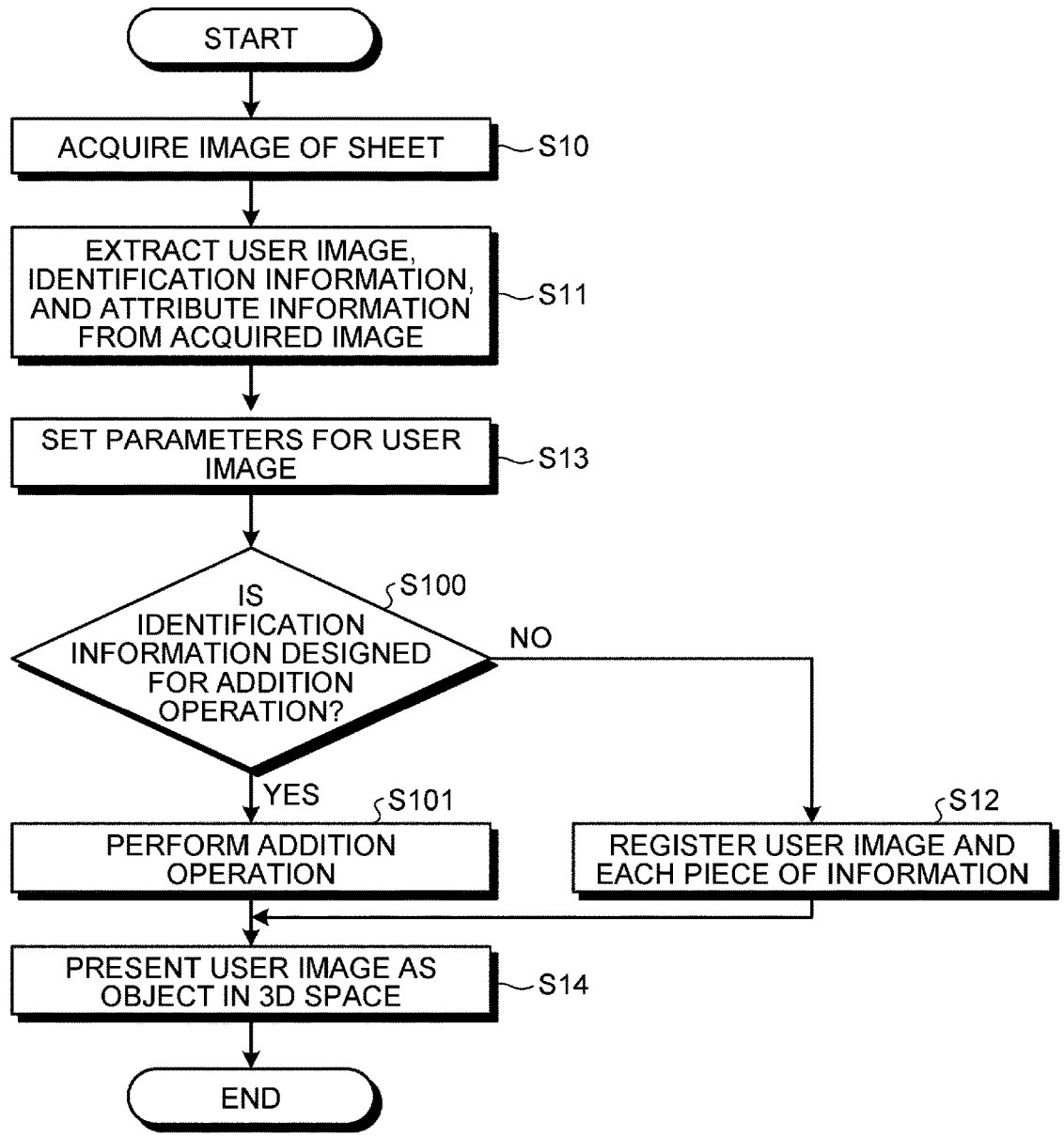
[Fig. 29]
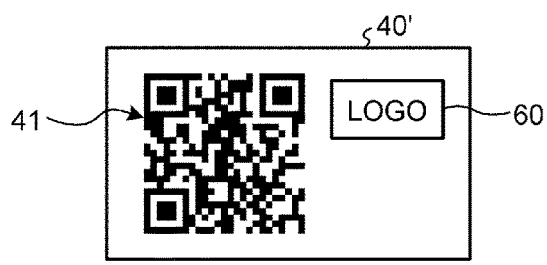

[Fig. 30]
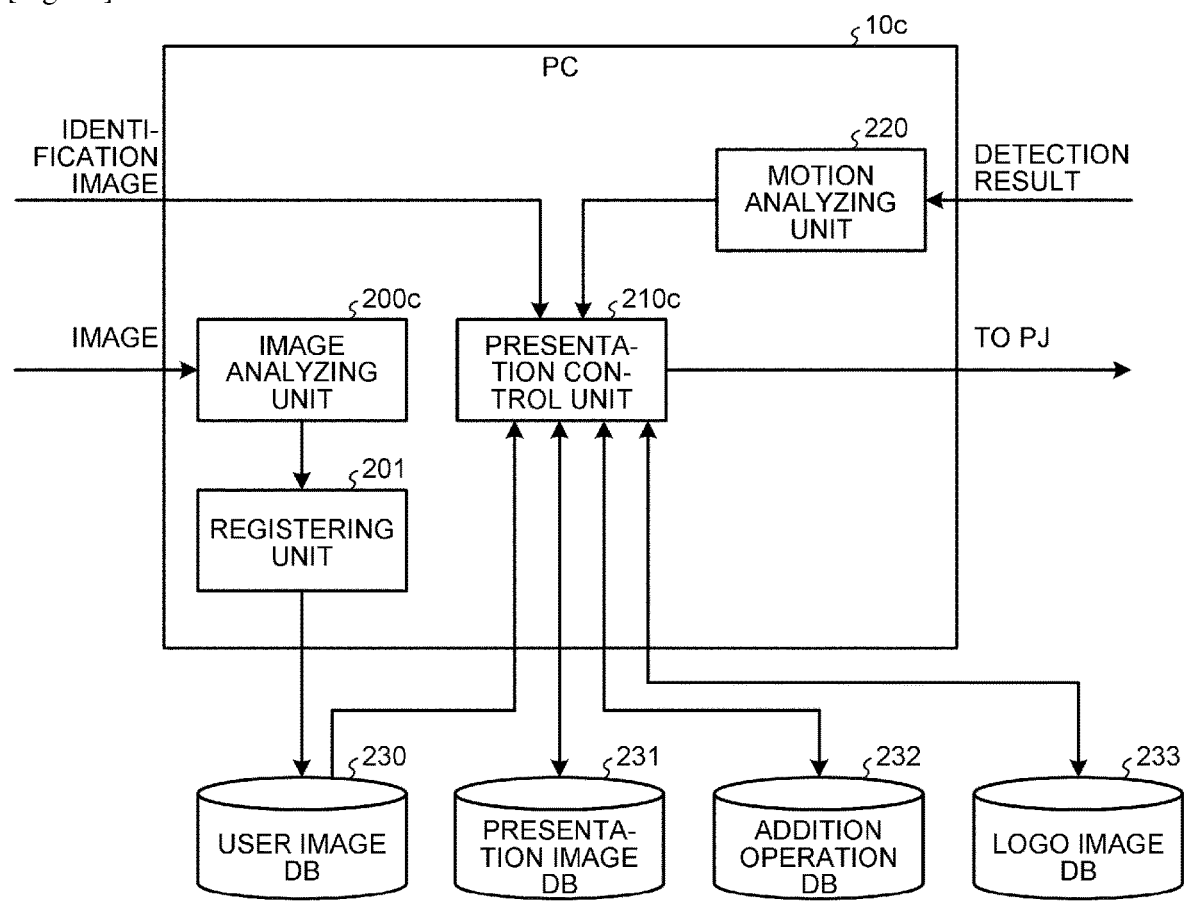

[Fig. 31]
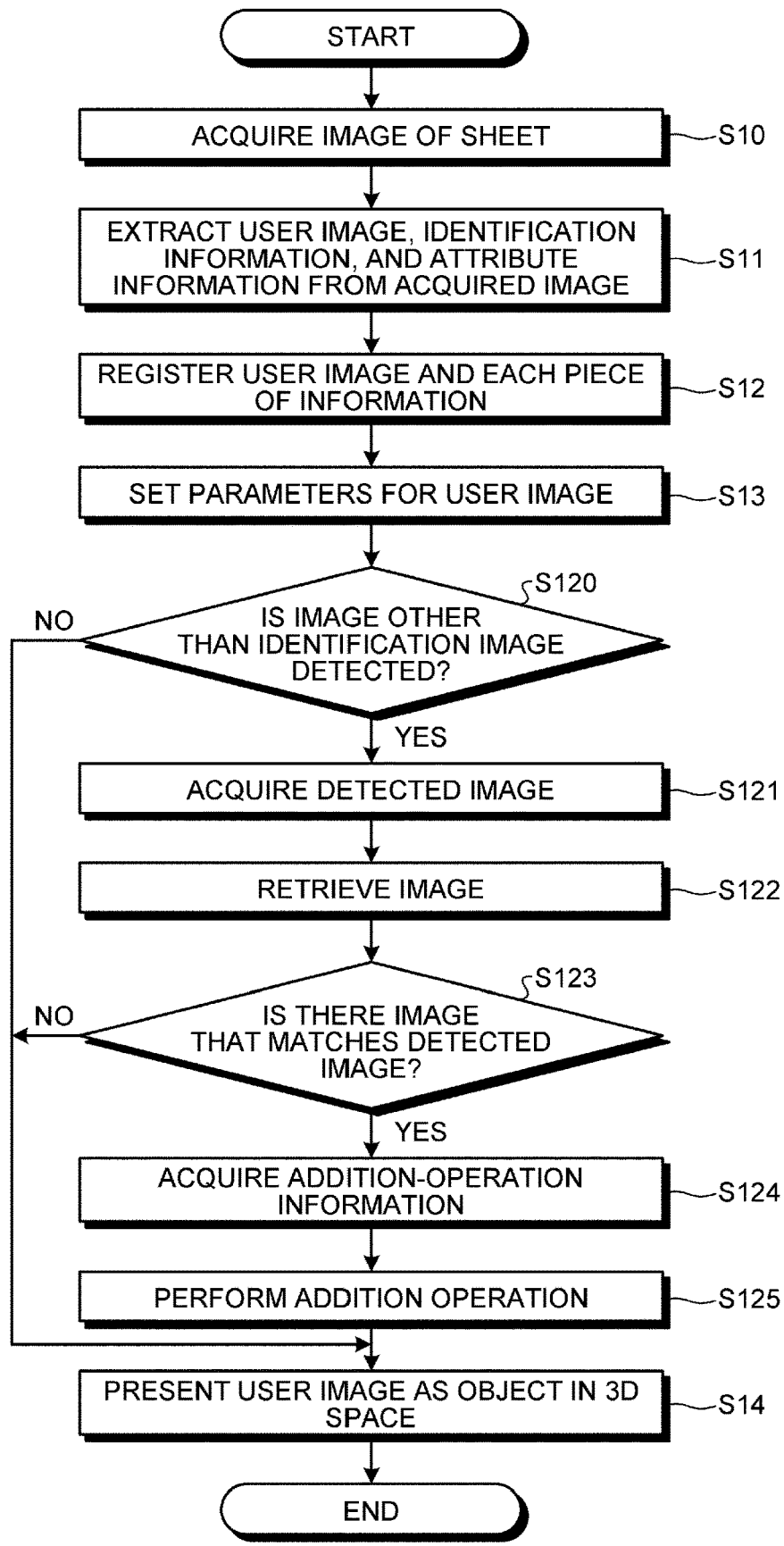

[Fig. 32]
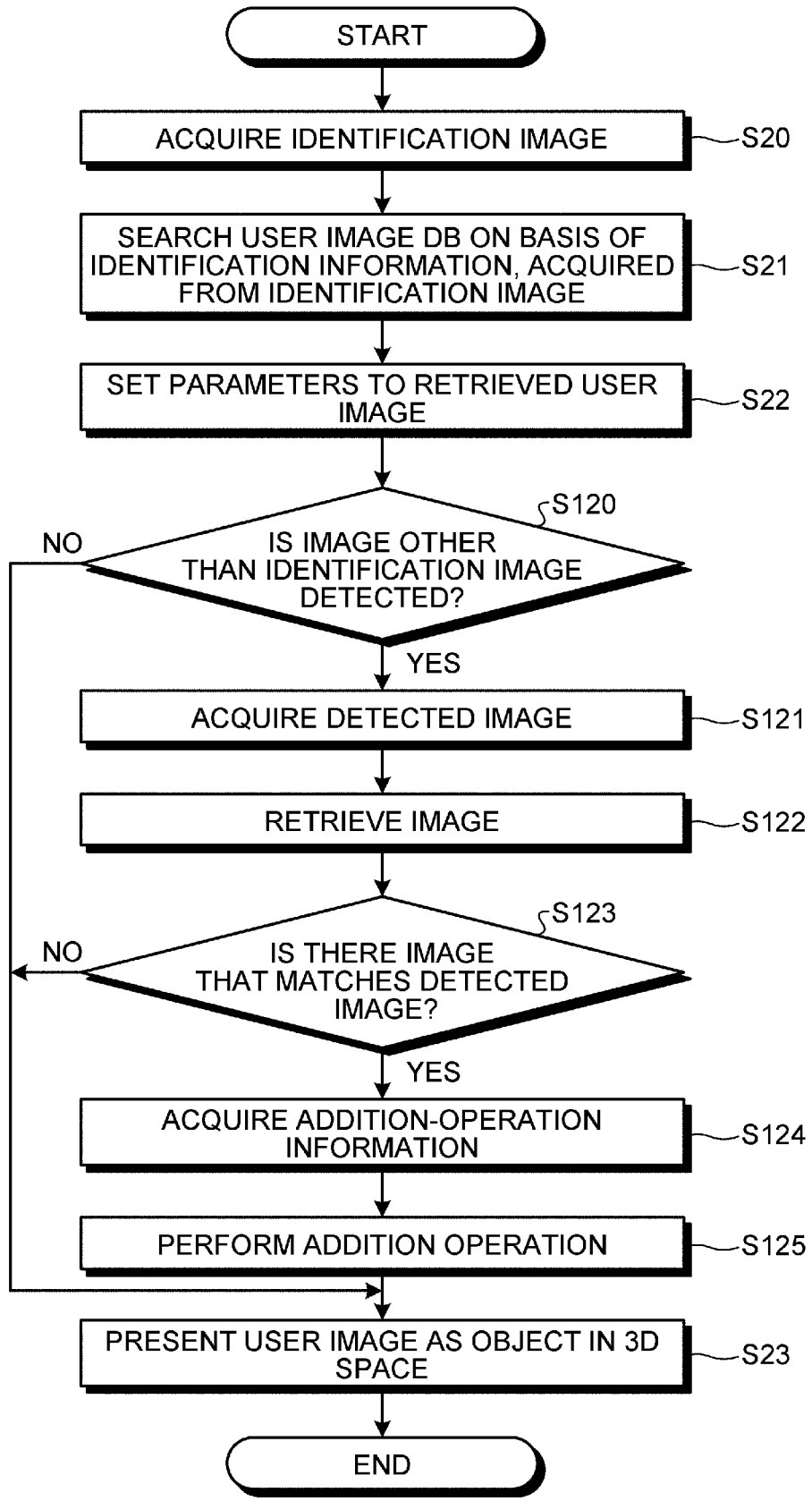

[Fig. 33]
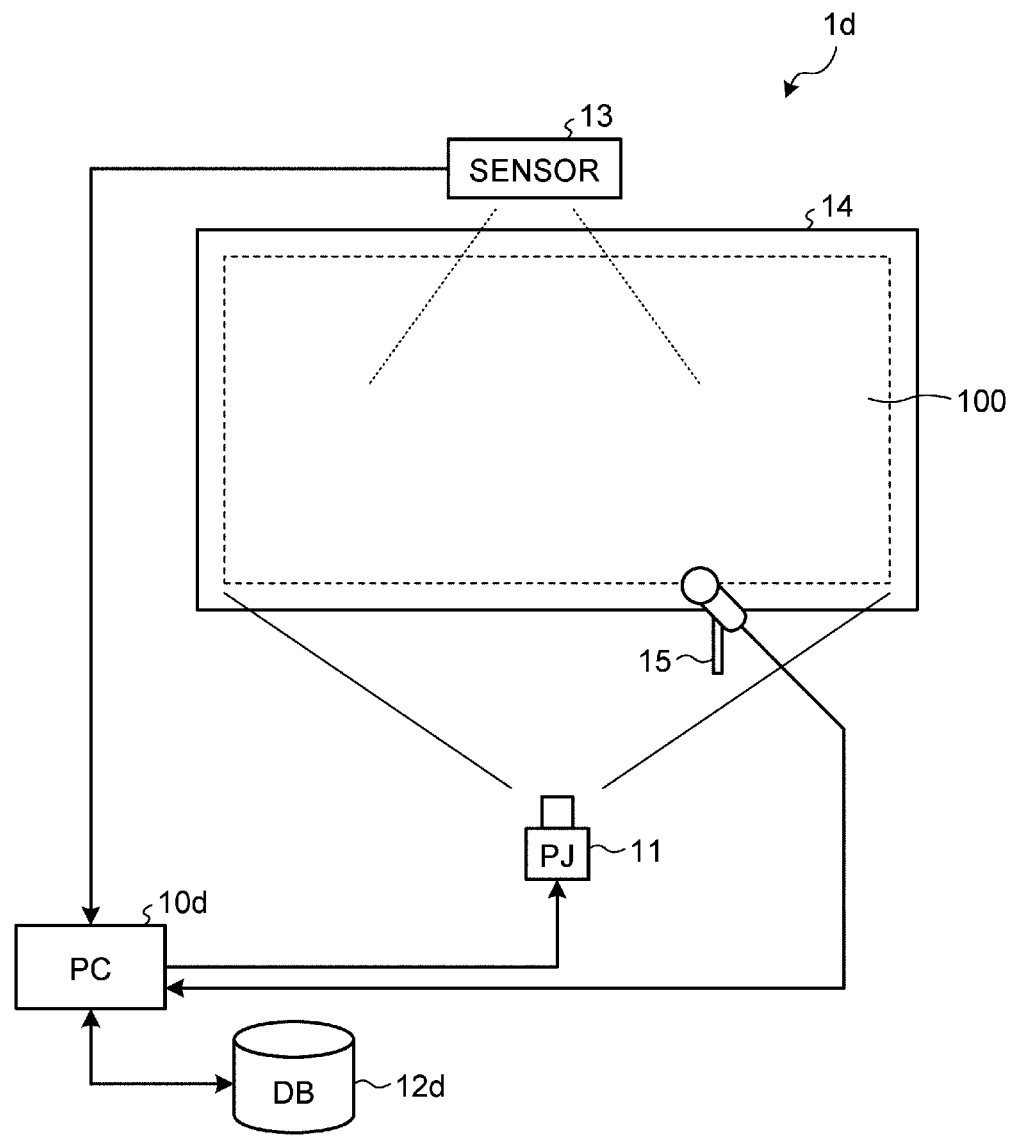
[Fig. 34]
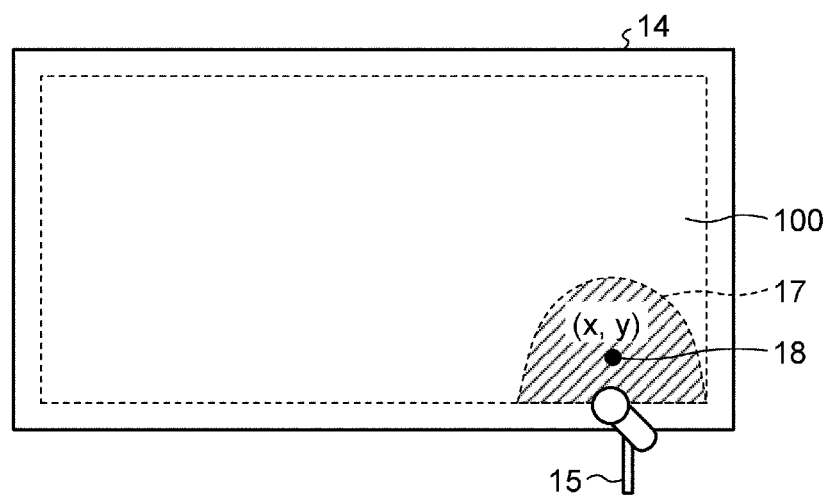

[Fig. 35]
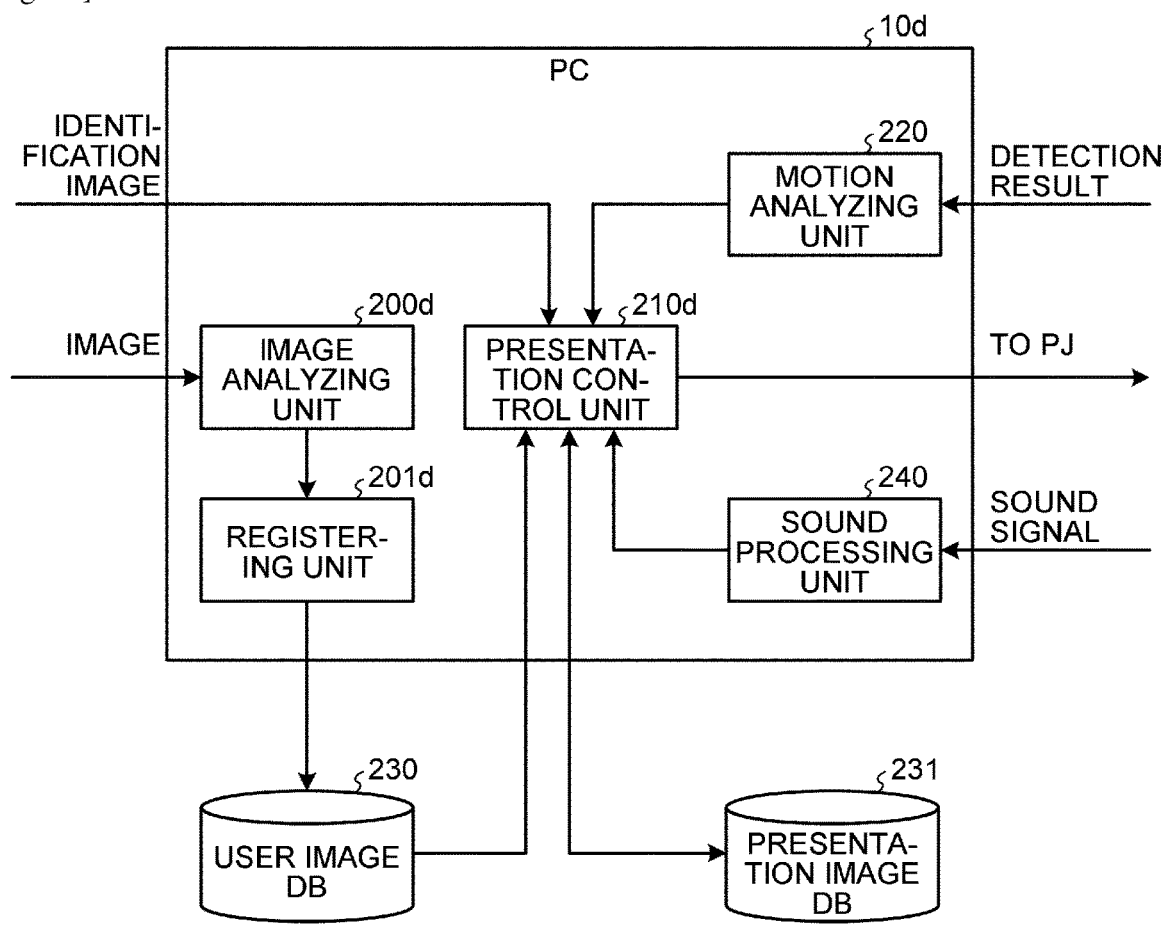

[Fig. 36]
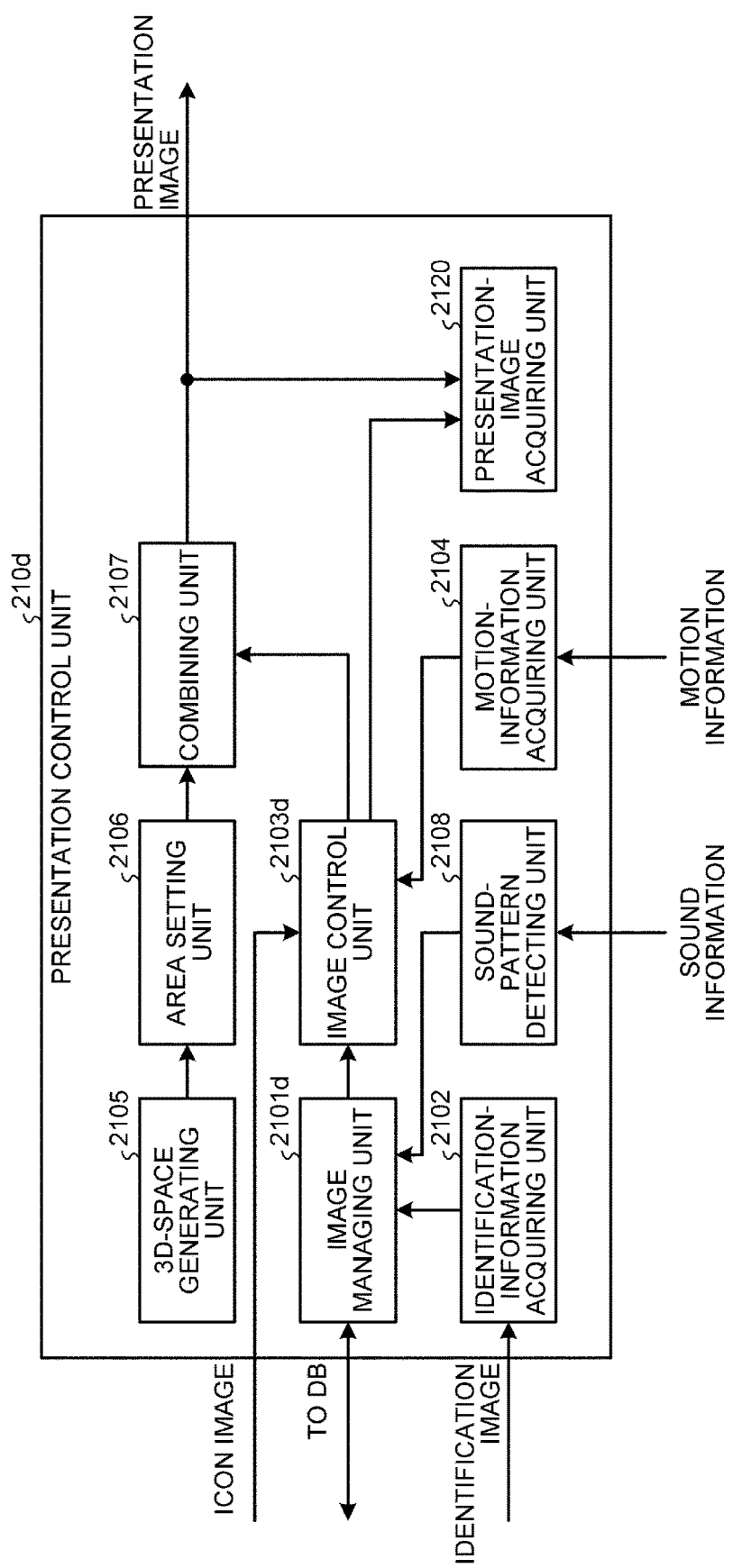

[Fig. 37]
(a)
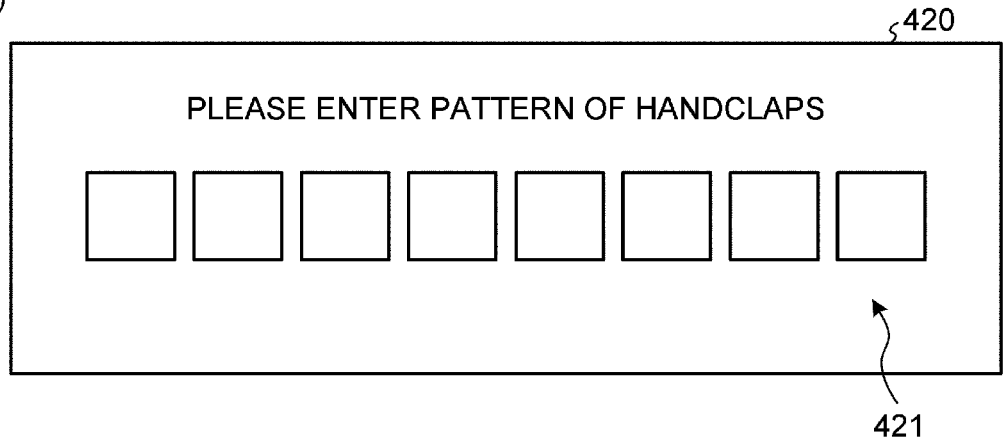
(b)
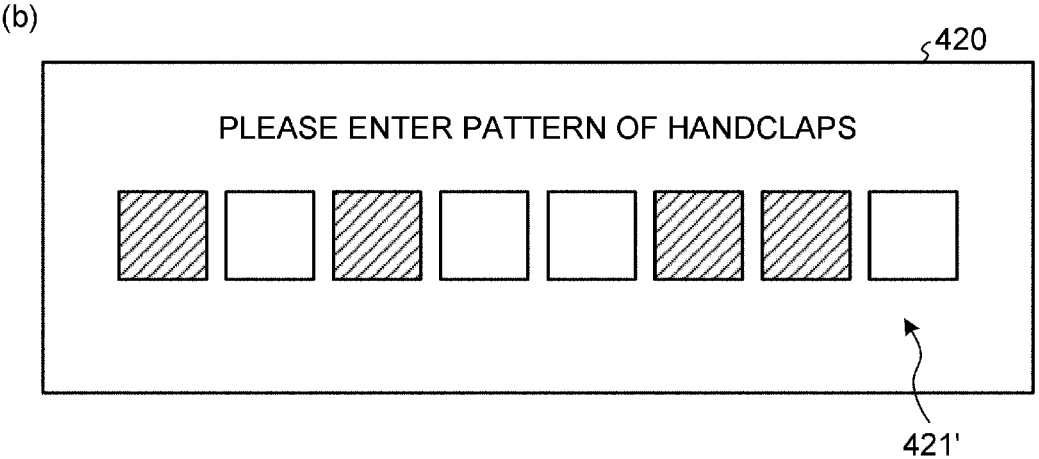

[Fig. 38]
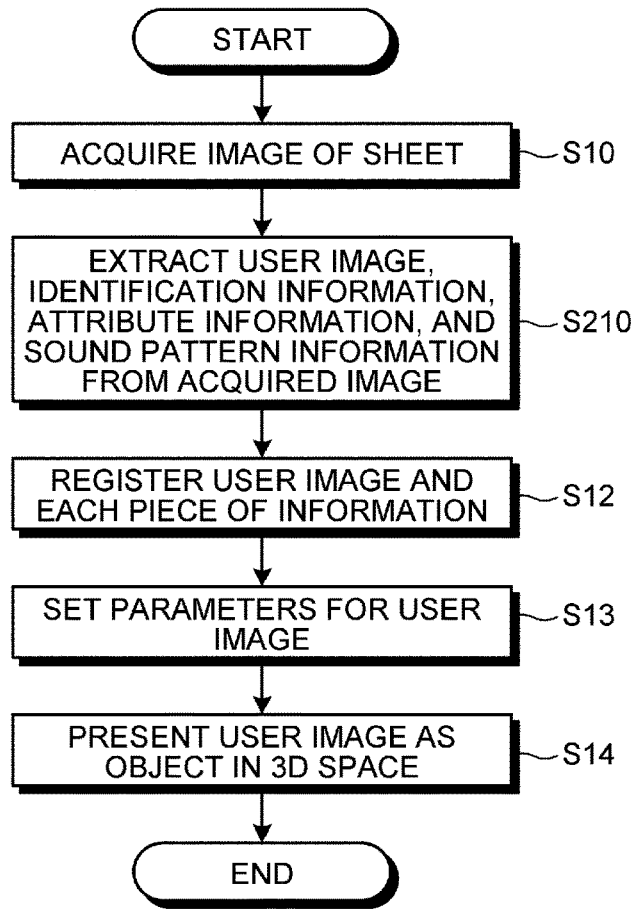
[Fig. 39]
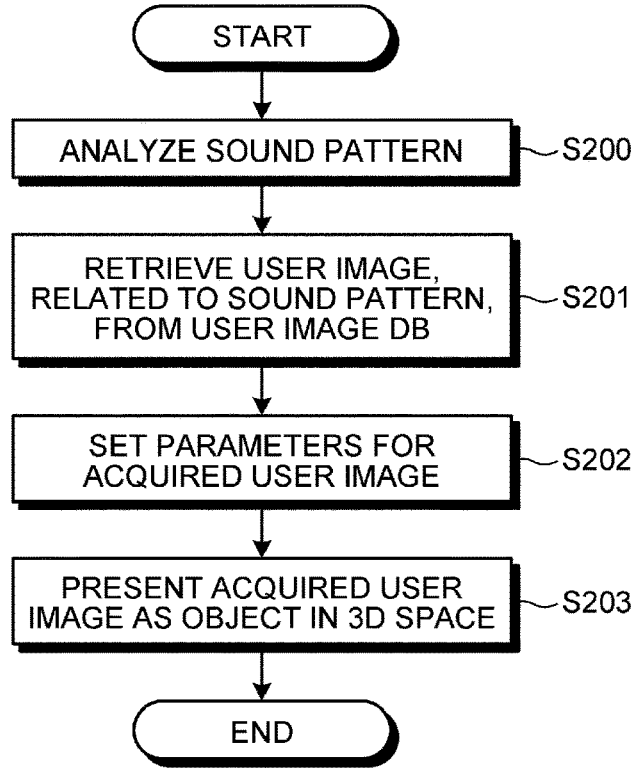

[Fig. 40]
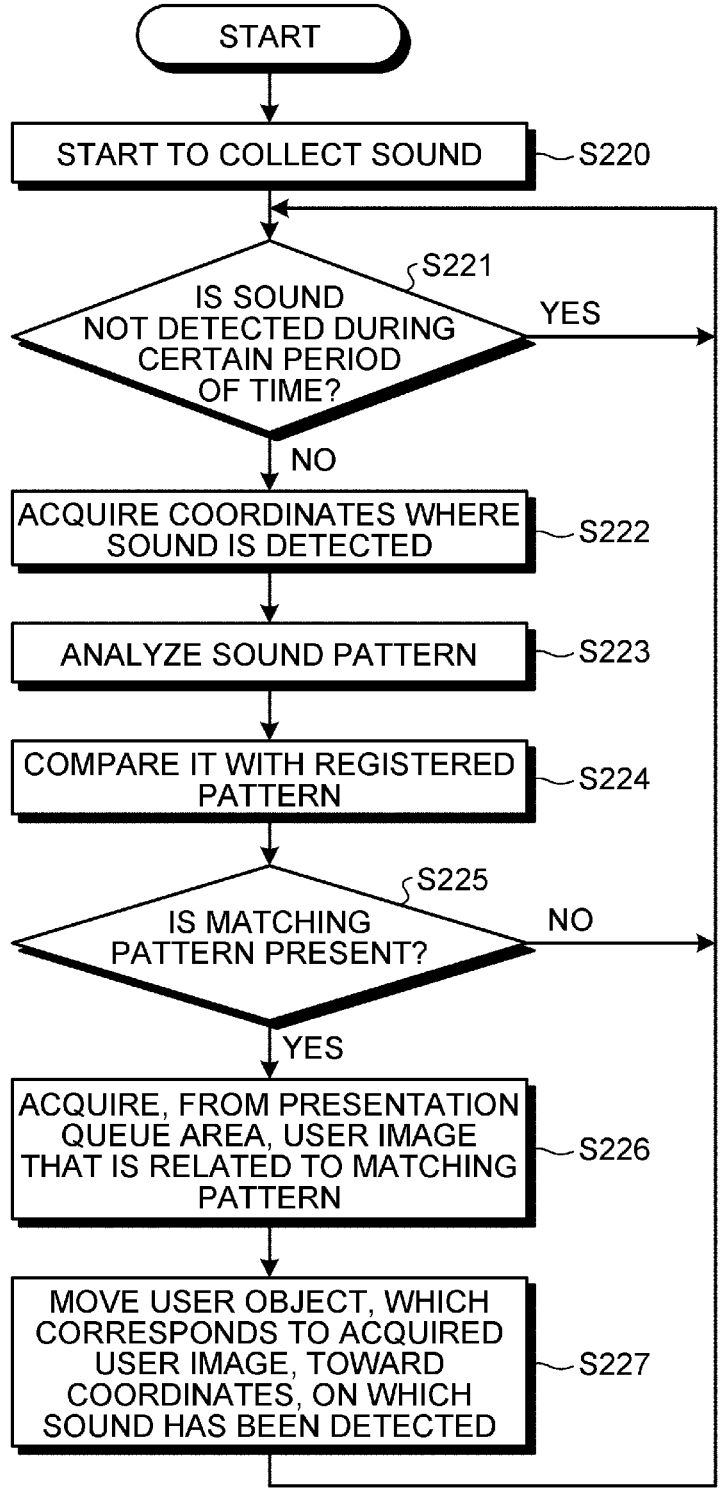

[Fig. 41]
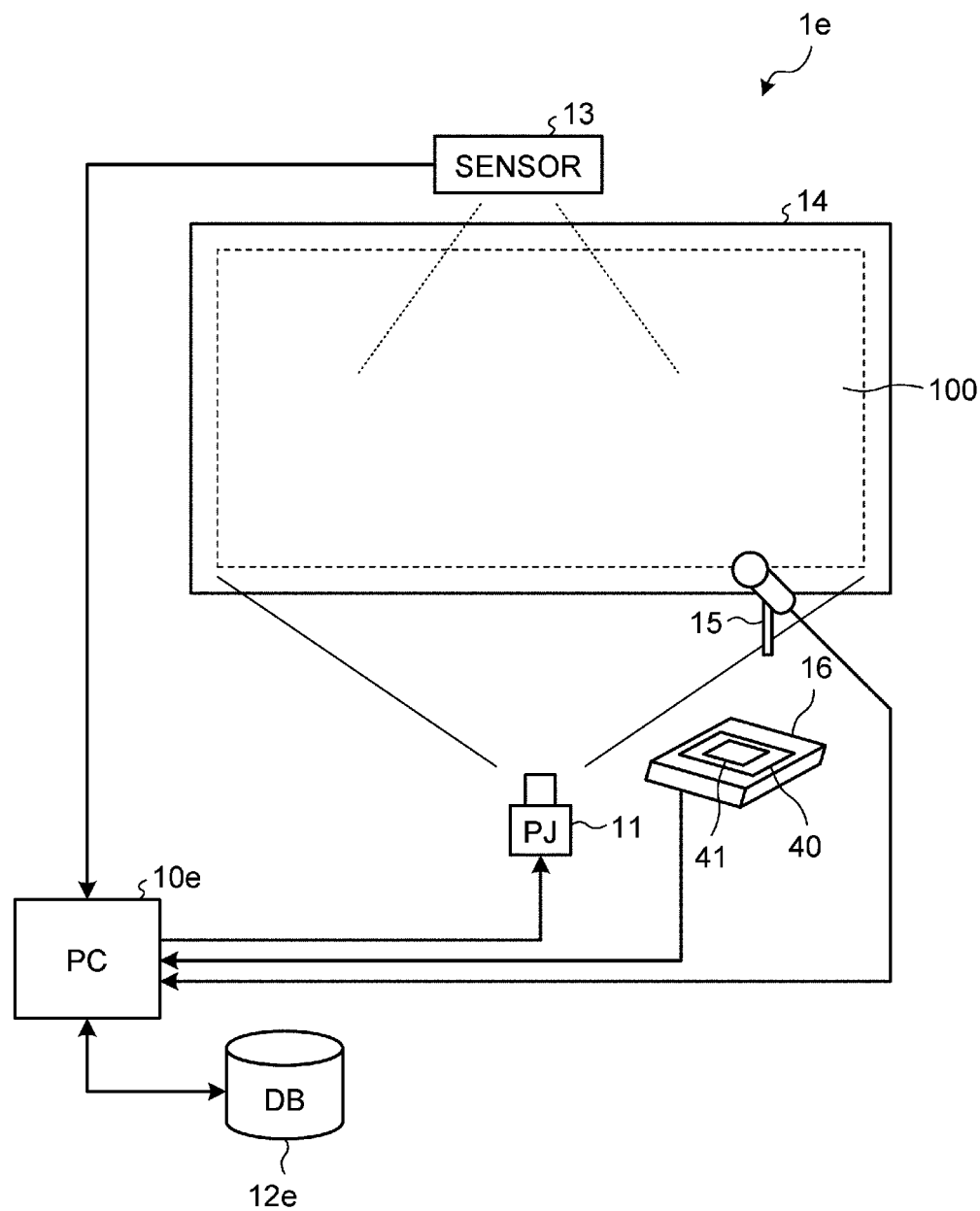

[Fig. 42]
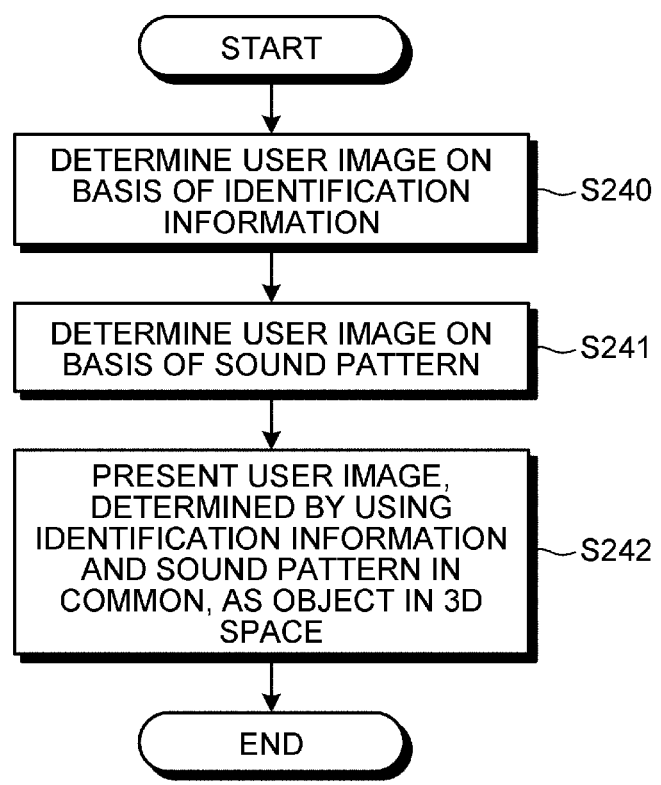

[Fig. 43]
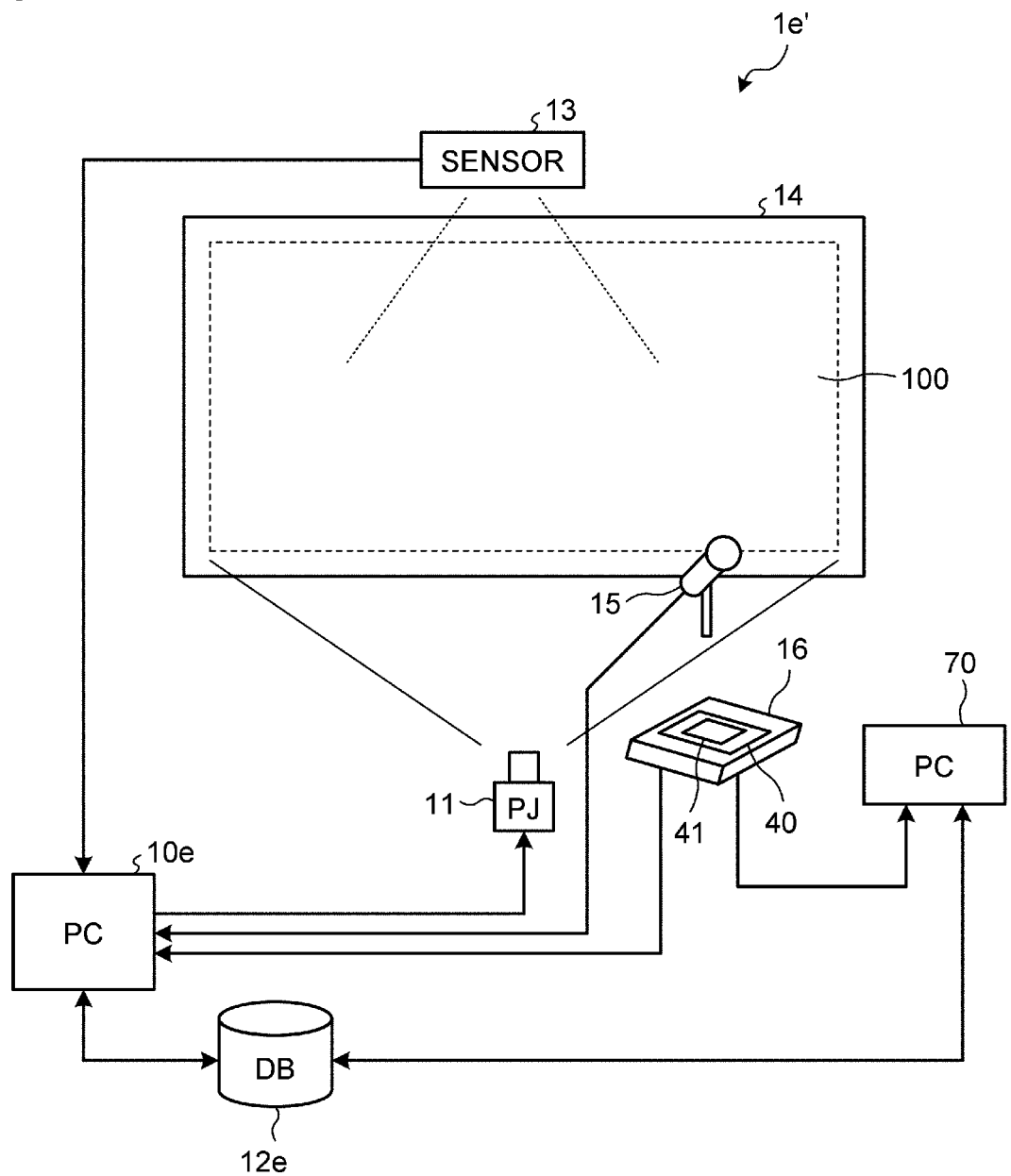

ND PRESENTATION SYSTEM

CROSS-REFERENCE TO RELATED APPLICATIONS

This application is a national phase under 35 U.S.C. § 371 of PCT International Application No. PCT/JP2016/001398 which has an International filing date of Mar. 11, 2016, which claims priority to Japanese Application No. 2015-057887, filed Mar. 20, 2015, the entire contents of each of which are hereby incorporated by reference.

TECHNICAL FIELD

The present invention relates to an image management device, an image management method, an image management program, and a presentation system.

BACKGROUND ART

Due to an improvement in the performance of computer devices in recent years, it is possible to easily present images using computer graphics (hereafter, abbreviated as 3D CG) that use three-dimensional coordinates. Furthermore, in the 3D CG, it is common that a regular or random movement is set to each object that is presented in the three-dimensional coordinate space and it is presented as a moving image. In this type of moving image, it is possible to make a presentation as if each object dependently moves in the three-dimensional coordinate space.

Furthermore, Patent Literature 1 discloses the technology with regard to the screen using the 3D CG, where a movement is given to the image that is created due to the animator's handwriting, and it is presented by being combined with the prepared background image.

SUMMARY OF INVENTION

Technical Problem

Furthermore, there is a need for the technology for easily presenting, on the screen using the 3D CG, the user image that is generated due to handwriting of a typical user, or the like. Moreover, there is a need for the technology for enabling a typical user to easily manage the user image, generated by the user, in a case where the user image is presented on the screen using the 3D CG. For example, there is a possible method for managing user images by registering a user image, generated by a typical user, in a database each time by the user. However, this method requires certain skills for computer operations, and there is a possibility that users who are capable of using it are limited.

Therefore, there is a need to manage a user image, presented by a user, in an easier way.

Solution to Problem

According to an embodiment, there is provided an image management device that includes an image acquiring unit configured to acquire an image of a sheet on which a medium that presents an identification image including identification information is to be placed, the sheet including a user image that is presented by a user; a first identification-information acquiring unit configured to acquire the identification information from the image acquired by the image acquiring unit; an image extracting unit configured to extract the user image from the image acquired by the image acquiring unit; a second identification-information acquiring unit configured to acquire the identification information from the medium alone; and a managing unit configured to store the user image in association with the identification information in a first storage unit, and acquire, from the first storage unit, a user image such that the identification information associated with the user image matches the identification information acquired by the second identification-information acquiring unit, among the user images that are stored in the first storage unit.

Advantageous Effects of Invention

According to the present invention, an advantage is produced such that it is possible to manage a user image, presented by a user, in an easier way.

BRIEF DESCRIPTION OF DRAWINGS

FIG. 1 is a diagram that illustrates an example of the configuration of a presentation system according to a first embodiment.

FIG. 2 is a diagram that illustrates an example of a sheet that is applicable to the first embodiment.

FIG. 3 is a diagram that illustrates a presentation example of a medium according to the first embodiment.

FIG. 4 is a diagram that illustrates an example of the sheet that is placed in an image acquiring device.

FIG. 5 is a diagram that illustrates an example of the image that is projected onto a projected medium according to the first embodiment.

FIG. 6 is a diagram that illustrates an example of the image where a user object is further added according to the first embodiment.

FIG. 7 is a diagram that illustrates an example of an image that presents an icon image according to the first embodiment.

FIG. 8 is a diagram that illustrates an example of the case where a motion is performed to present an icon image in the image according to the first embodiment.

FIG. 9 is a diagram that illustrates another example of the highlight according to the first embodiment.

FIG. 10 is a diagram that illustrates an example of presentation of an icon image, indicating a screen shot, at the position of the motion coordinates according to the first embodiment.

FIG. 11A is a diagram that illustrates an example of the structure of an image according to the first embodiment.

FIG. 11B is a diagram that illustrates an example of the structure of the image according to the first embodiment.

FIG. 12 is a block diagram that illustrates an example of the configuration of a PC that is applicable to the first embodiment.

FIG. 13 is an example of the functional block diagram that illustrates the functionality of the PC that is applicable to the first embodiment.

FIG. 14 is an example of the functional block diagram that illustrates the functionality of an image analyzing unit according to the first embodiment.

FIG. 15 is an example of the functional block diagram that illustrates the functionality of a presentation control unit according to the first embodiment.

FIG. 16 is an example of the flowchart that schematically illustrates an operation in a case where the image, acquired by an image acquiring device, is presented according to the first embodiment.

FIG. 17 is an example of the flowchart that schematically illustrates an operation in a case where an identification image is acquired by an identification-image reading device according to the first embodiment.

FIG. 18 is an example of the flowchart that illustrates an operation to present an icon image in response to motion detection according to the first embodiment.

FIG. 19 is an example of the flowchart that illustrates an operation of an image analyzing unit according to the first embodiment.

FIG. 20 is a diagram that illustrates an operation to extract each image from the sheet according to the first embodiment.

FIG. 21 is an example of the flowchart that illustrates an operation to register the identification information, the attribute information, and the user image in a user image DB according to the first embodiment.

FIG. 22 is a diagram that illustrates generation of management information by relating the attribute information and the user image to the identification information.

FIG. 23 is a diagram that illustrates an example of the display screen that displays the folder structure of the user image DB according to the first embodiment.

FIG. 24 is a diagram that illustrates an example of the structure of a file that stores the attribute information according to the first embodiment.

FIG. 25 is a diagram that illustrates an example of the log information according to the first embodiment.

FIG. 26 is an example of the flowchart that illustrates an operation to retrieve a user image by using log information according to the first embodiment.

FIG. 27 is an example of the functional block diagram that illustrates the functionality of a PC that controls an operation of a presentation system according to a first modified example of the first embodiment.

FIG. 28 is an example of the flowchart that schematically illustrates an operation in a case where an image, acquired by the image acquiring device, is presented according to the first modified example of the first embodiment.

FIG. 29 is a diagram that illustrates an example of a medium that presents the logo image together with the identification image according to a second modified example of the first embodiment.

FIG. 30 is an example of the functional block diagram that illustrates the functionality of a PC that controls an operation of a presentation system according to the second modified example of the first embodiment.

FIG. 31 is an example of the flowchart that schematically illustrates an operation in a case where the image, acquired by the image acquiring device, is presented according to the second modified example of the first embodiment.

FIG. 32 is an example of the flowchart that schematically illustrates an operation in a case where the image of the medium is acquired by the identification-image reading device according to the second modified example of the first embodiment.

FIG. 33 is a diagram that illustrates an example of the configuration of a presentation system according to a second embodiment.

FIG. 34 is a diagram that illustrates that the movement of a user object is controlled in accordance with the position of a microphone according to the second embodiment.

FIG. 35 is an example of the functional block diagram that illustrates the functionality of a PC according to the second embodiment.

FIG. 36 is an example of the functional block diagram that illustrates the functionality of a presentation control unit according to the second embodiment.

FIG. 37 is a diagram that illustrates an example of the format for designating a sound pattern by a user according to the second embodiment.

FIG. 38 is an example of the flowchart that schematically illustrates an operation in a case where the image, acquired by the image acquiring device, is presented according to the second embodiment.

FIG. 39 is an example of the flowchart that schematically illustrates an operation to present a user image on the basis of a sound pattern according to the second embodiment.

FIG. 40 is an example of the flowchart that illustrates a presentation operation in a case where the user object due to the user image, to which the sound pattern is related, has been already presented in the image according to the second embodiment.

FIG. 41 is a diagram that illustrates an example of the configuration of a presentation system according to a first modified example of the second embodiment.

FIG. 42 is an example of the flowchart that schematically illustrates an operation according to the first modified example of the second embodiment.

FIG. 43 is a diagram that illustrates an example of the configuration of a presentation system in which a PC for operation guide is provided according to a second modified example of the second embodiment.

DESCRIPTION OF EMBODIMENTS

With reference to the attached drawings, a detailed explanation is given below of an embodiment of an image management device, an image management method, an image management program, and a presentation system.

Schematic Configuration According to a First Embodiment

FIG. 1 illustrates an example of the configuration of a presentation system according to a first embodiment. In FIG. 1, a presentation system 1a includes a computer (PC) 10a, a projector (PJ) 11, a database (DB) 12a, a sensor 13, an image acquiring device 20, and an identification-image reading device 21. The PC 10a is provided with the image management program according to the first embodiment, and it controls an operation of the presentation system 1a in accordance with the image management program. The PJ 11 projects an image 100 onto a projected medium 14 in accordance with an image signal that is output from the PC 10a.

The sensor 13 detects the position of an object. For example, the sensor 13 is provided with a built-in camera so that it is capable of detecting the distance to a target object or the position of a target object on the basis of the image of the target object, included in the captured image that is acquired by the camera. The sensor 13 is provided on the projected surface of the projected medium 14. The sensor 13 may be provided on the upper section or the lower section of the projected medium 14 or may be provided on the left, right, top, or bottom thereof as long as it is provided on the projected surface of the projected medium 14. Detection results of the sensor 13 are fed to the PC 10a.

For example, Kinect (registered trademark) by Microsoft Corporation in the United States of America may be used as the sensor 13. This example is not a limitation, and the sensor 13 may detect the position of a moving body, which is a target, by using the combination of a capturing unit and an image processing unit, where the image processing unit analyzes the captured image, or it may detect it by using infrared rays, ultrasonic waves, or the like.

The DB 12a includes multiple databases, and it stores, for example, images (image data), with which the PC 10a causes the PJ 11 to conduct projection onto the projected medium 14.

The image acquiring device 20 includes, for example, a camera, and it captures a sheet 50, which is placed in a predetermined manner, by using the camera and acquires the image of the sheet 50. As a more specific example, the image acquiring device 20 includes a camera, an image capturing table, on which the sheet 50 is placed, and a jig for fixing the camera at a predetermined distance and position relative to the image capturing table. For example, when the sheet 50 is placed on the image capturing table and a predetermined operation is performed on the image acquiring device 20, the image of the sheet 50 is captured by the camera, and the captured image is output from the camera. The image acquiring device 20 feeds the acquired image to the PC 10a. The image acquiring device 20 may be not only a camera but also a scanner device that acquires an image by scanning the image while using an image sensor.

The identification-image reading device 21 acquires an image of a medium 40, reads an identification image 41, which is presented on the medium 40, from the acquired image, and feeds it to the PC 10a.

Here, a printable printing medium, such as paper or resin film, may be used as the medium 40. For example, the service provider, who provides a service using the presentation system 1a, uses a PC 30 to generate an identification image on the basis of the identification information that is set in accordance with a predetermined format and uses a printer 31 to print the generated identification image on the medium 40. In this case, it is possible to generate the multiple media 40, 40, ... , on which the different identification images 41 are printed.

Furthermore, the medium 40 is not limited to a printing medium. As the medium 40, for example, what is called a tablet device may be used, which includes a central processing unit (CPU) or a data communication function and which is capable of presenting an image on a thin display that is integrally formed with a chassis. In this case, an identification image, which is transmitted from outside, for example, is received by using the data communication function, and the identification image is presented on the display in accordance with the received identification image.

For example, an image that is coded from the identification information, including a character string, may be used as the identification image 41. For example, two-dimensional codes, such as QR code (registered trademark), may be used as the identification image 41. This is not a limitation, and the character string, indicating the identification information, may be directly printed so as to be used as the identification image 41, or a code that is obtained by generating identification information as an image by using a method different from the QR code (registered trademark) may be used.

The identification information, which is used in the identification image 41, may be generated by using, for example, the following Equation (1). Here, in Equation (1), the addition symbol "+" indicates the connection of character strings.

$$\text{Identification information}=(\text{fixed code})+(\text{time information that indicates the time when identification information is generated}) \quad (1)$$

Among them, the fixed code is, for example, the code that is defined for each service provider. This is not a limitation, and the fixed code may be configured by using the combination of a first fixed code and a second fixed code. In this case, for example, it is possible that the first fixed code is the code that indicates the provider of the presentation system 1a, and the second fixed code is the code that is defined for each service provider. In this case, it is possible that the second fixed code is previously notified to the PC 10a by the PC 30.

Furthermore, the time (e.g., the time that is measured by the PC 30) in the environment for generating the identification image 41 may be used as the time information. For example, if the identification image 41 is printed and formed on the medium 40, it is possible that the PC 30 acquires the time information that indicates the time during each operation to print the identification image 41 on the medium 40. In this case, the time information is acquired as the 6-digit information that includes at least the hour, minute, and second. The time information may include more detailed units, and it may include the units of day, month, or the like.

Furthermore, the identification information is not limited to the example of Equation (1). For example, the identification information may be configured by using only the time information that indicates the time when the identification information is generated.

In this example, the sheet 50 presents a hand drawing area 43 for hand drawing of a picture by a user 2 and an attribute setting area 42 for setting the attribute of the picture that is drawn on the hand drawing area 43. Furthermore, the sheet 50 is provided with an area, where the medium 40 may be placed without being overlapped with the attribute setting area 42 and the hand drawing area 43.

FIG. 2 illustrates an example of the sheet 50 that is applicable to the first embodiment. On the sheet 50 that is illustrated in FIG. 2 are provided the drawing area 43 for hand drawing of a picture, the attribute setting area 42 for setting the attribute of a picture that is drawn on the drawing area 43, and a placement area 44, on which the medium 40 is placed. In the example of FIG. 2, the placement area 44 presents a frame border that makes it easier for a user to recognize it. Furthermore, in the example of FIG. 2, six attributes, i.e., "walk", "move ahead", "jump", "plant", "building", and "swim", are settable on the attribute setting area 42.

Furthermore, markers $51_1$, $51_2$, and $51_3$ are provided on the three corners out of the four corners of the sheet 50. The markers $51_1$, $51_2$, and $51_3$ are detected from the document image that is acquired from the image of the sheet 50 by the image acquiring device 20 so that the orientation and the size of the sheet 50 may be determined.

FIG. 3 illustrates a presentation example of the medium 40 according to the first embodiment. In this way, the identification image 41 is presented on the medium 40. In the example of FIG. 3, the identification image 41 is presented in almost the middle of the medium 40; however, this example is not a limitation, and the identification image 41 may be presented in any position of the medium 40. Furthermore, according to the first embodiment, only the identification image 41 may be presented on the medium 40; however, different information (e.g., a logo image) may be presented on the medium 40 together with the identification image 41.

Schematic Operation of the Presentation System According to the First Embodiment Next, an operation of the presentation system 1a according to the first embodiment is schematically explained with reference to FIG. 1. Here, for explanations, the presentation system 1a is installed in the event site that is hosted by the service provider. The service provider uses the PC 30 and the printer 31 to prepare the media 40, 40, . . . , on which the identification image 41 is printed on the basis of different identification information, in advance or in the site. Furthermore, the service provider also prepares the sheets 50, 50, . . .

When the user 2 comes to the site, the user 2 receives the medium 40 and the sheet 50 from the service provider. The user 2 draws a picture on the hand drawing area 43 of the sheet 50 and sets an attribute of the drawn picture on the attribute setting area 42. Then, the sheet 50 is placed on the image acquiring device 20, and the medium 40 is placed on the placement area 44 of the sheet 50 such that the identification image 41 is presented on the front side.

FIG. 4 illustrates an example of the sheet 50 that is placed in the image acquiring device 20. In FIG. 4, a picture 45 is drawn on the hand drawing area 43 of the sheet 50. Here, the picture 45 is not always directly drawn on the sheet 50 by hand, but a seal, or the like, on which the picture 45 has been already drawn, may be attached or placed, or an image, generated by a different PC, or the like, may be printed on the hand drawing area 43 of the sheet 50.

Furthermore, in the example of FIG. 4, it is understood that the frame of the second attribute "move ahead" in the upper section is painted on the attribute setting area 42 and the attribute "move ahead" is set for the picture 45. Furthermore, the medium 40 is placed on the placement area 44.

In this way, while the sheet 50 is placed in the image acquiring device 20, for example, the user 2 performs an operation to instruct the image acquiring device 20 to acquire the image of the sheet 50. In response to this operation, the image acquiring device 20 captures the image of the sheet 50 and outputs the image of the sheet 50, which is acquired during capturing. After the image is output from the image acquiring device 20, it is fed to the PC 10a.

The PC 10a analyzes the image, fed from the image acquiring device 20, and acquires the identification image 41, included in the image, the image of the attribute setting area 42, and the image of the hand drawing area 43. The PC 10a analyzes the acquired identification image 41 to extract the identification information from the identification image 41. Furthermore, the PC 10a analyzes the image of the attribute setting area 42 to acquire the set attribute. Furthermore, the PC 10a extracts the image of the picture 45 from the hand drawing area 43. Hereafter, the image of the picture 45 is referred to as the user image.

The PC 10a stores, in the DB 12a, the user image and the attribute, acquired from the image of the sheet 50, in association with the identification information that is extracted from the image of the sheet 50. Also, the PC 10a transmits the user image to the projector 11 so that it is projected onto the projected medium 14. At this point, the PC 10a applies, to the user image, the parameters of movements or coordinates on the basis of the attribute. Furthermore, the PC 10a applies, to the user image, the parameters of further movements and coordinates based on the user image itself.

The different pictures 45 are drawn on the sheets 50, and the operation to acquire the image of the sheet 50 and the subsequent operations are repeatedly performed on each of the sheets 50 by the above-described image acquiring device 20, whereby the user 2 may present multiple user images on the projected medium 14. Here, as the identification image 41 is acquired from the medium 40 that is placed on the sheet 50, the same identification image 41 may be acquired from the different sheets 50. Therefore, the common identification information may be associated with multiple user images.

Presentation Example of the User Image

Next, an explanation is given of an example of the presentation of a user image that is applicable to each embodiment in common. FIG. 5 illustrates an example of the image that is projected onto the projected medium 14 according to the first embodiment. In FIG. 5, the image 100 is projected onto the projected medium 14. In this example, the image 100 includes a background image 110 and an image (fixed object) 111 that includes a fixed object.

Furthermore, in the example of FIG. 5, the background image 110 includes a sky area 110a and a land area 110b, and the land area 110b is an image that has a depth from the lower end of the image 100 toward the boundary between the land area 110b and the sky area 110a. Specifically, the image 100 has the coordinate axes (the axis x and the axis y) that each indicate a position in a horizontal direction and in a vertical direction and has the axis z that is a coordinate axis that indicates a position in a depth direction. Therefore, the position of each image, presented in the image 100, is represented by using the coordinates (x, y, z) along the three coordinate axes (the axis x, the axis y, and the axis z).

Furthermore, in FIG. 5, an icon image 112, which is presented on the upper left corner of the image 100, is provided to acquire a screen shot of the image 100.

The image 100 may further present images $120_1$ to $120_4$ based on the user images. Hereafter, the images, which are presented in the image 100 based on the user images, are referred to as user objects. In this example, the user objects $120_1$ to $120_4$ are associated with the same identification information. Furthermore, the user objects $120_2$ and $120_3$ are presented in the image 100 such that they are fixedly positioned on the basis of the attribute that is acquired from the attribute setting area 42. Conversely, the user objects $120_1$ and $120_4$ are presented in the image 100 such that they are moving on the land area 110b at a predetermined speed on the basis of the attribute.

As illustrated in FIG. 6, a user object may be further added in the state where the user objects $120_1$ to $120_4$ are presented in the image 100 as described above. With regard to the image 100 in FIG. 6, user objects $120_{10}$ to $120_{13}$ are added to the image 100 in FIG. 5.

For example, a user (a second user) who is different from the user (a first user), who presents the above-described user objects $120_1$ to $120_4$, uses the medium 40 that presents the identification information 41 that is different from the identification information 41 that is presented on the medium 40, owned by the first user, to cause the image acquiring device 20 to acquire the images of the sheets 50, 50, . . . , on which the pictures 45 are drawn. Thus, the user objects $120_{10}$ to $120_{13}$ are presented on the basis of the user images in the image 100, and each user image and the attribute are additionally stored in the DB 12a in association with the identification information 41.

In the example of FIG. 6, the user object $120_{10}$ is presented in the image 100 such that it is moving in the sky area 110a at a predetermined speed on the basis of the attribute that is acquired from the attribute setting area 42 of the sheet 50. Furthermore, the user objects $120_{12}$ and $120_{13}$ are presented in the image 100 such that they are moving in the land area 110b at a predetermined speed on the basis of the attribute. Furthermore, the user object $120_{11}$ is presented in the image 100 such that it is fixedly positioned on the basis of the attribute. Furthermore, in FIG. 6, the user objects $120_1$ and $120_4$ are presented in the image 100 such that the positions of them are moved relative to the state in FIG. 5.

Furthermore, as described above, the image of the sheet 50 is acquired by the image acquiring device 20 so that the image is presented in the image 100 on the basis of the user image that is included in the sheet 50. According to the first embodiment, an image may be further presented in the image 100 on the basis of the user image, stored in the DB 12a.

For example, the identification information is previously stored in the DB 12a in association with the user images and the attributes, which correspond to the user objects $120_{10}$ to $120_{13}$ by the above-described second user. Furthermore, as illustrated in FIG. 5, the user objects $120_1$ to $120_4$ of the first user have been already presented in the image 100.

In this state, the second user places the medium 40, which is used when each of the images that correspond to the user objects $120_{10}$ to $120_{13}$ is acquired from the sheet 50, on the identification-image reading device 21 and instructs the identification-image reading device 21 to read the identification image 41. In accordance with the instruction, the identification-image reading device 21 reads the identification image 41 on the medium 40 and transmits it to the PC 10a.

The PC 10a analyzes the identification image 41, which is transmitted from the identification-image reading device 21, to acquire the identification information. The PC 10a searches the DB 12a on the basis of the acquired identification information to acquire the user image and the attribute that are associated with the acquired identification information. The PC 10a presents the user image, which is acquired from the DB 12a as described above, in the image 100 in accordance with the attribute. Thus, in the image 100, as is the case with FIG. 6, the user objects $120_{10}$ to $120_{13}$ by the second user are added to the user objects $120_1$ to $120_4$ by the first user.

Thus, as the second user stores the identification image 41, which is used when the user image is stored in the DB 12a, it may read the previously generated user image from the DB 12a and present it in the image 100.

That is, with the presentation system 1a according to the first embodiment, the image of the medium 40, which presents the identification image 41, is placed on the sheet 50, and the image of the sheet 50, including the medium 40, is acquired, whereby the user image based on the picture, which is provided by a user, may be managed by being associated with the identification information that is indicated by the identification image 41. Furthermore, as the identification image 41 is presented on the medium 40, which is a member separated from the sheet 50, a user may sequentially apply the medium 40 to the sheets 50 and may manage many pictures in group as the user images by using the identification information.

Example of an Operation in Accordance with a User's Motion

Next, an explanation is given of a change in presentation in accordance with a user's motion, applicable to each embodiment in common. According to the first embodiment, while the image 100 is presented, a user causes the sensor 13 to detect some kind of motion so that a change may be made to the states of the image 100 and each user object in the image 100.

For example, the user performs an operation to move the position of an object within the detection range of the sensor 13, e.g., puts his/her arm forward or waves his/her arm in front of the projected medium 14 that is presenting the image 100. This operation is referred to as a motion. The sensor 13 detects the motion, i.e., detects the object within the detection range, and outputs the positional information that indicates the position where the motion is detected. The positional information is fed to the PC 10a. The PC 10a generates the coordinates in the image 100 on the basis of the positional information that is fed from the sensor 13. Hereafter, the coordinates are referred to as the motion coordinates. Furthermore, the PC 10a may divide motions into multiple types of actions in accordance with a detection result of the sensor 13.

Furthermore, the DB 12a previously stores an image that is to be presented in the image 100 in accordance with a user's motion. Hereafter, the image is referred to as an icon image if not otherwise specified. For example, an icon image is associated with each area in the image 100 and is stored in the DB 12a. For example, the sky area 110a and the land area 110b, which are explained with reference to FIG. 5, may be applied to each area of the image 100. The area is not limited to the sky area 110a or the land area 110b, and other areas, such as water area that corresponds to waterfront, may be further added. An icon image may be associated with multiple areas.

The PC 10a determines which area among the areas in the image 100 includes the generated motion coordinates. In accordance with a determination result, the PC 10a reads, from the DB 12a, the icon image that is associated with the area that includes the motion coordinates. Then, the PC 10a presents the icon image, which is read from the DB 12a, at the position that is indicated by the motion coordinates in the image 100.

FIG. 7 illustrates an example of the image 100 that presents the icon image as described above. In the example of FIG. 7, icon images $130_1$ and $130_2$ are presented on the upper left corner and near the center of the image 100. Specifically, in accordance with a user's motion on the upper left corner of the image 100, the icon image $130_1$, associated with the sky area 110a, is presented. In the same manner, in accordance with a user's motion near the center of the image 100, the icon image $130_2$, associated with the land area 110b, is presented.

Furthermore, the icon images $130_1$ and $130_2$ are presented with priority over the background image 110, the fixed object 111, and the user objects $120_1$ to $120_4$ and $120_{10}$ to $120_{13}$.

Furthermore, if the area that includes the motion coordinates is associated with multiple icon images, the PC 10a selects a single icon image from the icon images at random in accordance with a predetermined user motion and presents it in the image 100. If the user desires to switch the presented icon image to another icon image, the user performs the motion at the same position again. The PC 10a selects a single icon image from the icon images, which are associated with the area, at random, deletes the currently presented icon image, and presents the selected icon image. Here, the number of times a predetermined motion is performed at the same position may be measured, and only an operation to delete the icon may be performed at every predetermined time. Furthermore, if a motion is continuously performed during more than a certain period of time, the icon image may be moved.

In accordance with the presentation of the icon image relative to the image 100, it is possible to change the state of the user object that has been already presented in the image 100. With reference to FIG. 8 and the above-described FIG. 6, an explanation is given of a change in the state of the user object in accordance with the presentation of the icon image.

Assume that, with regard to the image 100 in the state of FIG. 6, the user performs a motion to present the icon image at the desired position of the image 100. This motion is detected by the sensor 13. The PC 10a generates the motion coordinates on the basis of a detection result of the sensor 13 and presents the icon image, which corresponds to the area that includes the motion coordinates, at the position of the generated motion coordinates.

Here, if there is a user object near the motion coordinates, the PC 10a controls presentation of the user object in accordance with presentation of the icon image such that the user object moves to the motion coordinates. FIG. 8 illustrates an example of the case where, in the state of FIG. 6, a motion is performed to present the icon image on the position that is on the left side from the center of the image 100. In the example of FIG. 8, it is understood that an icon image $130_3$ is presented on the position that is on the left side from the center of the image 100, and the user objects $120_1$, $120_4$, and $120_{13}$, which are presented near the position of the icon image $130_3$ in the state of FIG. 6, have moved to the position of the icon image $130_3$.

Changes in the state of the user object in accordance with a motion are not limited to movement of the presentation position of the user object. For example, the PC 10a may highlight a user object if the motion coordinates are included in the image area of the user object. The image area of a user object may be defined by using, for example, the y-coordinate on the upper and lower ends of the user object and the x-coordinate on the right and left ends. For example, the PC 10a determines whether a motion hits the user object on the basis of the motion coordinates and, if it is determined that the motion hits the user object, highlights the user object. Possible highlighting of a user object includes enlargement or vibration of the user object.

Furthermore, as another example of highlighting, as illustrated in FIG. 9, for example, if the image area of the user object $120_1$ includes the motion coordinates, the PC 10a may present an icon image $130_4$ at the position of the motion coordinates and also present an effect image $132_1$ near the icon image $130_4$. In the example of FIG. 9, the image that represents the state where star images are scattered around the icon image $130_4$ is used as the effect image $132_1$. The effect image $132_1$ is previously stored in, for example, the DB 12a.

The PC 10a may store a screen shot of the image 100 in accordance with a user's motion. For example, the PC 10a determines whether the motion coordinates, which correspond to the user's motion, are included in the image area of the icon image 112 for screen shots, presented at the position of the upper left corner of the image 100. If it is determined that the motion coordinates are included in the image area of the icon image 112, the PC 10a presents an icon image 131, indicating a screen shot, at the position of the motion coordinates, as illustrated in FIG. 10. Then, the PC 10a stores, as a screen shot image in a memory, or the like, the image 100 that includes each user object and the icon image at the time when it is determined that the motion coordinates are included in the image area of the icon image 112.

As described above, the PC 10a is provided with the information on the image 100, which is projected onto the projected medium 14, as the coordinate information associated with the axis z in a depth direction. That is, the image 100 is the image that is obtained by projecting the information on the three-dimensional space, which is represented by the axis x, the axis y, and the axis z, onto the two-dimensional space (flat plane) that is represented by the axis x and the axis y.

With reference to FIG. 11A and FIG. 11B, an explanation is given of an example of the configuration of the image 100 in the PC 10a. For example, the image 100 is presented on the projected medium 14, as illustrated in FIG. 11A. In the example of FIG. 11A, the image 100 includes the background image 110, which includes the sky area 110a and the land area 110b, the fixed object 111, user objects $120_{20}$, $120_{21}$, $120_{22}$, $120_{23}$, $120_{24}$, $120_{25}$, $120_{26}$, $120_{27}$, . . . , an icon image $130_5$, and an effect image $132_2$.

Here, the image 100, illustrated in FIG. 11A, is represented by using only the axis x and the axis y out of the axis x, the axis y, and the axis z, and the axis z is ignored.

In FIG. 11A, due to the degree that, for example, the user objects $120_{20}$, $120_{21}$, and $120_{22}$, included in the land area 110b, are overlapped with one another, it is viewed as if the user object $120_{20}$ is presented on the front and the user object $120_{22}$ is presented on the back. In the same manner, with regard to the user objects $120_{23}$ and $120_{24}$, included in the land area 110b, it is viewed as if the user object $120_{23}$ is presented on the front and the user object $120_{24}$ on the back.

Furthermore, with regard to the first group of the user objects $120_{20}$, $120_{21}$, and $120_{22}$ and the second group of the user objects $120_{23}$ and $120_{24}$, it is viewed as if the second group is presented on the back side of the first group on the basis of the positions thereof in the land area 110b.

Furthermore, with regard to the user object $120_{26}$ and the user object $120_{27}$, included in the sky area 110a, and the user object $120_{25}$, included in the land area 110b, they are not overlapped with one another in the state of FIG. 11A; therefore, it is difficult to determine the perspective on the basis of presentation of the image 100.

FIG. 11B is an overhead view of the three-dimensional space, which is obtained by adding the information on the axis z to the image 100 of FIG. 11A, from the virtual point of view on the front of the upper right of the image 100. In FIG. 11B, the vertical direction corresponds to the axis y, the direction from the upper left toward the lower right corresponds to the axis x, and the direction from left to right, rising to right slightly diagonally, corresponds to the axis z. Here, the sky area 110a is represented as an xy flat plane, where the z-coordinate=0, and the land area 110b is represented as an xz flat plane, where the y-coordinate=0. Furthermore, in FIG. 11B, the extreme left of the line of intersection between the sky area 110a and the land area 110b is the x-coordinate=0.

Furthermore, the image 100 of FIG. 11A is equivalent to the image that is obtained by viewing the three-dimensional space with the line of sight that is defined in a direction along the axis z, as indicated by an arrow A in the drawing. Furthermore, the PC 10a previously defines a presentable area with regard to the three-dimensional space that is represented by using the axis x, the axis y, and the axis z. The area that is defined as a presentable area is referred to as a definition area.

Furthermore, with regard to the user objects $120_{20}$ to $120_{25}$, included in the land area 110b, for example, the value of the z-coordinate in the lower end of the image area is fixed to 0. Conversely, with regard to the user objects $120_{26}$ and $120_{27}$, included in the sky area 110a, each coordinate value of xyz may be arbitrary within the definition area.

Here, in FIG. 11B, the z-coordinate increases from left to right in the drawing. As illustrated in FIG. 11B, with regard to the user objects $120_{20}$, $120_{21}$, and $120_{22}$, the user object $120_{20}$ has the smallest value of the z-coordinate, and the user object $120_{22}$ has the largest value. Therefore, if the user objects $120_{20}$, $120_{21}$, and $120_{22}$ are partially overlapped with one another on the xy plane, the user object $120_{22}$, the user object $120_{21}$, and the user object $120_{20}$ are sequentially superimposed on the image 100 in this order for presentation.

Furthermore, the group (the second group) of the user objects $120_{23}$ and $120_{24}$ has a larger value of the z-coordinate, compared to the group (first group) of the user objects $120_{20}$ to $120_{22}$, and it is presented on the further back of the xz plane. Therefore, it is presented on the upper side (the side of the boundary between the sky area 110a and the land area 110b) of the image 100, if the three-dimensional space is viewed in the direction that is indicated by the arrow A with regard to the xz plane of the definition area.

Furthermore, with regard to the user objects $120_{25}$ to $120_{27}$, the user object $120_{26}$ has the smallest value of the z-coordinate so that it is presented on the front side, and the user object $120_{27}$ has the largest value of the z-coordinate so that it is presented on the back side. Furthermore, if user objects have the same size, the one with a smaller value of the z-coordinate is presented as being larger (e.g., the user objects $120_{23}$ and $120_{24}$).

Furthermore, the user objects $120_{20}$ to $120_{25}$, included in the land area 110b, may arbitrarily move within the definition area on the xz plane. Furthermore, the user objects $120_{26}$ and $120_{27}$, included in the sky area 110a, may arbitrarily move within the definition area in the xyz space. Here, the value of the y-coordinate of the user objects $120_{26}$ and $120_{27}$, included in the sky area 110a, may be limited to a value that is equal to or more than a certain value.

Configuration that is Applicable to the First Embodiment

FIG. 12 illustrates an example of the configuration of the PC 10a that is applicable to the first embodiment. In the PC 10a of FIG. 12, a bus 1000 is connected to a central processing unit (CPU) 1001, a read only memory (ROM) 1002, a random access memory (RAM) 1003, and a presentation-signal generating unit 1004. In the PC 10a, the bus 1000 is further connected to a storage 1006, a data I/F 1007, and a communication I/F 1008.

The CPU 1001 performs overall control of the PC 10a by using the RAM 1003 as a working memory in accordance with a program that is previously stored in the ROM 1002 and the storage 1006. The presentation-signal generating unit 1004 is connected to a monitor 1005, and it converts a presentation control signal, generated by the CPU 1001, into a signal that is presentable by the monitor 1005 and outputs it. Furthermore, the presentation-signal generating unit 1004 may convert a presentation control signal into a signal that is presentable by the projector (PJ) 11 and output it.

The storage 1006 is a storage medium that is capable of storing data in a non-volatile manner and, for example, a hard disk drive is used. This is not a limitation, and a non-volatile semiconductor memory, such as flash memory, may be used as the storage 1006. The storage 1006 stores programs, executed by the above-described CPU 1001, and various types of data.

The data I/F 1007 controls input/output of data with an external device. For example, the data I/F 1007 is used as an interface for the image acquiring device 20. Furthermore, the data I/F 1007 receives signals from a pointing device, such as a mouse, or an undepicted keyboard (KBD). Furthermore, the data I/F 1007 may output a presentation control signal, generated by the CPU 1001, and feed it to, for example, the projector 11. An interface, such as a universal serial bus (USB) or Bluetooth (registered trademark), may be used as the above-described data I/F 1007.

The communication I/F 1008 controls a communication via a network, such as the Internet or a local area network (LAN).

FIG. 13 is an example of the functional block diagram that illustrates the functionality of the PC 10a that is applicable to the first embodiment. In FIG. 13, the PC 10a includes an image analyzing unit 200a, a registering unit 201, a presentation control unit 210a, and a motion analyzing unit 220. The image analyzing unit 200a, the registering unit 201, the presentation control unit 210a, and the motion analyzing unit 220 are implemented by programs that are executed on the CPU 1001. This is not a limitation, and part or all of the image analyzing unit 200a, the registering unit 201, the presentation control unit 210a, and the motion analyzing unit 220 may be configured by using independent hardware.

Furthermore, the PC 10a is connected to a user image DB 230 and a presentation image DB 231. The user image DB 230 and the presentation image DB 231 are included in the above-described DB 12a. The user image DB 230 and the presentation image DB 231 are configured by using a storage medium that is externally connected to the PC 10a, or a predetermined area of the storage 1006 in the PC 10a.

Images that are acquired by the image acquiring device 20 are fed to the image analyzing unit 200a. The image analyzing unit 200a analyzes the image, fed from the image acquiring device 20, and acquires the identification information, the user image, and the information that indicates the attribute from the image. The registering unit 201 stores, in the user image DB 230, the identification information, the user image, and the attribute information, acquired by the image analyzing unit 200a, in association with one another. Furthermore, the user image DB 230 may store, for example, icon images and effect images in addition to user images.

A detection result, output from the sensor 13, is fed to the motion analyzing unit 220. The motion analyzing unit 220 outputs the motion information in accordance with the fed detection result. The motion information includes, for example, the coordinate information based on the detection result of the sensor 13. The motion analyzing unit 220 may further include, in the motion information, the time information that indicates the time that corresponds to the timing in which the coordinate information is detected.

The identification image 41 is fed to the presentation control unit 210a from the identification-image reading device 21. The presentation control unit 210a acquires the identification information from the fed identification image 41. Furthermore, the presentation control unit 210a acquires the user image from the user image DB 230, combines it with the background image 110, generates the image 100, and outputs it. The image 100, output from the presentation control unit 210a, is fed to, for example, the projector (PJ) 11 and is projected onto the projected medium 14.

At this point, the presentation control unit 210a sequentially acquires the user images, which are stored in the user image DB 230 by the registering unit 201. Furthermore, the presentation control unit 210a acquires, from the user image DB 230, the user image that is associated with the identification information based on the identification image 41 that is fed from the identification-image reading device 21. The presentation control unit 210a stores, in the presentation image DB 231, the acquired user image in association with the identification information. The presentation control unit 210a combines each user image, stored in the presentation image DB 231, with the background image 110 and outputs it.

The presentation control unit 210a may further combine a predetermined icon image or effect image to the image 100 on the basis of the motion information that is fed from the motion analyzing unit 220. Furthermore, the presentation control unit 210a may change each user image, included in the image 100, on the basis of the motion information that is fed from the motion analyzing unit 220.

Furthermore, the image analyzing unit 200a, the registering unit 201, the presentation control unit 210a, and the motion analyzing unit 220, included in the above-described PC 10a, are implemented by, for example, programs that are stored in the storage 1006 and are executed on the CPU 1001. The program is provided by being recorded, in the form of a file that is installable and executable, in a recording medium readable by a computer, such as a compact disk (CD), a flexible disk (FD), or a digital versatile disk (DVD).

Furthermore, a configuration may be such that the program to be executed by the PC 10a according to the first embodiment is stored in a computer connected via a network, such as the Internet, and is provided by being downloaded via the network. Moreover, a configuration may be such that the program to be executed by the PC 10a according to the first embodiment is provided or distributed via a network such as the Internet. Moreover, a configuration may be such that the program according to the first embodiment is provided such that it is previously installed in the ROM 1002, or the like.

The program to be executed by the PC 10a according to the first embodiment has a modular configuration that includes the above-described units (the image analyzing unit 200a, the registering unit 201, the presentation control unit 210a, and the motion analyzing unit 220). In terms of the actual hardware, the CPU 1001 reads the program from a storage medium, such as the storage 1006 or the ROM 1002, and executes it so as to load the above-described units into a primary storage device, such as the RAM 1003, so that the image analyzing unit 200a, the registering unit 201, the presentation control unit 210a, and the motion analyzing unit 220 are generated in the primary storage device.

FIG. 14 is an example of the functional block diagram that illustrates the functionality of the image analyzing unit 200a according to the first embodiment. In FIG. 14, the image analyzing unit 200a includes an image acquiring unit 2001, a user-image extracting unit 2002, an identification-information acquiring unit 2003, and an attribute-information acquiring unit 2004.

The image acquiring unit 2001 acquires the image that is fed from the image acquiring device 20. The user-image extracting unit 2002 detects the hand drawing area 43 from the image, acquired by the image acquiring unit 2001, and extracts the user image from the image of the detected hand drawing area 43. The identification-information acquiring unit 2003 extracts the identification image 41 from the image, acquired by the image acquiring unit 2001, and decodes the extracted identification image 41 to acquire the identification information. Furthermore, the attribute-information acquiring unit 2004 detects the attribute setting area 42 from the image, acquired by the image acquiring unit 2001, and acquires the attribute information from the detected attribute setting area 42.

FIG. 15 is an example of the functional block diagram that illustrates the functionality of the presentation control unit 210a according to the first embodiment. In FIG. 15, the presentation control unit 210a includes an image managing unit 2101, an identification-information acquiring unit 2102, an image control unit 2103a, a motion-information acquiring unit 2104, a 3D-space generating unit 2105, an area setting unit 2106, a combining unit 2107, and a presentation-image acquiring unit 2120.

The identification-information acquiring unit 2102 decodes the identification image 41, fed from the identification-image reading device 21, to acquire the identification information. The image managing unit 2101 acquires the user image and the attribute information, which are associated with the identification information, from the user image DB 230, feeds the identification information, the user image, and the attribute information to the image control unit 2103a, and stores them in the presentation image DB 231. Furthermore, in response to storing of the user image in the user image DB 230 by the registering unit 201, the image managing unit 2101 acquires the user image, and the identification information and the attribute information, which are associated with the user image, from the user image DB 230 and feeds them to the image control unit 2103a.

The motion-information acquiring unit 2104 acquires the motion information, output from the motion analyzing unit 220, and feeds it to the image control unit 2103a.

The user image, the attribute information, and the identification information, acquired by the image managing unit 2101, are fed to the image control unit 2103a. For example, based on the user image and the attribute information, the image control unit 2103a generates a parameter for controlling presentation of the user image and applies the generated parameter to the user image. The user image, to which the parameter is applied, is fed to the combining unit 2107.

When, for example, the motion information is fed from the motion-information acquiring unit 2104, the image control unit 2103a changes the parameter, which is applied to the user image, in accordance with the motion information. Furthermore, when the motion information is fed from the motion-information acquiring unit 2104, the image control unit 2103a acquires the icon image from the user image DB 230, for example, and feeds the acquired icon image to the combining unit 2107 in association with the coordinate information that is included in the motion information.

The 3D-space generating unit 2105 generates an image data space in three dimensions, represented by using the axis x, the axis y, and the axis z, which are explained with reference to FIGS. 11A and 11B. The 3D-space generating unit 2105 generates the three-dimensional image data space as, for example, the address space in the RAM 1003. The area setting unit 2106 sets a definition area in the three-dimensional image data space in accordance with a predetermined value with regard to each of the axis x, the axis y, and the axis z. The image within the definition area is presented as the image 100. A user image or icon image is presented in the image 100 if the coordinates fall within the definition area. The area setting unit 2106 feeds the information that indicates the definition area to the combining unit 2107.

On the basis of the definition area, the combining unit 2107 combines the background image 110 and the fixed object 111, which are prepared in advance, and the user image or the icon image, which is fed from the image control unit 2103a, as the two-dimensional image in a case where the definition area is viewed in the direction along the axis z as the line of sight, and outputs it as the image 100 (see FIGS. 11A and 11B).

Furthermore, the background image 110 and the fixed object 111 may be previously stored in a predetermined area of the DB 12a. Furthermore, they may be stored in a predetermined area of the storage 1006.

The presentation-image acquiring unit 2120 acquires the image 100, output from the combining unit 2107, under the control of the image control unit 2103a. For example, the image control unit 2103a instructs the presentation-image acquiring unit 2120 to acquire the image 100 in accordance with predetermined motion information. The presentation-image acquiring unit 2120 acquires the image 100 in accordance with the instruction and stores it in, for example, the storage 1006.

FIG. 16 is an example of the flowchart that schematically illustrates an operation in a case where the image, acquired by the image acquiring device 20, is presented according to the first embodiment. Before the operation in the flowchart of FIG. 16, the user prepares the medium 40, on which the identification image 41 is presented, and the sheet 50. Then, the user draws the picture 45 on the hand drawing area 43 of the sheet 50, checks the desired attribute on the attribute setting area 42, places it on the image acquiring device 20, places the medium 40 on the placement area 44, and causes the image acquiring device 20 to start an operation to acquire the image. The image acquiring device 20 transmits the acquired image to the PC 10a.

After the image is transmitted from the image acquiring device 20 to the PC 10a, it is received by the PC 10a and is fed to the image analyzing unit 200a. The image analyzing unit 200a acquires the fed image (Step S10). At the next Step S11, the image analyzing unit 200a detects each of the hand drawing area 43 and the attribute setting area 42 from the fed image and extracts the user image and the attribute information from each detected area. Furthermore, the image analyzing unit 200a extracts the identification image from the fed image and decodes the extracted identification image to acquire the identification information.

At the next Step S12, the registering unit 201 stores the user image and the attribute information, extracted at Step S11, in the user image DB 230 in association with the identification information so as to register the user image. The operation proceeds to Step S13 and, at Step S13, the presentation control unit 210a sets parameters p for controlling presentation with regard to the user image.

Here, an explanation is given of the parameters p that are applicable to the first embodiment. The presentation control unit 210a determines, for example, the following 8 types of parameters $p_0$ to $p_7$ with regard to each user image, i.e., each user object.

(1) $p_0$: the maximum velocity $v_{max}$ in a moving direction
(2) $p_1$: the acceleration a in a moving direction
(3) $p_2$: the maximal value $\alpha_{hmax}$ of the angular acceleration in a horizontal direction
(4) $p_3$: the maximal value $\alpha_{vmax}$ of the angular acceleration in a vertical direction
(5) $p_4$: the maximal value $dR_{umax}$ of a random number range (maximum random number range) at an angle in an upward direction
(6) $p_5$: the maximum random number range $dR_{dmax}$ at an angle in a downward direction
(7) $p_6$: the maximum random number range $dR_{rmax}$ at an angle in a right direction
(8) $p_7$: the maximum random number range $dR_{lmax}$ at an angle in a left direction Among them, the maximum velocity $v_{max}$ in a moving direction and the acceleration a in a moving direction in the parameters $p_0$ and $p_1$ are the parameters for controlling the velocity of a user object in a moving direction within a definition space. Furthermore, the maximal value $\alpha_{hmax}$ of the angular acceleration in a horizontal direction and the maximal value $\alpha_{vmax}$ of the angular acceleration in a vertical direction in the parameters $p_2$ and $p_3$ are the parameters for applying rotations to a user object in a horizontal direction and in a vertical direction.

The maximum random number ranges $dR_{umax}$ and $dR_{dmax}$ in upward and downward directions in the parameters $p_4$ and $p_5$ are the parameters for providing the range of the angular acceleration with regard to a rotation operation of a user object in a vertical direction, i.e., in upward and downward directions relative to a moving direction. The angular acceleration that is provided by using the parameters $p_4$ and $p_5$ is restricted by the maximal value $\alpha_{vmax}$ of the angular acceleration in a vertical direction in the parameter $p_3$.

The maximum random number ranges $dR_{rmax}$ and $dR_{lmax}$ in a right direction and in a left direction in the parameters $p_6$ and $p_7$ are the parameters for providing the range of the angular acceleration with regard to a rotation operation of a user object in a horizontal direction, i.e., in a right-and-left direction relative to a moving direction.

For example, the presentation control unit 210a generates the parameters $p_0$ to $p_7$ for determining the performance with regard to the movement of a user object due to the user image on the basis of the user image and the attribute information. For example, the presentation control unit 210a determines the values of the parameters $p_0$ to $p_7$ on the basis of the attribute information that corresponds to the user image and further sets the changeable range of each of the determined parameters $p_0$ to $p_7$ on the basis of the color that is used in the user image, the shape or size of the user image, or the like.

At the next Step S14, the presentation control unit 210a sets the coordinates in a definition area with regard to the user image, for which the parameters p have been set, and combines it with the background image 110 to generate the image 100. Thus, the user image is presented as a user object in the 3D space that is defined as a definition area. Furthermore, the coordinates of a user object at the initial position may be fixed or may be determined at random on the basis of the attribute information.

FIG. 17 is an example of the flowchart that schematically illustrates an operation in a case where the identification image 41 is acquired by the identification-image reading device 21 according to the first embodiment. Before the operation in the flowchart of FIG. 17, for example, the user relates the user image to the identification information and registers it in the user image DB 230 in accordance with the above-described flowchart of FIG. 16.

The user places the medium 40, on which the identification image 41 is presented, on the identification-image reading device 21 and gives an instruction to read the identification image 41 due to a user's operation on the identification-image reading device 21, or the like. In response to the instruction, the identification-image reading device 21 reads the identification image 41 and transmits it to the PC 10a. Furthermore, the identification-image reading device 21 may automatically recognize and read the identification image 41.

After the identification image 41 is transmitted from the identification-image reading device 21 to the PC 10a, it is received by the PC 10a and is fed to the presentation control unit 210a. The presentation control unit 210a acquires the fed identification image 41 (Step S20). At the next Step S21, the presentation control unit 210a decodes the identification image 41 to acquire the identification information and retrieves the user image, which is associated with the acquired identification information, from the user image DB 230.

At the next Step S22, the presentation control unit 210a determines the parameters $p_0$ to $p_7$ on the basis of each of the user images that are retrieved from the user image DB 230, as is the case with the above-described operation at Step S13, and sets them to each user image.

At the next Step S23, the presentation control unit 210a sets the coordinates in the definition area with regard to the user image, for which the parameters p have been set, and combines it with the background image 110 to generate the image 100. Thus, each user image, which is associated with the identification information based on the identification image 41 in the user image DB 230, is presented as a user object in the 3D space that is defined as a definition area.

FIG. 18 is an example of the flowchart that illustrates an operation to present an icon image in response to motion detection according to the first embodiment. Furthermore, it is assumed that, before the operation in the flowchart of FIG. 18, the user object has been already presented in the image 100 in accordance with the above-described flowchart of FIG. 16 or FIG. 17.

The presentation control unit 210a determines whether an object is detected on the basis of the motion information that is output from the motion analyzing unit 220 in accordance with a detection result from the sensor 13 (Step S30). If it is determined that an object is not detected, the presentation control unit 210a returns the operation to Step S30. Conversely, if it is determined that an object is detected, the presentation control unit 210a proceeds to the operation at Step S31.

At Step S31, the presentation control unit 210a acquires the coordinates that correspond to the position of the detected object and that are in the image 100 on the basis of the motion information. At the next Step S32, the presentation control unit 210a determines whether a predetermined motion of the object is detected on the basis of the coordinates that are acquired at Step S31. If it is determined that a predetermined motion of the object is not detected, the presentation control unit 210a returns the operation to Step S30. Conversely, if it is determined that a predetermined motion of the object is detected, the presentation control unit 210a proceeds to the operation at Step S33.

For example, the presentation control unit 210a stores the coordinates, acquired at Step S31, and, each time the loop from Step S30 to Step S32 is repeated, compares the newly acquired coordinates with the stored coordinates. Then, if more than a certain difference in the coordinates is detected in accordance with a result of the comparison, the presentation control unit 210a may determine that a predetermined motion is detected.

At Step S33, the presentation control unit 210a determines the area within the image 100 that includes the coordinates, at which the motion has been detected, on the basis of the coordinate information when the predetermined motion has been detected at Step S32. For example, with reference to the example of FIG. 5, the presentation control unit 210a determines which one of the sky area 110a and the land area 110b includes the coordinates, at which the motion has been detected.

At the next Step S34, the presentation control unit 210a acquires, from the DB 12a, for example, the icon image that corresponds to the area that is determined at Step S33. Here, if multiple types of icon images are associated with the area that is determined at Step S33, the presentation control unit 210a may select and acquire the multiple types of icon images at random or according to a predetermined order. The presentation control unit 210a presents the acquired icon image in the image 100 in accordance with the coordinates, at which the motion has been detected (Step S35).

At the next Step S36, the presentation control unit 210a determines whether the icon image, presented at Step S35, hits each user object that is presented in the image 100.

The presentation control unit 210a, for example, acquires the coordinates that indicate the range of the icon image in the image 100 on the basis of the coordinates and the size of the icon image that is presented at Step S35. Furthermore, the presentation control unit 210a acquires the coordinates that indicate the range of each user object in the image 100 on the basis of the position and the size of each user object that has been already presented in the image 100.

Then, on the basis of the coordinates that indicate the ranges of the acquired icon image and user object, the presentation control unit 210a determines whether the range of the icon image is overlapped with the range of the user object. If it is determined that the range of the icon image is overlapped with the range of the user object in accordance with the determination result, the presentation control unit 210a determines that the icon image is hitting the user object (there is a hit). If it is determined that there are no hits, the presentation control unit 210a proceeds to the operation at Step S38.

Conversely, if it is determined that there is a hit at Step S36, the presentation control unit 210a proceeds to the operation at Step S37. At Step S37, the presentation control unit 210a acquires an effect image from, for example, the DB 12a and, on the basis of the coordinates of the icon image, with which it is determined that there is a hit, presents the acquired effect image (effect) in the image 100. After making the effect presentation, the presentation control unit 210a proceeds to the operation at Step S38.

At Step S38, the presentation control unit 210a controls the movement of the user object, presented in the image 100, on the basis of the icon image and the coordinates of the icon image. For example, if it is determined that there is no hit at Step S36, the presentation control unit 210a may move a user object, which is presented near the icon image in the image 100, toward the icon image at a predetermined speed. Furthermore, for example, if it is determined that there is a hit at Step S36, the presentation control unit 210a may highlight the user object that is hit by the icon image.

With reference to FIG. 19 and FIG. 20, a more detailed explanation is given of an operation to acquire a user image and various types of information from the sheet 50. FIG. 19 is an example of the flowchart that illustrates an operation of the image analyzing unit 200a according to the first embodiment. Furthermore, FIG. 20 is a diagram that illustrates an operation to extract each image from the sheet 50 according to the first embodiment. Here, in FIG. 20, the same reference numeral is applied to the part that is the same as that in the above-described FIG. 2 and FIG. 4, and the detailed explanations are omitted.

In the flowchart of FIG. 19, at Step S40, the image analyzing unit 200a acquires the image of the sheet 50, fed from the image acquiring device 20, by using the image acquiring unit 2001. The image acquiring unit 2001 feeds the acquired image to the user-image extracting unit 2002, the identification-information acquiring unit 2003, and the attribute-information acquiring unit 2004. Furthermore, here, the image acquiring unit 2001 recognizes the markers $51_1$ to $51_3$ (see the left section of FIG. 20), provided on the three corners of the sheet 50, so as to correct the orientation of the acquired image of the sheet 50, or the like.

At Step S41, the identification-information acquiring unit 2003 determines whether the identification image 41 is included in the image of the sheet 50. If it is determined that the identification image 41 is included in the image, the identification-information acquiring unit 2003 proceeds to the operation at Step S42 to extract the identification image 41 from the image and, at the next Step S43, decodes the extracted identification image 41 to acquire the identification information. Then, the operation proceeds to Step S45.

Conversely, if it is determined that the identification image 41 is not included at Step S41, the identification-information acquiring unit 2003 proceeds to the operation at Step S44. At Step S44, the identification-information acquiring unit 2003 sets, for example, the predetermined default identification information to the acquired identification information. Then, the operation proceeds to Step S45.

At Step S45, the attribute-information acquiring unit 2004 extracts the image of the attribute setting area 42 from the image of the sheet 50 and determines whether the attribute is designated on the basis of the extracted image on the attribute setting area 42.

For example, as illustrated in the left section of FIG. 20, the six attribute setting areas $42_1$ to $42_6$ are provided on the attribute setting area 42. The inside of the attribute setting areas $42_1$ to $42_6$ is checked by being painted so that the desired attribute is designated. In the example of FIG. 20, the attribute "walk", the attribute "move ahead", the attribute "jump", the attribute "plant", the attribute "building", and the attribute "swim" are set on the attribute setting areas $42_1$ to $42_6$. Furthermore, the attributes, set on the attribute setting areas $42_1$ to $42_6$, are attribute type #1, attribute type #2, attribute type #3, attribute type #4, attribute type #5, and attribute type #6.

The attribute-information acquiring unit 2004 determines whether the attribute setting areas $42_1$ to $42_6$ are checked one by one in a predetermined order. Then, if the checked attribute setting area is determined, the attribute information, indicating the attribute that corresponds to the attribute setting area, is acquired (Step S46). In the example of FIG. 20, the attribute setting area $42_2$ is checked, and the attribute information that indicates the attribute type #2 is acquired. After the attribute information is acquired, the operation proceeds to Step S48.

Conversely, if it is determined that all the attribute setting areas $42_1$ to $42_6$ are not checked, the attribute-information acquiring unit 2004 proceeds to the operation at Step S47 and sets, for example, a predetermined default value as the attribute information. Then, the operation proceeds to Step S48.

Furthermore, when it is first determined that the attribute setting areas $42_1$ to $42_6$ are checked, the attribute-information acquiring unit 2004 stops determination as to whether the attribute setting area is checked. Therefore, even if multiple attribute setting areas are checked among the attribute setting areas $42_1$ to $42_6$, only the single attribute information is acquired.

At Step S48, the user-image extracting unit 2002 detects the hand drawing area 43 from the image of the sheet 50 and extracts the user image from the hand drawing area 43. Here, on the image of the hand drawing area 43, the user-image extracting unit 2002 performs an operation to extract the user object. For example, with regard to the image in the hand drawing area 43, the user-image extracting unit 2002 makes a binary determination as to whether each pixel is white (the original color of the sheet 50) or other than white so as to extract the portion of the picture 45 as the user object. The user-image extracting unit 2002 determines that the user image is the image of a smallest rectangular area 46, which includes the extracted portion of the picture 45 and which has the base in a direction parallel to the direction of the base of the hand drawing area 43.

After the user image is extracted at Step S48, the image analyzing unit 200a requests the registering unit 201 to register the identification information, the attribute information, and the user image, which are acquired or extracted during the operations from Step S40 to Step S48, in the user image DB 230 (Step S49).

In the above explanation, the operations of the user-image extracting unit 2002, the identification-information acquiring unit 2003, and the attribute-information acquiring unit 2004 are serially performed; however, this example is not a limitation. That is, the operations of the user-image extracting unit 2002, the identification-information acquiring unit 2003, and the attribute-information acquiring unit 2004 may be performed in parallel.

FIG. 21 is an example of the flowchart that illustrates an operation to register the identification information, the attribute information, and the user image in the user image DB 230 by the registering unit 201 according to the first embodiment. At Step S60, the registering unit 201 determines the presence or absence of an instruction to register the identification information, the attribute information, and the user image in the user image DB 230 from the image analyzing unit 200a. If it is determined that there is no registration request, the registering unit 201 returns the operation to Step S60.

Conversely, if it is determined that there is a registration request for the identification information, the attribute information, and the user image in the user image DB 230, the registering unit 201 proceeds to the operation at Step S61. At Step S61, the registering unit 201 receives the identification information, the attribute information, and the user image, of which the registration has been requested, from the image analyzing unit 200a.

At the next Step S62, the registering unit 201 generates the management information for managing the identification information, the attribute information, and the user image, which are received at Step S61. The registering unit 201 generates the management information on the basis of, for example, the identification information. Here, the registering unit 201 generates the management information by relating the attribute information and the user image to the identification information, as illustrated in FIG. 22. As illustrated in FIG. 22, the user image and the attribute information are related with a one-to-one correspondence. Conversely, the identification information is associated with the combinations of the user image and the attribute information on a one-to-many basis. That is, the single identification information may be associated with multiple combinations of the user image and the attribute information.

At the next Step S63, with regard to the user image DB 230, the registering unit 201 generates the management area for storing the identification information, the attribute information, and the user image, which are received at Step S61. The registering unit 201 generates the management area on the basis of the management information that is generated at the above-described Step S62.

In this example, the registering unit 201 generates the management area by using a hierarchical structure in the file system of the computer. With reference to FIG. 23, an explanation is given of a case where the management area is generated by using the folder structure in the file system, generated by the registering unit 201. FIG. 23 illustrates an example of the display screen that displays the folder structure of the user image DB 230 according to the first embodiment. In FIG. 23, a display screen 300 includes display areas 301 and 302. The display area 301 displays the folder structure, and the display area 302 presents the contents of the folder that is designated on the display area 301.

In the folder structure, a folder in a certain layer may include a folder in the next layer below, and the layers are sequentially constructed by using folders from a folder in the top layer to a folder in the bottom layer. On the display area 301 of FIG. 23, a folder 320 (folder "DataBase") in the first layer includes multiple folders $321_1$, $321_2$, $321_3$, ..., $321_m$, $321_{m+1}$, $321_{m+2}$, ..., in the second layer (first area). Here, each of the folders $321_1$, $321_2$, ..., in the second layer corresponds to the identification information, and the character string of the identification information is used as the name of a folder.

A folder in the second layer further includes a folder in the third layer (second area). For example, in FIG. 23, the folder $321_m$ in the second layer includes multiple folders $322_1$ to $322_5$ in the third layer. The folders $322_1$ to $322_5$ in the third layer store the combination of the user image and the attribute information. Furthermore, with regard to the folders in the third layer, the time information, indicating the time when the user image and the attribute information, stored in the folder, are acquired by the image analyzing unit 200a, is used as the name of the folder.

In this way, the name of a folder in the third layer is determined on the basis of the time information so that the uniqueness of the combinations of the user image and the attribute information, which are associated with the same identification information, is ensured. Furthermore, as the folder name of a folder in the second layer is determined by using the identification information, the combination of the user image and the attribute information, associated with the same identification information as that of a folder in the second layer, is additionally stored in the folder.

As the management area is configured as described above, the identification information, the user image, and the attribute information may be managed by using the file system of the operating system (OS) that is installed in the PC 10a, and multiple combinations of a user image and the attribute information, associated with the designated identification image, may be easily acquired.

In FIG. 23, the display area 302 presents the contents of the folder $322_1$ in the third layer. In this example, the display area 302 presents that the folder $322_1$ in the third layer stores a file 310 that stores the user image and a file 311 that stores the attribute information.

FIG. 24 illustrates an example of the structure of the file 311 that stores the attribute information according to the first embodiment. In this example, the file 311 stores attribute information 312 and identification information 313 that is associated with the attribute information 312.

With reference back to FIG. 21, after the registering unit 201 generates the management area in the user image DB 230 as described above at Step S63, it stores the user image, the attribute information, and the identification information, received from the image analyzing unit 200a at Step S61, in the generated management area at the next Step S64.

Here, the user image, the attribute information, and the identification information, stored in the management area at Step S64, are read by the presentation control unit 210a for presentation. The presentation control unit 210a reads, from the user image DB 230, the user image, the attribute information, and the identification information, which are newly registered. Furthermore, the presentation control unit 210a generates a presentation queue area in the presentation image DB 231 (Step S65). Furthermore, the same structure as that of the management area, generated at Step S63, may be applied to the presentation queue area; therefore, the explanations are omitted here.

The presentation control unit 210a stores the user image, the attribute information, and the identification information, read from the user image DB 230, in the generated presentation queue area 231 (Step S66). The presentation control unit 210a uses the user image, stored in the presentation queue area, to present the user object in the image 100.

At the next Step S67, the presentation control unit 210a counts the number of user images that are stored in the presentation queue area. For example, with regard to the presentation queue area, the presentation control unit 210a counts up the number of folders, storing the combination of a user image and the attribute information, in the third layer with regard to each folder in the second layer, corresponding to the identification information, to obtain a value and counts it as the number of user images that are stored in the presentation queue area. At the next Step S68, the presentation control unit 210a determines whether the number of user images, counted at Step S67, exceeds a predetermined number. If it is determined that it is not exceeded, the presentation control unit 210a returns the operation to Step S60.

Conversely, if it is determined that the counted number of user images exceeds the predetermined number, the presentation control unit 210a proceeds to the operation at Step S69 to delete one user image from the presentation queue area. For example, the presentation control unit 210a deletes the folder that is generated at the earliest time among the folders of the third layer in the presentation queue area. Thus, the number of user objects, presented in the image 100, may be limited to a certain number. Furthermore, the number of user images, which are deleted at Step S69, is not always one, but the one to be deleted may be 2 or more.

Furthermore, it is possible to prohibit deletion of a designated user image among the user images that are stored in the presentation queue area. For example, in the presentation queue area, a folder with a predetermined folder name in the second layer is generated, and the user image, which needs to prohibited from being deleted, and the attribute information that corresponds to the user image are stored in a folder in the third layer, which is generated in the above folder. For example, as the image of the logo of the service provider, or the like, is stored in the above folder as the user image, even if a user image is sequentially stored in the presentation queue area, the image of the logo is not deleted and is continuously presented in the image 100.

Next, an explanation is given of log recording. The presentation system 1a according to the first embodiment may store the use information on the system in log information. More specifically, when the image analyzing unit 200a and the presentation control unit 210a acquire the identification image 41, the PC 10a stores, as the log information, the use information, in which at least the time when the identification image 41 is acquired is associated with the identification information that is decoded from the identification image 41.

FIG. 25 illustrates an example of the log information according to the first embodiment. Here, in FIG. 25, for explanations, a row number is attached to the beginning of each row, separated by the main body of the log information and the colon (:). In FIG. 25, log information 330 stores the start and termination times of a program according to the first embodiment, for example, in the first row and the tenth row, respectively. Between the start time and the termination time, the use information is stored with regard to each user image (e.g., the second row to the ninth row).

In the example of FIG. 25, the use information includes the items of "use time and date" (Date), "event" (Event), "folder name" (BaseName), i.e., the third layer in which a user image and the attribute information are stored, "identification information" (ID), and "attribute type" (Type). Here, the item "event" has the value of any one of, for example, "addition" and "retrieval". In this case, if the value of the item "event" is the value "addition", it is indicated that the use information is the use information associated with the newly added user image and, if it is the value "retrieval", it is indicated that the use information is associated with the user image that is retrieved and acquired from the user image DB 230. Furthermore, by using the information of the item "folder name" and the information of the item "identification information", included in the use information, it is possible to determine a folder in the user image DB 230 or the presentation image DB 231.

By gathering each piece of use information in the log information 330, the rate of utilization of the system, or the like, may be analyzed. Furthermore, the log information 330 is stored in, for example, the storage 1006. This is not a limitation, and the log information 330 may be stored in a predetermined area of the user image DB 230 or the presentation image DB 231.

According to the first embodiment, the log information 330 may be used to retrieve a user image. FIG. 26 is an example of the flowchart that illustrates an operation to retrieve a user image by using the log information 330 according to the first embodiment. At Step S80, in the presentation control unit 210a, the identification-information acquiring unit 2102 decodes the identification image 41, fed from the identification-image reading device 21, to acquire the identification information. At the next Step S81, in the presentation control unit 210a, the image managing unit 2101 retrieves, from the log information 330, the use information that has the value of the item "identification information" that matches the acquired identification information.

At the next Step S82, the image managing unit 2101 narrows down the pieces of use information, retrieved at Step S81, by using for example the date of the current day. Then, at the next Step S83, the image managing unit 2101 acquires the number of narrowed pieces of use information. For example, the image managing unit 2101 refers to the item "event" in the use information, extracts the use information, for which the value of the item "event" is "retrieval", and based on the value of the item "use time and date", acquires the number of pieces of use information with the date of the current day and with the different times among the extracted pieces of use information.

At the next Step S84, the image managing unit 2101 determines whether the number of acquired pieces of use information exceeds a threshold. If it is determined that the number of pieces of use information exceeds the threshold, the image managing unit 2101 determines that it is an error and proceeds to the operation at Step S86 so as to request, for example, the image control unit 2103a to make a display that indicates the error.

Conversely, if it is determined that the number of pieces of use information is equal to or less than the threshold at Step S84, the image managing unit 2101 proceeds to the operation at Step S85. At Step S85, the image managing unit 2101 searches the user image DB 230 on the basis of the information of the item "identification information" and the item "folder name" in each piece of use information, narrowed down at Step S82, and determines a user image as a retrieval result at the next Step S87.

At the next Step S88, the image managing unit 2101 determines whether there is a user image that is included in the presentation queue area among the determined user images. For example, the image managing unit 2101 searches the presentation image DB 231 on the basis of the item "identification information" and the item "folder name" in each piece of use information, narrowed down at Step S82, and checks whether there is a folder that matches the items.

If it is determined that the determined user image is not included in the presentation queue area, the image managing unit 2101 proceeds to the operation at Step S89. At Step S89, the image managing unit 2101 instructs the image control unit 2103a to acquire the user images, determined at Step S87, from the user image DB 230 and present each of the acquired user images in the image 100. After the image managing unit 2101 gives the instruction to present the user image in the image 100 at Step S89, it proceeds to the operation at Step S92.

Conversely, if it is determined that there is a user image that is included in the presentation queue area among the determined user images at Step S88, the image managing unit 2101 proceeds to the operation at Step S90. At Step S90, the image managing unit 2101 extracts the user image that is included in the presentation queue area, i.e., already presented as the user object in the image 100, from the determined user images. Then, the image managing unit 2101 instructs the image control unit 2103a to highlight the user object using each of the extracted user images.

At the next Step S91, the image managing unit 2101 determines a different user image with regard to the user image that is included in the presentation queue area among the user images that are determined at Step S87, i.e., the user image that is determined at Step S87 and that is not included in the presentation queue area. Then, the image managing unit 2101 instructs the image control unit 2103a to acquire the determined user image from the user image DB 230 and present the acquired user image in the image 100.

The operation proceeds to Step S92 so that the image managing unit 2101 stores the user image, presented in the image 100 at Step S91 or Step S89, in the presentation queue area in association with the identification information and the attribute information. At this point, the image managing unit 2101 stores the user image, for which it is determined that it is included in the presentation queue area at the above-described Step S90, in the presentation queue area again. This is because the user object, already presented in the image 100, is prevented from being deleted due to the limitation on the number for presentation.

Then, at the next Step S93, the image managing unit 2101 stores the use information with the item "event" that has the value "retrieval", i.e., the use information that indicates that the user image has been retrieved by using the identification information, in the log information 330.

Furthermore, at the above-described Step S84, if it is determined that the number of acquired pieces of use information exceeds a threshold, an operation is performed to determine that it is an error; however, this example is not a limitation. For example, the threshold determination on the number of pieces of use information may not be performed. Furthermore, determination results of the threshold determination on the number of pieces of use information are not limited to the purpose of limiting the number of times retrieval is used, and it is possible that a certain message is presented to a user, e.g., a predetermined effect image is presented, with regard to the frequent use.

Furthermore, if the threshold determination on the number of pieces of use information at Step S84 is not made, there are too many pieces of use information, which are narrowed down during the retrieval at Step S82, and there is a possibility that the user objects, presented in the image 100, are dominated by the user objects using the user images that are acquired during the retrieval. Therefore, it is possible that the number of user images in the presentation queue area is limited during the operation in the flowchart of FIG. 26, as is the case with the operation in the flowchart of the above-described FIG. 21.

First Modified Example of the First Embodiment

Next, an explanation is given of a first modified example of the first embodiment. In the first modified example of the first embodiment, an addition operation may be added to the operation to present a user object according to the above-described first embodiment. Possible addition operations include, for example, an operation to add the logo image of the manufacturer or the image of a mascot character to the user image based on the picture 45 that is drawn on the sheet 50 by the user and to present it.

According to the first modified example of the first embodiment, in order to implement addition of the addition operation, for example, the addition-operation identification information is generated, which is obtained by including the information indicating an addition operation in the identification information, the addition-operation identification information is encoded into an image to generate the identification image 41, and it is presented on the medium 40.

According to the first modified example of the first embodiment, the identification information, represented by using the above-described Equation (1), is changed into the management identification information as in the following Equation (2). Furthermore, according to the first modified example of the first embodiment, for example, the structure of the following Equation (3) may be used for the addition-operation identification information.

$$\text{Management identification information}=(\text{fixed code})+(\text{management code})+(\text{time information}) \quad (2)$$

$$\text{Addition-operation identification information}=(\text{fixed code})+(\text{operation code})+(\text{predetermined value}) \quad (3)$$

In Equation (2), the "management code" indicates that the identification information is the management identification information that is used for identifying each user image that is stored in the user image DB 230. The "fixed code" and the "time information" are the same as those in the above-described Equation (1).

Conversely, in Equation (3), the "operation code" indicates that the identification information is the addition-operation identification information for adding an addition operation to the operation to present a user object. Furthermore, for example, the "predetermined value" may be used to select or designate the addition operation to be added.

As the management identification information includes the time information that indicates the time when the identification image 41 is generated, it has a different value depending on each user image. Specifically, if the management identification information is used, the unique identification image 41 is presented on each of the media 40. Conversely, the same value is used for the addition-operation identification information with regard to, for example, the same addition operation. In this case, the same identification image 41 is presented for the multiple media 40.

FIG. 27 is an example of the functional block diagram that illustrates the functionality of a PC that controls an operation of a presentation system according to the first modified example of the first embodiment. Here, in FIG. 27, the same reference numeral is applied to the part that is the same as that in the above-described FIG. 13, and the detailed explanations are omitted. Furthermore, as the configuration of the presentation system 1a, illustrated in FIG. 1, according to the first embodiment may be directly applied to the presentation system, the explanations are omitted here.

In FIG. 27, a PC 10b is additionally connected to an addition operation DB 232, contrary to the PC 10a that is illustrated in FIG. 13. The addition operation DB 232 may be included in, for example, the DB 12a of FIG. 1. In the addition operation DB 232, the information to be added as an addition operation is stored in association with the "predetermined value" that is included in, for example, the addition-operation identification information. The information (addition-operation information) to be added as an addition operation is not particularly limited and, for example, a predetermined image (additional image) may be applied.

Furthermore, an image analyzing unit 200b and a presentation control unit 210b, included in the PC 10b, are additionally provided with the function to perform an addition operation, contrary to the image analyzing unit 200a and the presentation control unit 210a of FIG. 13.

FIG. 28 is an example of the flowchart that schematically illustrates an operation in a case where an image, acquired by the image acquiring device 20, is presented according to the first modified example of the first embodiment. Here, in FIG. 28, the same reference mark is applied to the operation that is the same as that in the above-described FIG. 16, and the detailed explanations are omitted. Before the operation in FIG. 28, the user prepares the medium 40, on which the identification image 41 is presented based on the operation identification information, and the sheet 50, makes a desired drawing, or the like, on the sheet 50, places it on the image acquiring device 20, places the medium 40 on the placement area 44 of the sheet 50, and causes the image acquiring device 20 to start an operation to acquire the image. The image acquiring device 20 transmits the acquired image to the PC 10b.

The PC 10b receives the image, transmitted from the image acquiring device 20, and feeds it to the image analyzing unit 200b. The image analyzing unit 200b acquires the fed image (Step S10). At the next Step S11, the image analyzing unit 200b detects each of the hand drawing area 43 and the attribute setting area 42 from the fed image and extracts the user image and the attribute information from each detected area. Furthermore, the image analyzing unit 200b extracts the identification image from the fed image and decodes the extracted identification image to acquire the identification information.

At the next Step S12, the registering unit 201 stores the user image and the attribute information, extracted at Step S11, in the user image DB 230 in association with the identification information so as to register the user image. At the next Step S13, the presentation control unit 210b sets the parameters $p_0$ to $p_7$ for controlling presentation to the user image as described above.

At the next Step S100, the presentation control unit 210b determines whether the identification information is designed for an addition operation. Specifically, if the identification information includes the code for the addition operation, the presentation control unit 210b determines that the identification information is the addition-operation identification information. If it is determined that the identification information is not the addition-operation identification information, the presentation control unit 210*b* proceeds to the operation at Step S12 to store the user image and the attribute information, extracted at Step S11, in the user image DB 230 in association with the identification information so as to register the user image. Then, the operation proceeds to Step S14.

Conversely, if it is determined that the identification information is the addition-operation identification information, the presentation control unit 210*b* proceeds to the operation at Step S101. At Step S101, the presentation control unit 210*b* retrieves the addition information from the addition operation DB 232 on the basis of the addition-operation identification information and performs an operation in accordance with the retrieved addition-operation information. For example, if the addition-operation information is an additional image, the presentation control unit 210*b* presents the user object, which is the combination of the user image and the additional image, in the image 100. Then, the operation proceeds to Step S14.

At Step S14, the presentation control unit 210*b* sets the coordinates of the definition area with regard to the user image, for which the parameters p have been set, and combines it with the background image 110 to generate the image 100. Thus, the user image is presented as the user object in the 3D space that is defined as the definition area.

As described above, according to the first modified example of the first embodiment, as the identification image 41 based on the identification information, which includes the addition-operation information for an addition operation, is presented on the media 40 in common, the same addition operation may be performed on the media 40. Therefore, for example, the service provider may provide the unique addition operation of the service provider to multiple users in common. Thus, for example, the service provider may easily develop an event by using its own brand.

Second Modified Example of the First Embodiment

Next, an explanation is given of a second modified example of the first embodiment. In the above-described first modified example of the first embodiment, as the identification information is common to the media 40, an addition operation may be common to the media 40; however, it is not suitable for the purpose of managing a user image on the basis of the identification information. Hence, according to the second modified example of the first embodiment, an addition operation may be provided to the media 40 in common, and also a user image may be managed on the basis of the identification information.

More specifically, according to the second modified example of the first embodiment, a different value is used for each of the media 40 as the identification information, represented by using the above-described Equation (1) or Equation (2). Furthermore, the image (logo image), designated by the service provider for example, is presented on the medium 40 together with the identification image 41. Here, the common logo image is presented on the media 40. Furthermore, the logo image is previously stored in a database, or the like, in association with the addition-operation information. The logo image is acquired from the medium 40 as well as the identification image 41, and the addition-operation information, which is associated with the logo image, is retrieved on the basis of the acquired logo image. Thus, the unique addition operation of the service provider may be provided to multiple users in common, and also the user image may be managed on the basis of the identification information.

FIG. 29 illustrates an example of a medium 40' that presents the logo image together with the identification image according to the second modified example of the first embodiment. On the medium 40', a logo image 60 is presented together with the identification image 41. The positional relationship and the size of the identification image 41 and the logo image 60 are not particularly limited.

FIG. 30 is an example of the functional block diagram that illustrates the functionality of a PC that controls an operation of a presentation system according to the second modified example of the first embodiment. Here, in FIG. 30, the same reference numeral is applied to the part that is the same as that in the above-described FIG. 27, and the detailed explanations are omitted. Furthermore, as the configuration of the presentation system 1*a*, illustrated in FIG. 1, according to the first embodiment may be directly applied to the presentation system, the explanations are omitted here.

In FIG. 30, a PC 10*c* is additionally connected to a logo image DB 233, contrary to the PC 10*b* that is illustrated in FIG. 27. The logo image DB 233 may be included in, for example, the DB 12*a* of FIG. 1. The logo image DB 233 stores the information that indicates the logo image 60 (e.g., the characteristic information that indicates the characteristics of the logo image 60) and the addition-operation information in association with each other. The logo image 60 itself may be stored in the logo image DB 233 in association with the addition-operation information.

Furthermore, an image analyzing unit 200*c* and a presentation control unit 210*c*, included in the PC 10*c*, are additionally provided with the function to perform an operation on a logo image, contrary to the image analyzing unit 200*b* and the presentation control unit 210*b* of FIG. 27. For example, the image analyzing unit 200*c* has a function to acquire the identification image 41 and also the logo image 60 from the area of the medium 40 on the image that is fed from the image acquiring device 20.

Furthermore, according to the second modified example of the first embodiment, the identification-image reading device 21 transmits the image of the medium 40 itself to the PC 10*c*. The presentation control unit 210*c* may acquire the identification image 41 and the logo image 60 from the image that is fed from the identification-image reading device 21. Furthermore, the presentation control unit 210*c* may search the logo image DB 233 on the basis of the acquired logo image 60 to acquire the corresponding addition-operation information. For example, the presentation control unit 210*c* analyzes the acquired logo image 60 to extract the characteristic information and retrieves the characteristic information that corresponds to the extracted characteristic information in the logo image DB 233. Then, the presentation control unit 210 acquires, from the logo image DB 233, the addition-operation information that is associated with the characteristic information that is obtained as a result of retrieval.

FIG. 31 is an example of the flowchart that schematically illustrates an operation in a case where the image, acquired by the image acquiring device 20, is presented according to the second modified example of the first embodiment. Here, in FIG. 31, the same reference mark is applied to the operation that is the same as that in the above-described FIG. 28, and the detailed explanations are omitted.

Before the operation in FIG. 31, the user prepares the medium 40, on which the identification image 41 is presented based on the management identification information, and the sheet 50, makes a desired drawing, or the like, on the sheet 50, places it on the image acquiring device 20, places the medium 40 on the placement area 44 of the sheet 50, and causes the image acquiring device 20 to start an operation to acquire the image. The image acquiring device 20 transmits the acquired image to the PC 10c.

The PC 10c receives the image, transmitted from the image acquiring device 20, and feeds it to the image analyzing unit 200c. The image analyzing unit 200c acquires the fed image (Step S10). At the next Step S11, the image analyzing unit 200c detects each of the hand drawing area 43 and the attribute setting area 42 from the fed image and extracts the user image and the attribute information from each detected area. Furthermore, the image analyzing unit 200c extracts the identification image from the fed image and decodes the extracted identification image to acquire the identification information.

At the next Step S12, the registering unit 201 stores the user image and the attribute information, extracted at Step S11, in the user image DB 230 in association with the identification information so as to register the user image. At the next Step S13, the presentation control unit 210c sets the parameters $p_0$ to $p_7$ for controlling presentation to the user image as described above.

At the next Step S120, the presentation control unit 210c determines whether an image other than the identification image 41 is detected from the area of the medium 40 on the image, transmitted from the image acquiring device 20, on the basis of the operation result at Step S11. If it is determined that it is not detected, the presentation control unit 210c proceeds to the operation at Step S14.

Conversely, if it is determined that an image other than the identification image 41 is detected from the area of the medium 40 at Step S120, the presentation control unit 210c proceeds to the operation at Step S121 to acquire the image. At the next Step S122, the presentation control unit 210c searches the logo image DB 233 on the basis of the image.

At the next Step S123, the presentation control unit 210c determines whether the logo image, which matches the image that is acquired at Step S121, is registered in the logo image DB 233 on the basis of a retrieval result at Step S122. If it is determined that it is not registered, the presentation control unit 210c proceeds to the operation at Step S14.

Conversely, if it is determined that the logo image, which matches the image that is acquired at Step S121, is registered in the logo image DB 233 at Step S123, the presentation control unit 210c proceeds to the operation at Step S124. At Step S124, the presentation control unit 210c acquires, from the logo image DB 233, the addition-operation information that is associated with the retrieved logo image. Then, at the next Step S125, the presentation control unit 210c performs an operation in accordance with the acquired addition-operation information. Then, the operation proceeds to Step S14.

At the next Step S14, the presentation control unit 210c sets the coordinates in the definition area with regard to the user image, for which the parameters p have been set, and combines it with the background image 110 to generate the image 100. Thus, the user image is presented as a user object in the 3D space that is defined as a definition area.

FIG. 32 is an example of the flowchart that schematically illustrates an operation in a case where the image of the medium 40' is acquired by the identification-image reading device 21 according to the second modified example of the first embodiment. Here, in FIG. 32, the same reference mark is applied to the operation that is the same as that in the above-described FIG. 17 and FIG. 31, and the detailed explanations are omitted. Before the operation in the flowchart of FIG. 32, the user registers the user image in association with the identification information in the user image DB 230 in accordance with the flowchart of, for example, the above-described FIG. 16.

The user places the medium 40', which presents the identification image 41 and the logo image 60, in the identification-image reading device 21 and, due to the user's operation on the identification-image reading device 21, or the like, gives an instruction to read the image of the medium 40'. In accordance with the instruction, the identification-image reading device 21 reads the image of the medium 40' and transmits it to the PC 10c.

The PC 10c receives the image, transmitted from the identification-image reading device 21, and feeds it to the presentation control unit 210c. The presentation control unit 210c acquires the identification image 41 from the fed image (Step S20). At the next Step S21, the presentation control unit 210a decodes the identification image 41 to acquire the identification information and retrieves the user image, associated with the acquired identification information, from the user image DB 230. At the next Step S22, the presentation control unit 210c determines the parameters $p_0$ to $p_7$ on the basis of each of the user images that are retrieved from the user image DB 230, as is the case with the operation at Step S13 of FIG. 16, and sets it to each user image.

The following operations from Step S120 to Step S125 are the same as those in FIG. 31. Specifically, at Step S120, the presentation control unit 210c determines whether an image other than the identification image 41 is detected from the area of the medium 40' on the image, transmitted from the identification-image reading device 21, on the basis of the operation result at Step S21. If it is determined that it is not detected, the presentation control unit 210c proceeds to the operation at Step S23.

Conversely, if it is determined that an image other than the identification image 41 is detected from the area of the medium 40' at Step S120, the presentation control unit 210c proceeds to the operation at Step S121 to acquire the image and searches the logo image DB 233 on the basis of the acquired image (Step S122). At the next Step S123, the presentation control unit 210c determines whether the logo image, which matches the image that is acquired at Step S121, is registered in the logo image DB 233 on the basis of a retrieval result at Step S122. If it is determined that it is not registered, the presentation control unit 210c proceeds to the operation at Step S23.

Conversely, if it is determined that the logo image, which matches the image that is acquired at Step S121, is registered in the logo image DB 233 at Step S123, the presentation control unit 210c proceeds to the operation at Step S124. At Step S124, the presentation control unit 210c acquires, from the logo image DB 233, the addition-operation information that is associated with the retrieved logo image and, at the next Step S125, the presentation control unit 210c performs an operation in accordance with the acquired addition-operation information. Then, the operation proceeds to Step S23.

At the next Step S23, the presentation control unit 210c sets the coordinates in the definition area with regard to the user image, for which the parameters p have been set, and combines it with the background image 110 to generate the image 100. Thus, each user image, associated with the identification information based on the identification image 41 in the user image DB 230, is presented as a user object in the 3D space that is defined as a definition area.

Second Embodiment

Next, a second embodiment is explained. According to the second embodiment, sound information is acquired, and a change is made to the user object that is presented in the image 100 on the basis of the acquired sound information. FIG. 33 illustrates an example of the configuration of a presentation system according to the second embodiment. Here, in FIG. 33, the same reference mark is applied to the part that is the same as that in the above-described FIG. 1, and the detailed explanations are omitted.

Furthermore, the image acquiring device 20 and the identification-image reading device 21, illustrated in FIG. 1, are omitted from FIG. 33. Furthermore, the configuration that is explained with reference to FIG. 12 may be directly applied to a PC 10d that is illustrated in FIG. 33.

In FIG. 33, in a presentation system 1d, a microphone 15 is provided near the projected medium 14 to collect sound, and a sound signal, output from the microphone 15, is fed to the PC 10d. Here, if a sound signal is output from the microphone 15 in an analog form, it is converted into a sound signal in a digital form by an A/D converter and is fed to the PC 10d. A sound signal in the digital form is input to, for example, the data I/F 1007 that is included in the PC 10d.

A DB 12d further stores information associated with sound, contrary to the above-described DB 12a. For example, the DB 12d may store a sound pattern and a user image in association with each other.

With the above-described configuration, the user stores, in the DB 12d, the user image and the attribute information in association with the identification information. Furthermore, the user designates a sound pattern and stores, in the DB 12d, the designated sound pattern in association with the identification information. In this situation, the user generates the sound in accordance with the registered sound pattern at the position where, for example, the microphone 15 is capable of collecting sound. The sound pattern is, for example, a certain rhythm pattern, and it may be expressed by using handclaps, or the like.

The sound in accordance with the sound pattern is collected by the microphone 15, is converted into a sound signal, and is fed to the PC 10d. The PC 10d analyzes the fed sound signal to extract a sound pattern, and it retrieves the sound pattern, which matches the extracted sound pattern, from the DB 12d. If the sound pattern that matches the extracted sound pattern is retrieved from the DB 12d as a result, the PC 10d acquires the identification information that is associated with the retrieved sound pattern.

If a user object due to the user image, which is associated with the acquired identification information, has been already presented in the image 100, each user object is moved toward the position where the sound is generated, i.e., the position of the microphone 15. Here, as illustrated in, for example, FIG. 34, with regard to a position 16 that is in the image 100 and that corresponds to the position of the microphone 15, a user object that is present within a predetermined range 17 of the image 100 is selectively controlled so as to move toward a position 18.

Furthermore, if a user object due to the user image, which is associated with the acquired identification information, is not presented in the image 100, the PC 10d acquires the user image, associated with the identification information, from the DB 12d and presents it as a user object in the image 100. Here, the appearance position of a user object may be previously determined. For example, it is possible that the appearance position is in the edge portion on the right or left side of the image 100.

FIG. 35 is an example of the functional block diagram that illustrates the functionality of the PC 10d according to the second embodiment. Here, in FIG. 35, the same reference numeral is applied to the part that is the same as that in the above-described FIG. 13, and the detailed explanations are omitted. In FIG. 35, a sound processing unit 240 is added to the PC 10d, contrary to the configuration of the PC 10a, illustrated in FIG. 13. An image analyzing unit 200d, a registering unit 201d, and a presentation control unit 210d have an additional function associated with processing for sound information, contrary to the image analyzing unit 200a, the registering unit 201, and the presentation control unit 210a, illustrated in FIG. 13. Furthermore, the user image DB 230 may further store the sound information in association with the identification information or the user image.

FIG. 36 is an example of the functional block diagram that illustrates the functionality of the presentation control unit 210d according to the second embodiment. Here, in FIG. 36, the same reference numeral is applied to the part that is the same as that in the above-described FIG. 15, and the detailed explanations are omitted. In FIG. 36, a sound-pattern detecting unit 2108 is added to the presentation control unit 210d, contrary to the presentation control unit 210a that is illustrated in FIG. 15. Furthermore, an image managing unit 2101d and an image control unit 2103d have an additional function to perform processing on the basis of sound information, contrary to the image managing unit 2101 and the image control unit 2103a, which are described above.

After a sound signal is output from the microphone 15 and is converted into a digital mode signal, it is fed to the sound processing unit 240. The sound processing unit 240 performs predetermined signal processing on the fed sound signal and feeds it as sound information to the presentation control unit 210d. The sound information is fed to the sound-pattern detecting unit 2108 by the presentation control unit 210d. The sound-pattern detecting unit 2108 detects a sound pattern on the basis of the fed sound information. The detected sound pattern is fed to the image managing unit 2101d. The image managing unit 2101d searches the user image DB 230 on the basis of the fed sound pattern and feeds, to the image control unit 2103d, the identification information or the information that indicates the user image, which are obtained as a result of retrieval.

FIG. 37 illustrates an example of the format for designating a sound pattern by a user according to the second embodiment. As illustrated in FIG. 37(*a*), a sound-pattern designation area 420 is provided with a pattern designation area 421 for designating a sound pattern. In this example, the pattern designation area 421 is formed by arranging 8 check boxes. The 8 check boxes may correspond to 8 beats, where it may be considered that a blank check box is a rest, and the painted and checked check box is a note. FIG. 37(*b*) illustrates an example of a pattern designation area 421' where a part of the check boxes are painted. For example, sounds are generated at a constant speed in accordance with the notes and rests that are indicated in the pattern designation area 421', whereby it is possible to generate the sound pattern that is designated in the pattern designation area 421'.

The sound-pattern designation area 420, illustrated in FIG. 37(*a*), is provided on, for example, the sheet 50 in addition to the attribute setting area 42, the hand drawing area 43, and the placement area 44. In this case, the sound pattern, designated in the sound-pattern designation area 420, is associated with the user image. This is not a limitation, and the sound-pattern designation area 420 may be provided on a different sheet from the sheet 50, on which the attribute setting area 42, the hand drawing area 43, and the placement area 44 are provided. In this case, the sound pattern, designated in the sound-pattern designation area 420, may be associated with, for example, the identification information.

Hereinafter, for explanations, the sound-pattern designation area 420 is provided on the sheet 50 together with the attribute setting area 42, the hand drawing area 43, and the placement area 44. That is, the sound pattern is associated with the user image.

Furthermore, in this case, too, the sheet that includes, for example, the sound-pattern designation area 420 is prepared separately from the sheet 50, and it is placed on the sheet 50 in the same manner as the medium 40, whereby the same sound pattern may be associated with multiple user images.

Furthermore, in the above explanation, a sound pattern is directly designated by using the sound-pattern designation area 420; however, this example is not a limitation. For example, a desired sound pattern may be selected from multiple prepared sound patterns.

Furthermore, in the above explanation, the sound pattern is registered by checking the sound-pattern designation area 420; however, this example is not a limitation. For example, a sound pattern may be registered on the basis of the sound pattern that is actually generated by a user. For example, the microphone 15 collects the sound pattern that is generated by using, for example, user's handclaps, and feeds it as a sound signal to the PC 10*d*. The PC 10*d* analyzes the fed sound signal to detect the sound pattern and registers it in the user image DB 230 in association with the identification information, which is acquired from the identification image 41 that is presented on the medium 40.

In this case, it is preferable that the PC 10*d*, or the like, presents a message that prompts registration of a sound pattern and a user interface for designating registration start (recording start). Furthermore, registration of a sound pattern may be conducted more easily by generating a click sound, which generates sound at a constant interval, or the like.

FIG. 38 is an example of the flowchart that schematically illustrates an operation in a case where the image, acquired by the image acquiring device 20, is presented according to the second embodiment. Here, in FIG. 38, the same reference mark is applied to the operation that is the same as that in the above-described FIG. 16, and the detailed explanations are omitted.

Before the operation in FIG. 38, the user prepares the medium 40, on which the identification image 41 is presented based on the operation identification information, and the sheet 50, makes a desired drawing, or the like, on the sheet 50, or designates a sound pattern on the sound-pattern designation area 420 that is provided on the sheet 50. Afterward, the sheet 50 is placed on the image acquiring device 20, the medium 40 is placed on the placement area 44 of the sheet 50, and the operation to acquire the image by the image acquiring device 20 is started. The image acquiring device 20 transmits the acquired image to the PC 10*d*.

The PC 10*d* receives the image, transmitted from the image acquiring device 20, and feeds it to the image analyzing unit 200*b*. The image analyzing unit 200*b* acquires the fed image (Step S10). At the next Step S210, the image analyzing unit 200*b* detects each of the hand drawing area 43, the attribute setting area 42, and the sound-pattern designation area 420 from the fed image and extracts the user image, the attribute information, and the sound pattern information from each detected area. Furthermore, the image analyzing unit 200*b* extracts the identification image from the fed image and decodes the extracted identification image to acquire the identification information.

At the next Step S12, the registering unit 201 stores the user image, the attribute information, and the sound pattern information, extracted at Step S210, in the user image DB 230 in association with the identification information so as to register the user image. For example, the registering unit 201 stores the sound pattern information together with the user image and the attribute information in a folder of the third layer, which is explained with reference to FIG. 23. Furthermore, the sound pattern information is directly stored in a folder of the second layer so that the same sound pattern information may be associated with each user image that is stored in each folder of the third layer.

At the next Step S13, the presentation control unit 210*d* sets the parameters $p_0$ to $p_7$ for controlling presentation to the user image as described above. Then, at the next Step S14, the presentation control unit 210*d* sets the coordinates in a definition area with regard to the user image, for which the parameters p have been set, and combines it with the background image 110 to generate the image 100. Thus, the user image is presented as a user object in the 3D space that is defined as a definition area.

FIG. 39 is an example of the flowchart that schematically illustrates an operation to present a user image on the basis of a sound pattern according to the second embodiment. Before the operation in the flowchart of FIG. 39, the user registers the user image, the attribute information, and the sound pattern information in association with the identification information in the user image DB 230 in accordance with the flowchart of, for example, the above-described FIG. 38.

The user generates the designated sound pattern on the sound-pattern designation area 420 of the sheet 50 by using, for example, handclaps toward the microphone 15. After a sound signal is output from the microphone 15, it is input to the PC 10*d* and is fed to the presentation control unit 210*d* as sound information via the sound processing unit 240. The presentation control unit 210*d* analyzes the sound pattern on the basis of the fed sound information by using the sound-pattern detecting unit 2108. For example, it is possible that the sound-pattern detecting unit 2108 normalizes the level of the sound signal on the basis of the sound information, makes a threshold determination with regard to the normalized level, and detects the sound pattern.

At the next Step S201, the presentation control unit 210*d* searches the user image DB 230 on the basis of the detected sound pattern and acquires, from the user image DB 230, the user image that is associated with the sound pattern. At the next Step S202, the presentation control unit 210*d* determines the parameters $p_0$ to $p_7$ for the user image, acquired at Step S201, in the same manner as in the operation at Step S13 of FIG. 16 and sets it to each user image.

Then, at the next Step S203, the presentation control unit 210*d* sets the coordinates in the definition area with regard to the user image, for which the parameters p have been set, and combines it with the background image 110 to generate the image 100. Thus, each user image, associated with a sound pattern, is presented as a user object in the 3D space that is defined as a definition area.

Furthermore, at Step S203, each user object newly appears to be presented in the image 100. Here, the appearance position of a user object may be previously determined. For example, it is possible that the appearance position is in the edge portion on the right or left side of the image 100.

FIG. 40 is an example of the flowchart that illustrates a presentation operation in a case where the user object due to the user image, to which the sound pattern is related, has been already presented in the image 100 according to the second embodiment. In the PC 10d, the presentation control unit 210d starts to collect sound by using the microphone 15 (Step S220).

At the next Step S221, the presentation control unit 210d determines whether sound is not detected during a certain period of time. For example, the presentation control unit 210d uses the RAM 1003 as a buffer memory to store a sound signal with the length that is equivalent to the supposed sound pattern, and it determines the presence or absence of sound on the basis of the stored sound signal. If it is determined that sound is not detected during a certain period of time, the presentation control unit 210d returns to the operation at Step S221.

Furthermore, the operation at Step S221 is repeatedly performed with the time gradually shifted. Furthermore, the buffer memory always stores sound signals of a certain period of time by gradually shifting the time until sound collection is terminated.

If it is determined that a sound is detected during a certain period of time, the presentation control unit 210d proceeds to the operation at Step S222. At Step S222, the coordinates that are in the image 100 and that correspond to the position where the sound is detected are acquired.

In the example of the above-described FIG. 33, as only the single microphone 15 is provided, the position where the sound is detected corresponds to the position of the microphone 15. This is not a limitation, and the single microphone may be provided on each of the ends of the projected medium 14 so that sounds are collected by using a stereo. In the case of sound collection using a stereo, any position in a horizontal direction of the projected medium 14 may be a sound detection position.

At the next Step S223, the presentation control unit 210d analyzes a sound pattern on the basis of the sound signal that is stored in the buffer memory. At the next Step S224, the presentation control unit 210d compares the sound pattern, analyzed and acquired at Step S223, with the sound pattern that is registered in the user image DB 230. Then, at the next Step S225, the presentation control unit 210d determines whether there is the sound pattern that matches the sound pattern, acquired at Step S223, in the user image DB 230. If it is determined that there is no matching sound pattern, the presentation control unit 210d returns to the operation at Step S221.

Conversely, if it is determined that there is a matching sound pattern, the presentation control unit 210d proceeds to the operation at Step S226. At Step S226, the presentation control unit 210d acquires, from the presentation queue area, the user image that is associated with the matching sound pattern. At the next Step S227, the presentation control unit 210d moves the user object, which corresponds to the user image, acquired from the presentation queue area, toward the coordinates, on which the sound has been detected and which are acquired at Step S222. Then, the presentation control unit 210d returns to the operation at Step S221.

As described above, the movement of a user object is controlled in accordance with detection of sounds so that interactive property may be provided to the movement of a user object.

Furthermore, in the above description, a sound pattern is detected on the basis of the sound that is collected by the microphone 15; however, this example is not a limitation. For example, a sound pattern may be detected by using a device like an instrument. For instance, it is possible to use a device, e.g., a percussion instrument, such as castanets, with a switch, which outputs a signal when it is played. A signal output from the device is fed to the PC 10d. The PC 10d analyzes a signal, fed from the device, to detect a sound pattern. Here, an output signal of the device includes the positional information on the device so that a control may be performed in accordance with the coordinates at Step S227. It is possible that the positional information on the device is previously set to the device. The positional information on the device may be detected by the sensor 13.

First Modified Example of the Second Embodiment

Next, an explanation is given of a first modified example of the second embodiment. The first modified example of the second embodiment is the combination of the acquisition of a user image by using the identification image 41 according to the above-described first embodiment and the control on a user object by using sounds according to the second embodiment.

FIG. 41 illustrates an example of the configuration of a presentation system according to the first modified example of the second embodiment. Here, in FIG. 41, the same reference numeral is applied to the part that is the same as that in the above-described FIG. 1 and FIG. 33, and the detailed explanations are omitted. Furthermore, in FIG. 41, the image acquiring device 20 and the identification-image reading device 21, illustrated in FIG. 1, are omitted.

In FIG. 41, an identification-image reading device 16 is provided near the projected medium 14, preferably near the microphone 15, in a presentation system 1e. The identification-image reading device 16 has the same functionality as that of the above-described identification-image reading device 21, and it acquires the image of the medium 40, reads the identification image 41, presented on the medium 40, from the acquired image, and feeds it to a PC 10e.

The identification-image reading device 16 may be provided as a separate device from the identification-image reading device 21, or it may be common to the identification-image reading device 21. Furthermore, the configuration of the PC 10a, explained with reference to FIG. 12, and the functionality, explained with reference to FIG. 35, may be directly applied to the configuration and the functionality of the PC 10e; therefore, the explanations are omitted here. For example, outputs of the identification-image reading device 16 are fed to a presentation control unit (which is equivalent to the presentation control unit 210d in FIG. 35) of the PC 10e.

Furthermore, a DB 12e may store a sound pattern and a user image in association with each other in the same manner as the DB 12d according to the above-described second embodiment. More specifically, the DB 12e includes the user image DB 230 and the presentation image DB 231, and the user image DB 230 stores a user image, attribute information, and sound pattern information in association with the identification information.

FIG. 42 is an example of the flowchart that schematically illustrates an operation according to the first modified example of the second embodiment. Before the operation of the flowchart in FIG. 42, the user registers a user image, the attribute information, and the sound pattern information in association with the identification information in the user image DB 230 in accordance with, for example, the flowchart of the above-described FIG. 38.

At Step S240, the PC 10e searches the DB 12e on the basis of the identification information that is acquired from the image of the medium 40, read by the identification-image reading device 16, and determines the user image that is associated with the identification information.

For example, the user places the medium 40, which presents the identification image 41, in the identification-image reading device 16. In response to an instruction due to a user's operation, or the like, the identification-image reading device 16 reads the image of the medium 40 and transmits the read image to the PC 10e. The PC 10e decodes the identification image 41, included in the image that is transmitted from the identification-image reading device 16, to acquire the identification information. Then, the PC 10e searches the user image DB 230, included in the DB 12e, on the basis of the acquired identification information and determines the user image that is associated with the identification information.

Next, at Step S241, the PC 10e acquires a sound pattern on the basis of the sound signal that is fed from the microphone 15, searches the DB 12e on the basis of the acquired sound pattern, and determines the user image that is associated with the sound pattern.

For example, the user generates the sound pattern, which is previously registered by being associated with the user image, by using, for example, handclaps toward the microphone 15. After a sound signal is output from the microphone 15, it is input to the PC 10e. The PC 10e detects a sound pattern from the input sound signal, as explained at Step S201 of FIG. 39. Then, the PC 10e searches the user image DB 230, included in the DB 12e, on the basis of the detected sound pattern and determines the user image that is associated with the sound pattern.

At the next Step S242, in accordance with the processing results at Step S240 and Step S241, the PC 10e presents the user image, which is determined by using the identification information and the sound pattern in common, in the image 100 as the object in the 3D space.

For example, the PC 10e acquires the user image, which is determined by using the identification information and the sound pattern in common, together with the corresponding attribute information from the user image DB 230, included in the DB 12e. The PC 10e determines the parameters $p_0$ to $p_7$ with regard to the acquired user image on the basis of the attribute information in the same manner as in the operation at Step S13 of FIG. 16. Then, the PC 10e sets the coordinates in the definition area with regard to the user image, for which the parameters p have been set, and combines it with the background image 110 to generate the image 100. Thus, each user image, associated with the identification information and the sound pattern in common, is presented as a user object in the 3D space that is defined as a definition area.

An example of the application of the first modified example of the second embodiment is schematically explained. It is assumed that the users who use the presentation system 1e according to the first modified example of the second embodiment are, for example, parent and child users (the parent is a user A, and the child is a user B). The user A places the medium 40, which presents the identification image 41, in the identification-image reading device 16 and causes the identification-image reading device 16 to read the image of the medium 40. Here, it is preferable that the identification-image reading device 16 is configured to detect that the medium 40 is placed and automatically start to read the image.

The user B generates the previously registered sound pattern by using, for example, handclaps near the microphone 15. Thus, the user object due to the user image, which is determined by using the identification information based on the identification image 41 and the sound pattern in common, appears in the image 100.

With this configuration, the user A, who is the parent, may watch the user B, who is the child, and the presentation system 1e may determine the user image, which is associated with the identification information based on the identification image 41 on the medium 40. Thus, if a rhythm is generated by using handclaps, or the like, in front of, for example, the microphone 15, it is possible to determine the user image, which is associated with the rhythm and is associated with the identification information, and present it as the user object in the image 100.

For example, part (preferably, either one of the right and left ends) of the image 100 is previously set as a re-entry area for user objects. Then, in order to enter a user object, which has exited from the image 100, e.g., has moved out of the image 100, to the image 100 again, operations are requested, for example, the user A places the medium 40, which presents the identification image 41, in the identification-image reading device 16, and the user B makes handclaps in the previously registered rhythm; thus, it is possible to introduce a game element and also to develop the sense of rhythm of the user B.

Second Modified Example of the Second Embodiment

It is more preferable that, in the presentation system 1e according to the first modified example of the second embodiment, illustrated in FIG. 41, a PC that offers a guide for operations be provided near the identification-image reading device 16. FIG. 43 illustrates an example of the configuration of a presentation system in which a PC for operation guide is provided according to a second modified example of the second embodiment. Here, in FIG. 43, the same reference numeral is applied to the part that is the same as that in the above-described FIG. 1 and FIG. 41, and the detailed explanations are omitted. Furthermore, the image acquiring device 20 and the identification-image reading device 21, illustrated in FIG. 1, are omitted from FIG. 43.

In FIG. 43, a presentation system 1e' is obtained by adding a PC 70 to the presentation system 1e of FIG. 41. In the same manner as the PC 10e, the PC 70 may acquire the identification information on the basis of the image output from the identification-image reading device 16. Alto, the PC 70 may acquire the combination of the user image, the attribute information, and the sound pattern information, associated with the identification information, from the user image DB 230 that is included in the DB 12e.

Furthermore, as the configuration of the PC 10a, explained with reference to FIG. 12, may be directly applied to the PC 70, the explanations are omitted here.

The PC 70 may acquire, from the DB 12e, the user image that is associated with the identification information based on the image, output from the identification-image reading device 16, and may display the acquired user image on a monitor that is included in the PC 70. Here, the PC 70 may reduce the size of the acquired user image to generate a thumbnail image and display a list of thumbnail images on the monitor.

Furthermore, for example, if the sheet 50 has a name entry area for entering the name of the image in the hand drawing area 43, the name information, entered in the name entry area, may be displayed on the monitor. For example, the PC 10e further extracts the image of the name entry area from the image of the sheet 50, acquired by the image acquiring device 20, and stores the extracted image as the name information in association with the identification information together with the user image, the attribute information, and the sound pattern information in the user image DB 230 of the DB 12e. The PC 10e may conduct character recognition on the image in the name entry area and use the acquired character string as the name information. The PC 70 acquires, from the DB 12e, the name information that is associated with the identification information based on the image output from the identification-image reading device 16 and displays a list of pieces of name information on the monitor.

Furthermore, the PC 70 may acquire, from the DB 12e, the sound pattern information that corresponds to the thumbnail image or the name information, designated from the above-described list of thumbnail images or pieces of name information in accordance with a user's operation, and present, to the user, the acquired sound pattern information as the guide for the sound pattern to be generated. The guide for a sound pattern may be presented to a user by being displayed as the visual information, such as musical notes, on the monitor, or it may be presented as the audio information to a user by generating sounds in accordance with the sound pattern.

Furthermore, for example, it is possible that the sensor 13 detects the position of the user B and the user object, which is in the image 100 and corresponds to the user image, associated with the identification information, is moved in accordance with the detected position. For example, if the user B moves to right or left in front of the image 100 (the projected medium 14), the user object due to the user image, associated with the identification information, is moved in a row in accordance with the movement.

Furthermore, although each of the above-described embodiments is a preferred embodiment of the present invention, this is not a limitation, and various modifications may be made within the range without departing from the scope of the present invention.

REFERENCE SIGNS LIST 1a, 1d, 1e, 1e' Presentation system
10a, 10b, 10c, 10d, 10e PC
11 Projector
12a, 12d DB
13 Sensor
14 Projected medium
15 Microphone
16, 21 Identification-image reading device
20 Image acquiring device
40, 40' Medium
41 Identification image
42 Attribute setting area
43 Hand drawing area
44 Placement area
45 Picture
50 Sheet
100 Image
110 Background image
110a Sky area
110b Land area
111 Fixed object
112, 130$_1$ to 130$_3$, 131 Icon image
120$_1$ to 120$_4$, 120$_{10}$ to 120$_{13}$, 120$_{20}$ to 120$_{27}$ User object
200, 200b, 200c, 200d Image analyzing unit
201 Registering unit
210a, 210b, 210c, 210d Presentation control unit
230 User image DB
231 Presentation image DB
232 Addition operation DB
233 Logo image DB
320 Folder in the first layer
321$_1$, 321$_2$, 321$_3$, . . . , 321$_m$, 321$_{m+1}$, 321$_{m+2}$, . . . . Folder in the second layer
322$_1$ to 322$_5$ Folder in the third layer
330 Log information
420 Sound-pattern designation area
421, 421' Pattern designation area
1001 CPU
1003 RAM
1006 Storage
2001 Image acquiring unit
2002 User-image extracting unit
2003, 2102 Identification-information acquiring unit
2004 Attribute-information acquiring unit
2101, 2101d Image managing unit
2103a, 2103d Image control unit
2104 Motion-information acquiring unit
2107 Combining unit
2108 Sound-pattern detecting unit
2120 Presentation-image acquiring unit

CITATION LIST

Patent Literature

PTL 1: Japanese Patent No. 4161325

The invention claimed is:

1. An image management device comprising:
a memory and processing circuitry, the processing circuitry configured to,
acquire, at a first time, an image of a sheet, as an acquired image, via an image acquiring device, the sheet including a user image, an identification image, and attribute information, the user image being generated by a user, the identification image including identification information identifying the user, and the attribute information, indicating an animation associated with the user image,
extract the identification information, the user image, and the attribute information from the acquired image of the sheet,
store, in the memory, the user image in association with the identification information and the attribute information as a user object of a plurality of user objects associated with the user,
acquire, at a second time, the identification information from the identification image via an identification acquiring device, the identification image being separable from the sheet, and
retrieve the plurality of user objects from the memory based on the identification information acquired at the second time such that the processing circuitry identifies each user object of the plurality of user objects associated with the identification image of the user and presents the plurality of user objects to the user.

2. The image management device according to claim 1, wherein the processing circuitry is configured to embed, in the identification information, generation time information that indicates a time when the identification information is generated.

3. The image management device according to claim 1, wherein the processing circuitry is further configured to store the user object, in the memory, in association with the identification information such that the user object is organized based on acquisition time information, the acquisition time information indicating a time when the acquired image is acquired via the image acquiring device.

4. The image management device according to claim 1, wherein the processing circuitry is further configured to,
store the user object such that the identification information associated with the user object matches the identification information acquired by the identification acquiring device, and
control presentation of the user object.

5. The image management device according to claim 4, wherein the processing circuitry is further configured to,
delete, from the memory, one of the plurality of user objects having an earliest time among the plurality of user objects when a number of the plurality of user objects exceeds a threshold.

6. The image management device according to claim 5, wherein the processing circuitry is further configured to count the number of the plurality of user objects, except for ones of the plurality of user objects that meet a condition.

7. The image management device according to claim 1, wherein the processing circuitry is further configured to store, as log information, use information that includes at least the identification information acquired via image acquiring device or the identification acquiring device, and time information that includes a date and a time when the identification information is acquired.

8. The image management device according to claim 7, wherein the processing circuitry is further configured to,
extract first use information from among the use information that matches the identification information, and
extract from the first use information, second use information with the date matching a current date.

9. The image management device according to claim 8, wherein the processing circuitry is further configured to,
compare a number of pieces of the second use information with a threshold, and
display an error message when the number of pieces of the second use information is greater than or equal to the threshold.

10. The image management device according to claim 9, wherein the processing circuitry is further configured to,
retrieve the user object corresponding to the identification information included in the second use information, when the number of pieces of the second use information is less than the threshold, and
change presentation of the user object corresponding to the identification information included in the second use information.

11. The image management device according to claim 1, wherein the processing circuitry is further configured to,
store addition-operation information in association with addition-operation identification information when the identification information acquired via the image acquiring device or the identification acquiring device includes the addition-operation identification information, and
retrieve previously stored addition-operation information associated with the addition-operation identification information acquired via the image acquiring device or the identification acquiring device.

12. The image management device according to claim 1, further comprising:
a sound detecting device configured to acquire a sound and detect a pattern of the sound, wherein the processing circuitry is configured to,
store pattern information indicating the pattern of the sound in association with the user image,
detect whether the pattern detected by the sound detecting device corresponds to the pattern information associated with one of the plurality of user objects, and,
read the one of the plurality of user objects, if the pattern detected by the sound detecting device corresponds to the pattern information.

13. The image management device according to claim 1, wherein the processing circuitry is further configured to:
acquire, at the second time, the identification information from the identification image presented on a data communication device, the data communication device being separable from the sheet, and the data communication device configured to perform data communication and including a display integrally formed with a chassis.

14. An image management method comprising:
acquiring, at a first time, an image of a sheet, as an acquired image, the sheet including a user image, an identification image, and attribute information, the user image being generated by a user, the identification image including identification information identifying the user, and the attribute information indicating an animation associated with the user image;
extracting the identification information, the user image, and the attribute information from the acquired image of the sheet;
storing, in a memory, the user image in association with the identification information and the attribute information as a user object of a plurality of user objects associated with the user;
acquiring, at a second time, the identification information from the identification image via an identification-acquiring device, the identification image being separable from the sheet; and
retrieving the plurality of user objects from the memory based on the identification information acquired at the second time such that each user object of the plurality of user objects associated with the identification image of the user is identified and the plurality of user objects is presented to the user.

15. A non-transitory recording medium storing a plurality of instructions which, in response to execution by one or more processors, causes the one or more processors to execute the image management method according to claim 14.

16. A presentation system comprising:
an image acquiring device;
an identification acquiring device; and
an image management device, the image management device including a memory and processing circuitry configured to,
acquire, at a first time, an image of a sheet via the image acquiring device as an acquired image, the sheet including a user image, an identification image, and attribute information, the user image being generated by a user and the identification image including identification information identifying the user, and the attribute information indicating an animation associated with the user image,
extract the identification information, the user image, and the attribute information from the acquired image of the sheet, store, in the memory, the user image in association with the identification information and the attribute information as a user object of a plurality of user objects associated with the user, acquire, at a second time, the identification information from the identification image via an identification-acquiring device, the identification image being separable from the sheet, retrieve the plurality of user objects from the memory based on the identification information acquired at the second time such that the processing circuitry identifies each user object of the plurality of user objects associated with the identification image of the user and presents the plurality of user objects to the user and control presentation of the user object, wherein the user object is stored such that the identification information associated with the user object matches identification information acquired by the identification acquiring device.

* * * * *